(12) United States Patent
Nagai et al.

(10) Patent No.: US 6,370,975 B1
(45) Date of Patent: Apr. 16, 2002

(54) ACTUATOR AND ACTUATOR SYSTEM

(75) Inventors: Shigekazu Nagai; Masahiko Suzuki, both of Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/633,194

(22) Filed: Aug. 4, 2000

Related U.S. Application Data

(60) Continuation of application No. 08/858,568, filed on May 19, 1997, which is a division of application No. 08/321,771, filed on Oct. 12, 1994, now Pat. No. 5,689,994.

(30) Foreign Application Priority Data

| Oct. 12, 1993 | (JP) | ............................................. 5-280124 |
| Nov. 10, 1993 | (JP) | ............................................. 5-281203 |
| Dec. 28, 1993 | (JP) | ............................................. 5-336574 |

(51) Int. Cl.[7] ............................................. F16H 25/20
(52) U.S. Cl. ......................... 74/89.25; 74/608; 74/89.4; 384/15
(58) Field of Search .......................... 74/89.15, 424.8 R, 74/89.25, 608, 89.4; 901/48; 414/673, 589, 590; 384/15

(56) References Cited

U.S. PATENT DOCUMENTS

| 1,379,945 | A |   | 5/1921  | Teetsow |                |
|-----------|---|---|---------|---------|----------------|
| 2,345,952 | A |   | 9/1944  | Smith   |                |
| 3,096,467 | A |   | 7/1963  | Angus et al. |           |
| 3,660,704 | A |   | 5/1972  | Paine et al. |           |
| 3,781,072 | A |   | 12/1973 | Nattefort |             |
| 3,894,232 | A |   | 7/1975  | Laspesa |                |
| 4,069,850 | A | * | 1/1978  | Cremona ................... 74/89.15 |
| 4,289,441 | A | * | 9/1981  | Inaba et al. ................. 414/673 |
| 4,398,774 | A |   | 8/1983  | Voll et al. |             |
| 4,444,540 | A | * | 4/1984  | Blatt et al. ................. 74/89.15 |
| 4,477,862 | A | * | 10/1984 | Gonzales .................... 439/928 |
| 4,682,930 | A | * | 7/1987  | Hachisu ...................... 74/89.15 |
| 4,790,762 | A | * | 12/1988 | Harmes et al. ............. 439/928 |
| 4,963,041 | A |   | 10/1990 | Sowards |                |
| 4,988,905 | A | * | 1/1991  | Tolmie, Jr. ................. 310/68 R |
| 5,028,073 | A |   | 7/1991  | Harms et al. |           |
| 5,073,039 | A |   | 12/1991 | Shervington |           |
| 5,087,847 | A |   | 2/1992  | Giesbert et al. |       |
| 5,182,956 | A | * | 2/1993  | Woodall et al. .............. 74/18.2 |
| 5,187,993 | A | * | 2/1993  | Nicholson et al. ......... 74/89.15 |
| 5,190,380 | A |   | 3/1993  | Comerci |                |
| 5,197,808 | A |   | 3/1993  | Takata |                 |
| 5,369,322 | A |   | 11/1994 | Maruyama et al. |       |
| 5,484,051 | A | * | 1/1996  | Nagai et al. ............. 198/750.7 |
| 5,676,553 | A | * | 10/1997 | Leung ........................ 439/928 |
| 5,689,994 | A |   | 11/1997 | Nagai et al. |           |
| 5,714,816 | A | * | 2/1998  | Jensen et al. ............. 310/68 R |

FOREIGN PATENT DOCUMENTS

| DE | 1463463  | * | 7/1969 | ................. 74/89.15 |
| DE | 88 13 656 |   | 1/1989 |                         |

(List continued on next page.)

*Primary Examiner*—David A. Bucci
*Assistant Examiner*—William C Joyce
(74) *Attorney, Agent, or Firm*—Oblon, Spivak, McClelland, Maier & Neustadt, P.C.

(57) ABSTRACT

An actuator has a linearly elongate frame, side, end, and top covers detachably and selectively mounted on side surfaces of the frame, a table mechanism displaceable in the axial direction of the frame in response to energization of an electric motor, and a ball screw for transmitting drive forces from the electric motor to the table mechanism. The operator can select various actuator configurations depending on the environment in which the actuator is to be installed and the application in which the actuator is to be used. In the preferred embodiment, the ball screw is used in combination with a piston/cylinder arrangement for moving the table mechanism in a linear direction. The piston/cylinder having a magnetic coupling for coupling the piston to the table mechanism.

2 Claims, 57 Drawing Sheets

FOREIGN PATENT DOCUMENTS

| | | |
|---|---|---|
| EP | 0 111 565 | 6/1984 |
| EP | 0 536 493 | 4/1993 |
| EP | 0 601 185 | 6/1994 |
| FR | 1191941 | 10/1959 |
| FR | 2 338 108 | 8/1977 |
| JP | 61-55461 | 3/1986 |
| JP | 62-258258 * 11/1987 | ................ 74/98.15 |
| JP | 2-188145 | 7/1990 |
| JP | 3 504066 | 9/1991 |
| JP | 3 505642 | 12/1991 |
| JP | 5 69352 | 3/1993 |
| JP | 5 180295 | 7/1993 |
| JP | 5 180296 | 7/1993 |
| JP | 5 248421 | 9/1993 |
| JP | 6 28034 | 2/1994 |
| JP | 6 42604 | 2/1994 |
| JP | 7 26636 | 1/1995 |
| JP | 7-27113 | 1/1995 |
| WO | WO 91/05399 | 4/1991 |
| WO | 93/05321 * | 3/1993 |

* cited by examiner

FIG.18

| | ACTUATOR 10 | ACTUATOR 60 | ACTUATOR 110 |
|---|---|---|---|
| BALL SCREW DIAMETER (mm) | 1 2 | 1 5 | 2 0 |
| MOTOR OUTPUT (W) | 5 0 ~ 6 5 | 6 0 ~ 1 2 5 | 2 0 0 ~ 2 4 0 |
| DISPLACEMENT OF TABLE MECHANISM (mm/s) | 5 0 0 | 5 0 0 ~ 1 0 0 0 | 5 0 0 ~ 1 0 0 0 |
| MAX. MOVABLE LOAD (kg) | 5 | 3 0 | 6 0 |
| STROKE (mm) | 2 0 0 ~ 5 0 0 | 3 0 0 ~ 7 0 0 | 3 0 0 ~ 1 0 0 0 |

ACTUATOR AND ACTUATOR SYSTEM

This Appln is a con of Ser. No. 08/858,568 filed May. 19, 1997 which is a Div. of Ser. No. 08/328,771 filed Oct. 12, 1994 U.S. Pat. No. 5,689,984.

BACKGROUND OF THE INVENTION

1. Field of the Invention:

The present invention relates to an actuator for displacing a table through operation of a drive source to carry out mechanical work such as the conveying of a work-piece, and an actuator system which comprises a plurality of such actuators.

2. Description of the Related Art

There has heretofore been known an actuator having, as a drive source, an electric motor equipped with a sensor such as an encoder, a tachometer generator, or the like for making it possible to control a rotational speed, a drive torque, a stop position, or the like. The rotational motion from the electric motor is converted into linear motion by a drive force transmission shaft such as a ball screw, a trapezoidal screw, or the like, and the linear motion is transmitted to a table mechanism, which is displaced to convey a workpiece.

An electric motor which is incorporated in such an actuator is illustrated in longitudinal cross section in FIG. 1 of the accompanying drawings. As shown in FIG. 1, the electric motor, generally denoted at 1, has a coupling 4 interconnecting an end of a ball screw 2 and an end of a motor shaft 3 coaxially with each other. The coupling 4 serves to absorb a misalignment between the axes of the motor shaft 3 and the ball screw 2, and prevent vibrations which are produced when rotary motion is converted into linear motion and also vibrations which are produced due to rotary motion containing a flexural component perpendicular to the axis as the ball screw 2 becomes longer, from being transmitted to the motor shaft 3.

One end of the ball screw 2 is rotatably supported by a first bearing 5 comprising balls 5a which are obliquely interposed between inner and outer races thereof. Since the balls 5a bear loads at a certain angle with respect to the axis of the ball screw 2 as indicated by the broken lines in FIG. 1, the balls 5a are capable of absorbing a load in a direction substantially perpendicular to the axis of the ball screw 2 and also a load in a direction substantially parallel to the axis of the ball screw 2.

The motor shaft 3 which is housed in a motor housing 6 has an end rotatably supported by a second bearing 7 and a spring washer 8, and an opposite end rotatably supported by a third bearing 9, which is of a double bearing configuration.

The first bearing 5 supports the ball screw 2 in both axial and radially inward directions. The second bearing 7 supports the motor shaft 3 in a radially inward direction for thereby absorbing vibrations and inertial forces that are generated in a radially outward direction by the rotational forces of the motor shaft 3. The third bearing 9 supports the motor shaft 3 in both axial and radially inward directions. Therefore, in the case where a photosensor P is mounted in the electric motor 1 for detecting the number of revolutions, the rotational speed, or the like of the electric motor 1, it is possible to position an encoder disk D fixedly mounted on the motor shaft 3 accurately within a clearance A in the photosensor P.

The electric motor 1 which tends to experience a relatively high temperature during operation suffers the problem of different thermal expansions due to different materials and shapes of the parts used. Typically, the motor housing 6 is made of an aluminum-base material for heat radiation, and the motor shaft 3 is made of an iron-base material. The difference between different thermal expansions of the materials of the motor housing 6 and the motor shaft 3 causes the motor housing 6 to be displaced axially, possibly concentrating stresses on the second bearing 7 which supports the motor shaft 3. Consequently, it is necessary to absorb the difference between these different thermal expansions in some way.

In the conventional electric motor 1, the spring washer 8 is interposed between balls 7a of the second bearing 7 and an inner wall surface of a bracket 6a of the motor housing 6. The difference between the different thermal expansions can be absorbed when the spring washer 8 is elastically deformed, pressing the balls 7a in a direction substantially parallel to the axis of the motor shaft 3.

Actuators for making rotary and linear motion, such as an electric actuator represented by an electric motor and a fluid pressure actuator represented by a fluid cylinder, are controlled by a motor driver and a solenoid-operated valve. These actuators, which include actuators for use in robots, are usually disposed independently of, not integrally with, a controller.

If the electric motor 1 is incorporated as an actuator in an apparatus (not shown), thus providing a drive source, it is necessary to reduce the size and weight of the actuator as much as possible in order to increase the versatility of the actuator.

The coupling 4 which interconnects the motor shaft 3 and the ball screw 2 may bring about resonance in the motor shaft 3 and the ball screw 2 when rotated. When the electric motor 1, which requires high dynamic characteristics, as with a servomotor, resonates, the positional control accuracy thereof is lowered, and its dynamic characteristics are impaired. If the coupling 4, which-serves to prevent vibrations from being applied to the motor shaft 3, were dispensed with and the motor shaft 3 and the ball screw 2 were integrally coupled directly to each other in order to alleviate the above drawbacks, then unwanted vibrations would be transmitted to the motor shaft 3. As a result, it would be difficult to convey a workpiece continuously stably.

SUMMARY OF THE INVENTION

It is an object of the present invention to provide an actuator which allows the operator to select various actuator configurations depending on the environment in which the actuator is to be installed and the application in which the actuator is to be used.

According to a first aspect of the present invention, there is provided an actuator comprising a frame extending linearly for a predetermined length, a plurality of covers detachably and selectively mounted on respective side surfaces of the frame, a drive source, a table mechanism disposed on the frame for displacement in an axial direction of the frame in response to operation of the drive source, and drive force transmitting means for transmitting drive forces from the drive source to the table mechanism.

The covers may include a pair of side covers mounted on transverse side surfaces, respectively, of the frame, a pair of end covers mounted on longitudinal ends, respectively, of the frame, and a top cover engaging upper surfaces of the end covers. The drive force transmitting means may comprise at least a ball screw shaft or a timing belt.

The actuator may further comprise a cylinder disposed axially parallel to and outside of the frame, the cylinder having a piston rod coupled to the table mechanism.

The actuator may further comprise a cylinder disposed axially in the frame, the cylinder comprising a cylinder tube and a piston displaceable in the cylinder tube, the piston having a magnet, the table mechanism including a movable table having an inner wall surface held in sliding contact with an outer circumferential surface of the cylinder tube, the inner wall surface supporting a magnet thereon. The cylinder may comprise one or a plurality of parallel cylinders extending axially along the frame.

The actuator may further comprise a drive control block which houses at least an electric motor, a speed detecting mechanism for detecting a rotational speed of the electric motor, a brake mechanism associated with the electric motor, and a clutch mechanism associated with the electric motor. The drive control block may be composed of a plurality of blocks housing the electric motor, the speed detecting mechanism, the brake mechanism, and the clutch mechanism, respectively, the blocks being detachably coupled together.

Another object of the present invention is to provide an actuator having an electric motor including a motor shaft, a table mechanism, and a drive force transmitting shaft for transmitting drive forces from the motor to the table mechanism, the motor shaft and the drive force transmitting shaft being integrally formed with each other, thereby reducing the size and weight of the actuator.

According to a second aspect of the present invention, there is provided an actuator comprising an electric motor having a rotatable shaft, a drive force transmitting shaft for converting rotary motion from the electric motor into linear motion, and table mechanism movable by the linear motion from the drive force transmitting shaft to convey a workpiece carried on the table mechanism, the rotatable shaft and the drive force transmitting shaft being integrally formed with each other.

The electric motor may comprise a drive unit having the rotatable shaft and a detector for detecting a rotational angle of the rotatable shaft, further comprising first and second bearings, the rotatable shaft being supported at opposite ends thereof by the first and second bearings. The first bearing may be disposed near the drive unit and the second bearing may be disposed near the detector, the first and second bearings holding the rotatable shaft axially and radially thereof.

The actuator may further comprise a casing, a pair of sensors mounted in the casing, and an encoder disk interposed between the sensors and integrally coupled to the rotatable shaft, the first and second bearings maintaining a predetermined clearance between the photosensors and the encoder disk.

The electric motor may have a casing, and the actuator may further comprise a resilient member for absorbing a displacement produced due to different thermal expansions of the casing and the rotatable shaft.

The electric motor may have a casing, the rotatable shaft being removable out of the casing.

Still another object of the present invention is to provide an actuator system which can easily be reconstructed by replacing or changing actuators.

According to a third aspect of the present invention, there is provided an actuator system comprising a plurality of components including actuators, and a plurality of controllers associated with the components, respectively.

The actuators may have respective frames, the frames housing power supply buses and signal buses which interconnect the components. The signal buses may be connected to each other in a wireless configuration. The actuator system may further comprise a network communication system interconnecting the components.

The operator can freely select and mount covers of different shapes on the frame depending on the environment in which the actuator is to be installed and the application in which the actuator is to be used. Since the covers are detachable from the frame, the actuator can be modified into a different configuration by removing or adding some of the covers when the actuator is to be installed in a different place.

Vibrations produced by the drive force transmitting shaft when the motor is energized are absorbed by the first bearing, and hence prevented from being transmitted to the motor. When a displacement is generated due to the difference between thermal expansions of the casing and the rotatable shaft at the time the motor is heated, the resilient member is elastically displaced to absorb the displacement, thereby preventing stresses from being applied to the first bearing in the axial direction of the drive shaft.

The second bearing is capable of absorbing a load in the axial direction and a load in a direction perpendicular to the axial direction.

In the actuator system, each of the components of the actuator system is associated with a controller for recognizing itself. Therefore, the actuators can easily be changed.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 18 is a table showing, for comparison, various functions of the actuators according to the first through third embodiments;

DETAILED DESCRIPTION OF THE PREFERRED EMBODIMENTS

Figure 2:
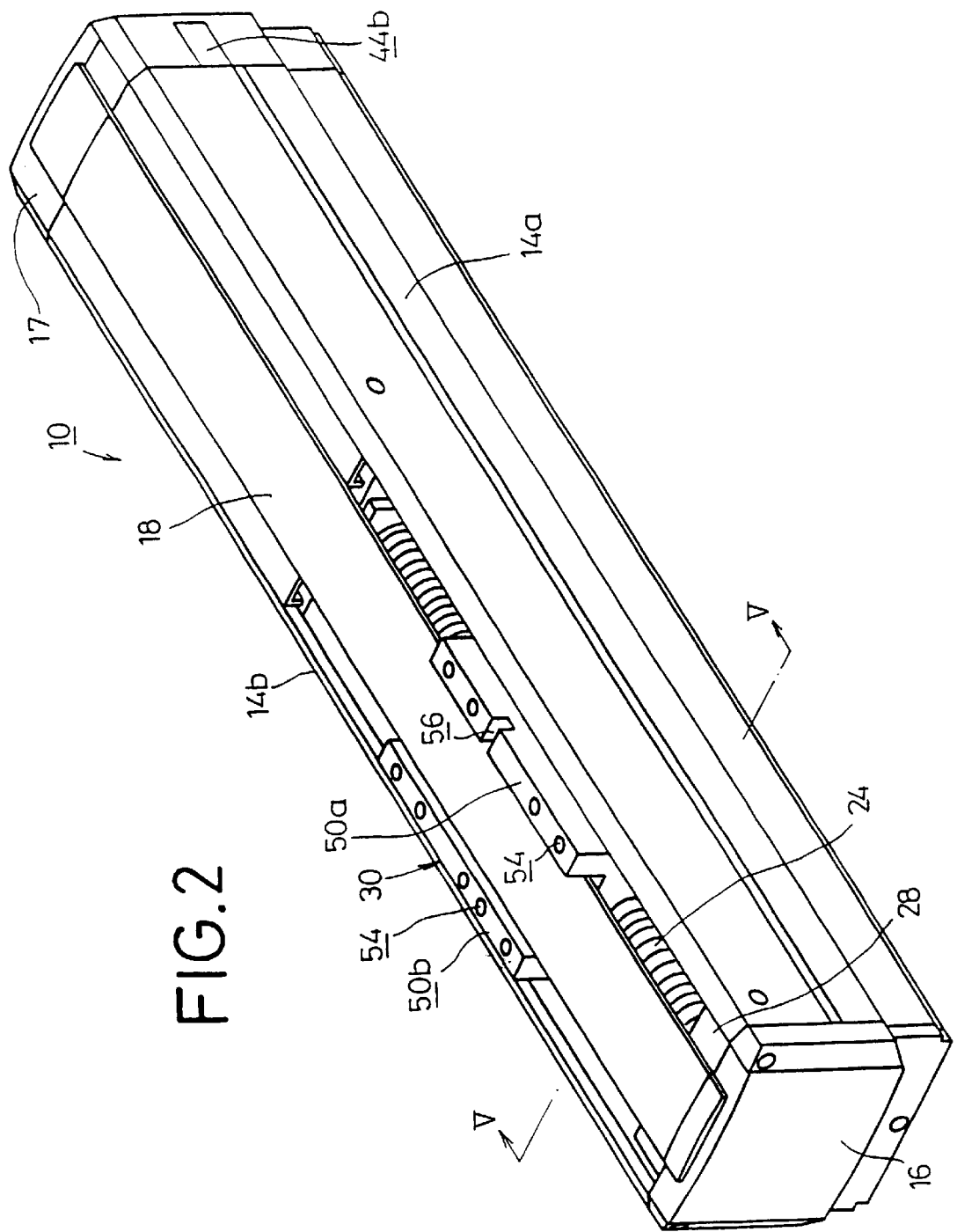
FIG. 2 is a perspective view of an actuator according to a first embodiment of the present invention.
Figure 3:
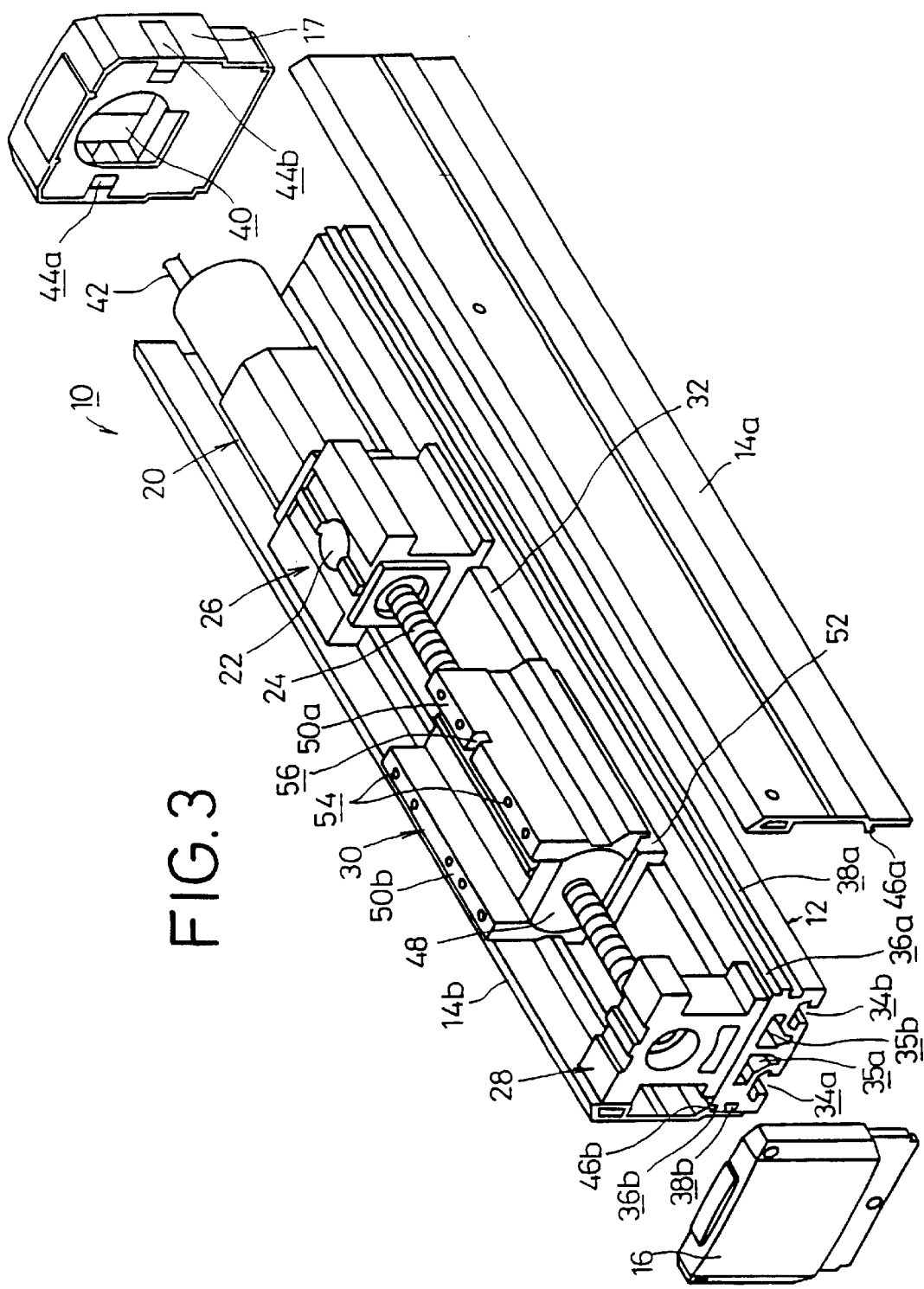
FIG. 3 is a partial exploded perspective view of the actuator shown in FIG. 2.
Figure 4:
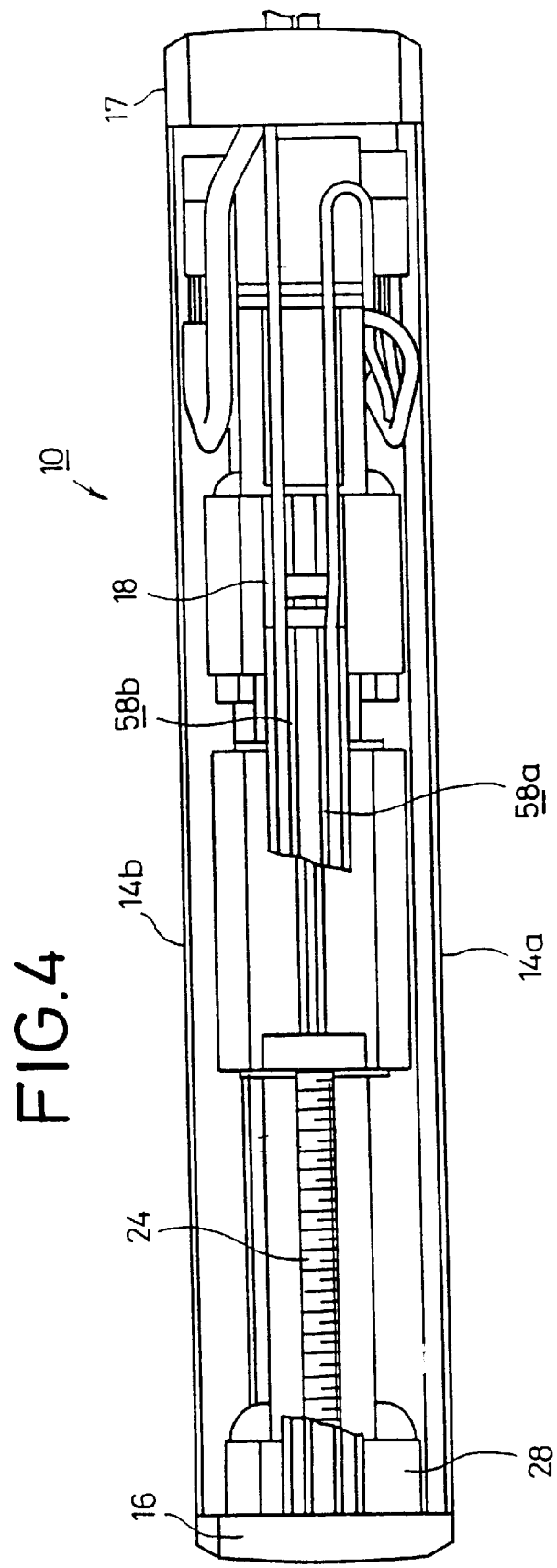
FIG. 4 is a plan view, partly omitted From illustration, of the actuator shown in FIG. 2.

As shown in FIGS. 2, 3, and 4, an actuator 10 according to a first embodiment of the present invention has a frame 12 as a base, a pair of side covers 14a, 14b mounted respectively on transverse side surfaces of the frame 12, a pair of end covers 16, 17 mounted on respective opposite longitudinal ends of the frame 12, and a top cover 18 engaging upper surfaces of the side covers 14a, 14b.

On the frame 12, there are mounted an electric motor 20 fixed closely to an end of the frame 12, a coupling block 26 which connects the rotatable shaft of the electric motor 20 and a ball screw 24 coaxially to each other through a coupling 22, a bearing block 28 fixed at the other end of the frame 12, with an end of the ball screw 24 being rotatably supported by the bearing block 28, and a table mechanism 30 which is threaded over the ball screw 24 for linear displacement between the coupling block 26 and the bearing block 28 in response to rotation of the ball screw 24. A guide 32 for linearly guiding the table mechanism 30 as it is displaced by the ball screw 24 is mounted on the frame 12 and extends between the coupling block 26 and the bearing block 28.

Figure 5:
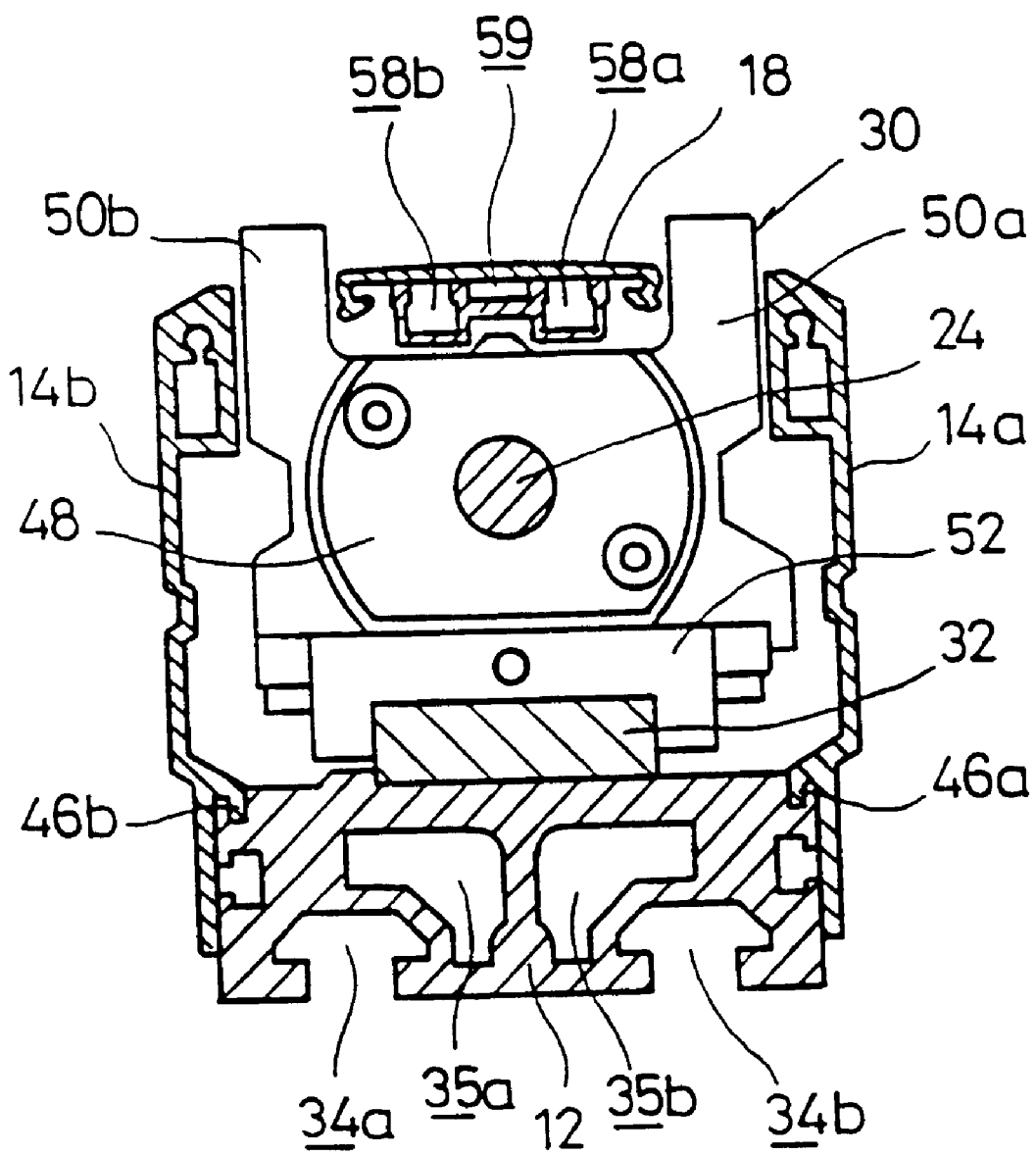
FIG. 5 is a transverse cross-sectional view taken along line V—V of FIG. 2.

More specifically, as shown in FIGS. 3 and 5, the frame 12 has a pair of identical grooves 34a, 34b of substantially T-shaped cross section defined in the bottom thereof and extending substantially parallel to each other in the longitudinal direction of the frame 12, and a pair of passages 35a, 35b of substantially L-shaped cross section defined therein and extending substantially parallel to each other in the longitudinal direction of the frame 12. The frame 12 also has a pair of engaging grooves 36a, 36b defined longitudinally in opposite side surfaces thereof which lie perpendicularly to the bottom of the frame 12, for attachment of the side covers 14a, 14b, and a pair of long grooves 38a, 38b defined longitudinally in the opposite side surfaces thereof closely and substantially parallel to the engaging grooves 36a, 36b. The frame 12 is formed by extruding or drawing a light metal. The grooves 34a, 34b defined in the bottom of the frame 12 serve to join another frame, actuator, or the like, and the passages 35a, 35b serve as wiring and fluid passages. These grooves 34a, 34b or passages 35a, 35b are not limited to a pair of grooves or passages, but may be at least one groove or passage.

The end covers 16, 17 are attached to the respective longitudinal ends of the frame 12. The end cover 17 has a substantially circular hole 40 defined in a side thereof which holds an end of the electric motor 20 therein.

The end cover 17 also has a pair of holes 44a, 44b defined respectively in opposite sides thereof for drawing a cable 42 that is electrically connected to the electric motor 20. The cable 42 can be drawn from a selected one of the holes 44a, 44b.

The side covers 14a, 14b have respective substantially L-shaped ridges 46a, 46b projecting on their side surfaces which engage the frame 12, the ridges 46a, 46b engaging in the respective engaging grooves 36a, 36b. The ridges 46a, 46b can be fitted into the respective engaging grooves 36a, 36b by pressing the side covers 14a, 14b from inclined positions against the side surfaces of the frame 12 in which the respective engaging grooves 36a, 36b are defined. To separate the side covers 14a, 14b from the frame 12, the side covers 14a, 14b may be pulled upwardly from the frame 12. Therefore, the side covers 14a, 14b can simply be attached to and removed from the frame 12.

The table mechanism 30 comprises a ball screw bushing 48 threaded over the ball screw 24 for converting rotary motion of the ball screw 24 into linear motion, a pair of table blocks 50a, 50b held against respective opposite side surfaces of the ball screw bushing 48 and maintaining the ball screw bushing 48 therebetween, and a holder 52 of channel-shaped cross section interposed between the ball screw bushing 48 and the guide 32. The table blocks 50a, 50b have connecting holes 54 defined in their upper surface for fastening another member mounted thereon. The table block 50a also has a positioning recess 56 defined in the upper surface thereof for accurately positioning a workpiece placed on the table mechanism 30.

As shown in FIG. 5, the top cover 18 supports two substantially parallel passages 58a, 58b of substantially rectangular cross section longitudinally on its lower surface. The passages 58a, 58b serve as passages for the cable 42 connected to the electric motor 20, or to hold a sensor (not shown) in a desired position for detecting the position of the table mechanism 30. A fluid or wiring passage 59 is defined between the passages 58a, 58b underneath the top cover 18.

Operation of the actuator 10 according to the first embodiment will be described below.

Figure 6:
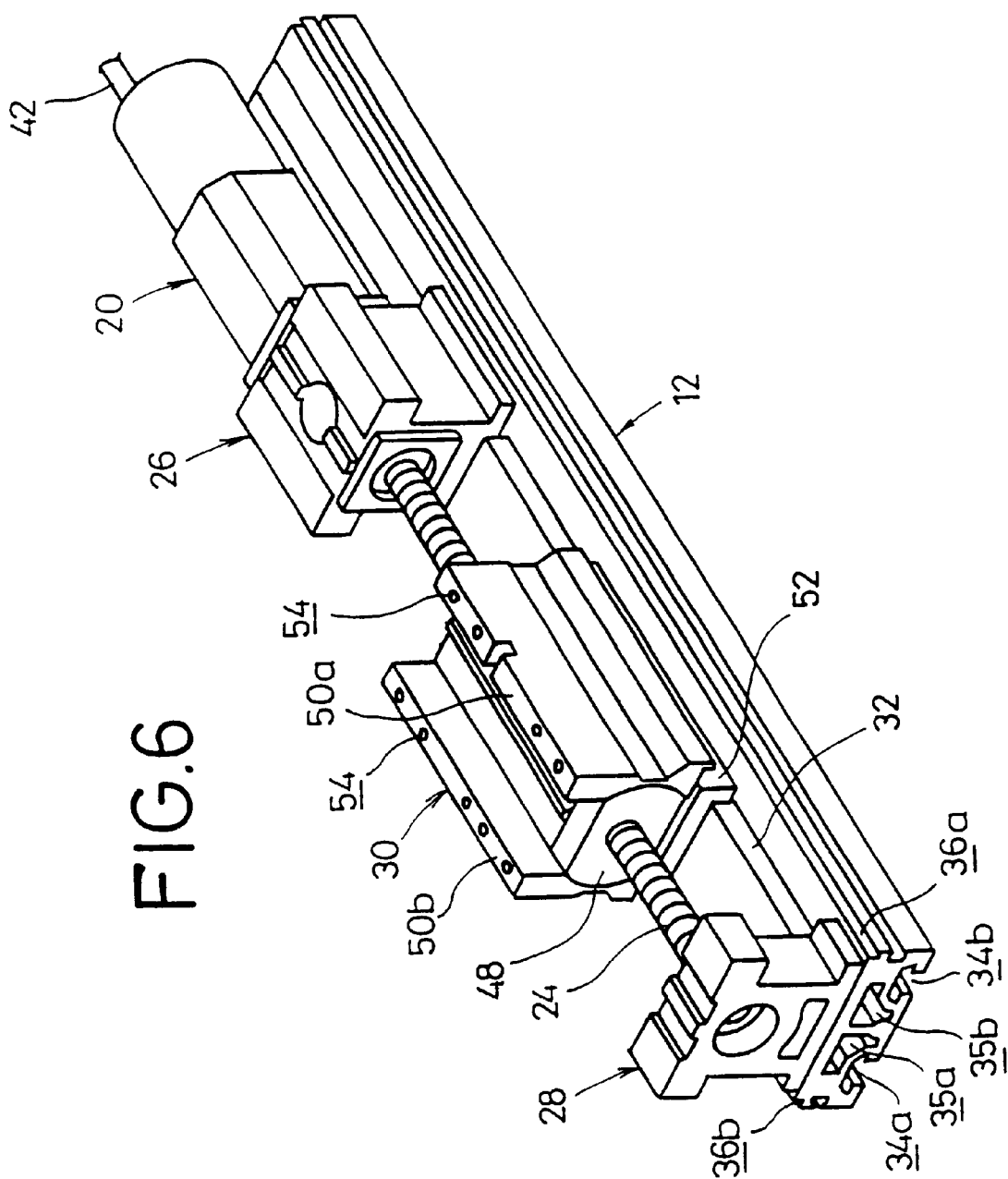
FIG. 6 is a perspective view of the actuator shown in FIG. 2, with various covers removed.

As shown in FIG. 6, the actuator 10 may be used only with the table mechanism 30, the bearing block 28, the coupling block 26, and the electric motor 20 mounted on the frame 12, while the top cover 18, the side covers 14a, 14b, and the end covers 16, 17 may be dispensed with the operator depending on the environment in which the actuator 10 is installed. The frame 12 is fixedly mounted on a member (not shown) through the grooves 34a, 34b of substantially T-shaped cross section defined in the bottom of the frame 12, and another member (not shown) is coupled to the table blocks 50a, 50b through the connecting holes 54 for conveying a workpiece, for example.

On the other hand, it is possible for the operator to select and mount a desired cover or covers on the frame 12 depending on the environment in which the actuator 10 is installed. For example, one of the side covers 14a, 14b may be selected and attached to one of the sides of the frame 12, or both side covers 14a, 14b may be selected and attached to the respective sides of the frame 12. Furthermore, one or both of the end covers 16, 17 may be selected and attached to the respective ends of the frame 12, and the top cover 18 may be mounted in place by engagement with the end covers 16, 17.

After the operator has assembled the actuator 10 by selecting a desired combination of covers, the operator energizes the electric motor 20 which is connected to a power supply (not shown) through the cable 42. The ball screw 24 is now rotated about its own axis by the rotatable shaft of the electric motor 20 which is coupled to the ball screw 24 through the coupling 22. Upon rotation of the ball screw 24, the table mechanism 30 threaded over the ball screw 24 is linearly moved on and along the ball screw 24 for thereby conveying a workpiece or the like supported on the table mechanism 30. The actuator 10 according to the first embodiment of the present invention is preferably used to convey lightweight workpieces having a weight of about 5 kg or less.

Figure 7:
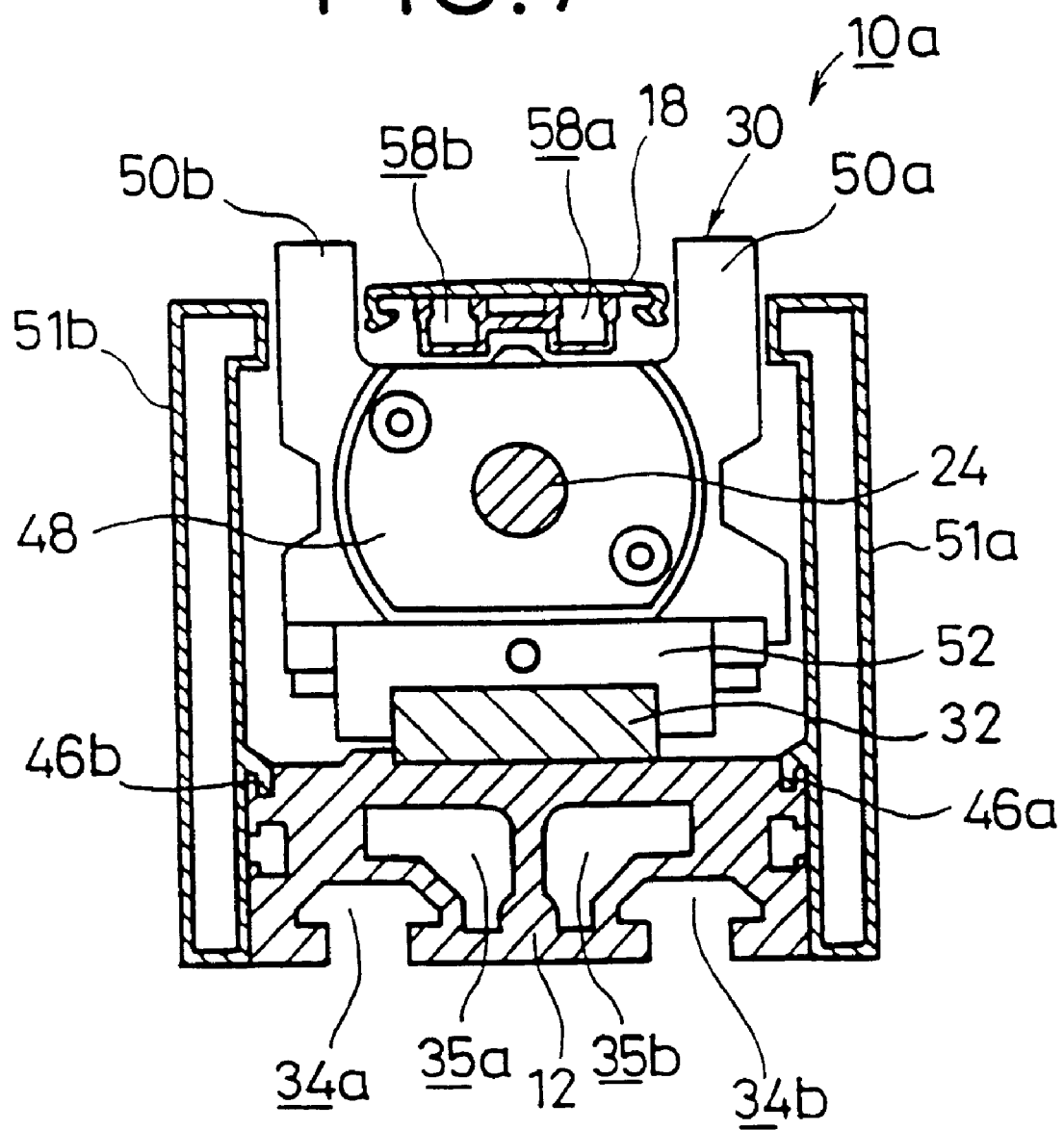
FIG. 7 is a transverse cross-sectional view of a modification of the actuator shown in FIG. 2.
Figure 8:
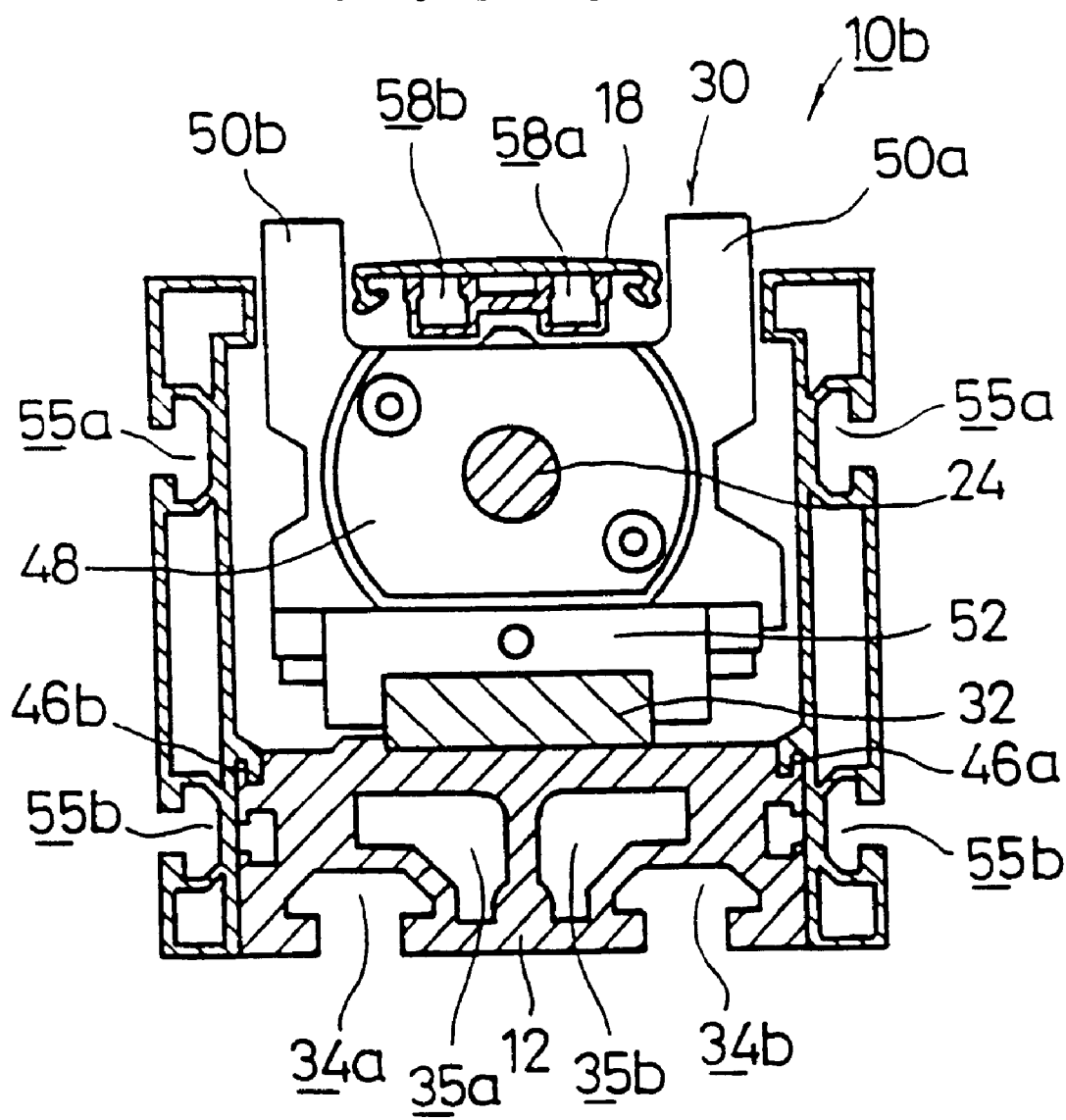
FIG. 8 is a transverse cross-sectional view of another modification of the actuator shown in FIG. 2.

Modifications of the actuator 10 according to the first embodiment are shown in FIGS. 7 and 8. In these modifications, side covers 51a, 51b and side covers 53a, 53b, which are of different shapes, are mounted on the respective frames 12, and the other structural details of the modified actuators are the same as those of the actuator 10 shown in FIGS. 2 through 5. Specifically, according to a first modification shown in FIG. 7, an actuator 10a has a pair of side covers 51a, 51b including substantially flat side surfaces and mounted on the respective side surfaces of the frame 12. According to a second modification shown in FIG. 8, an actuator 10b includes a pair of side covers 51a, 51b each having two substantially parallel long grooves 55a, 55b of substantially T-shaped cross section which are defined in outer side surfaces thereof. These long grooves 55a, 55b serve to join other members to the actuator 10b. These side covers 51a, 51b and 53a, 53b may be mounted on the frames of actuators according to other embodiments described below.

Figure 9:
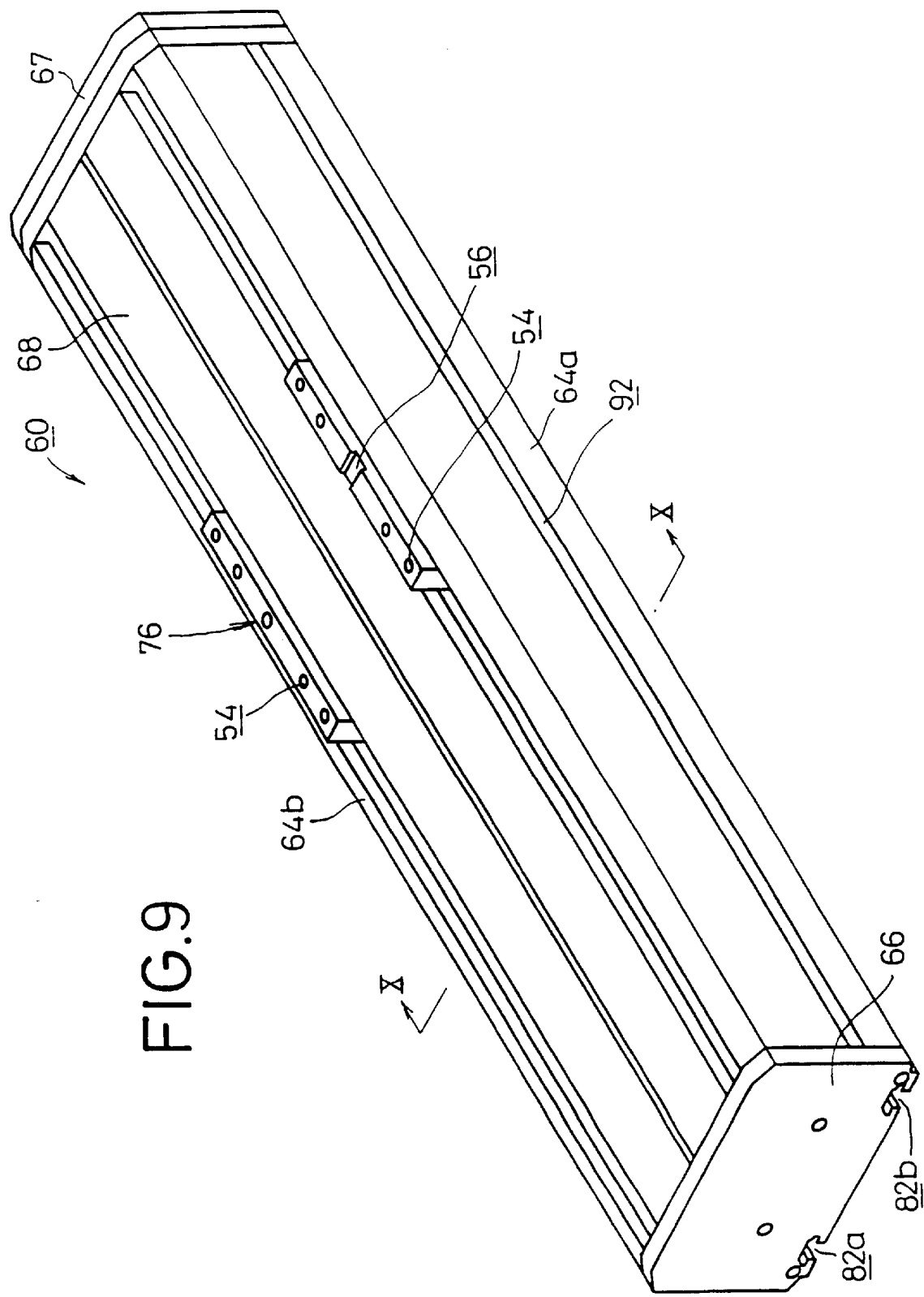
FIG. 9 is a perspective view of an actuator according to a second embodiment of the present invention.

An actuator according to a second embodiment of the present invention will be described below with reference to FIGS. 9 through 11. Those parts of the actuator shown in FIGS. 9 through 11 which have substantially the same function as those of the actuator 10 according to the first embodiment are described as such, and will not be described in greater detail.

The actuator, generally denoted at 60, has a frame 62 which is slightly wider in the transverse direction than the frame 12 shown in FIG. 3, a pair of side covers 64a, 64b mounted respectively on transverse side surfaces of the frame 62, a pair of end covers 66, 67 mounted on respective opposite longitudinal ends of the frame 62, and a top cover 68 engaging upper surfaces of the side covers 64a, 64b.

On the frame 62, there are mounted an electric motor 63, a coupling block 72 in the form of a hollow block which connects the rotatable shaft of the electric motor 63 and a ball screw 70 coaxially to each other, a bearing block 74 by which an end of the ball screw 70 is rotatably supported, and a table mechanism 76 which is threaded over the ball screw 70 for linear displacement between the coupling block 72 and the bearing block 74 in response to rotation of the ball screw 70. A pair of guides 78a, 78b for linearly guiding the table mechanism 76 as it is displaced by the ball screw 70 is mounted on the frame 62 and extends between the coupling block 72 and the bearing block 74. The guides 78a, 78*b* are fixed to the frame 62 longitudinally along and substantially parallel to respective steps 80 on the upper surface of the frame 62.

Figure 10:
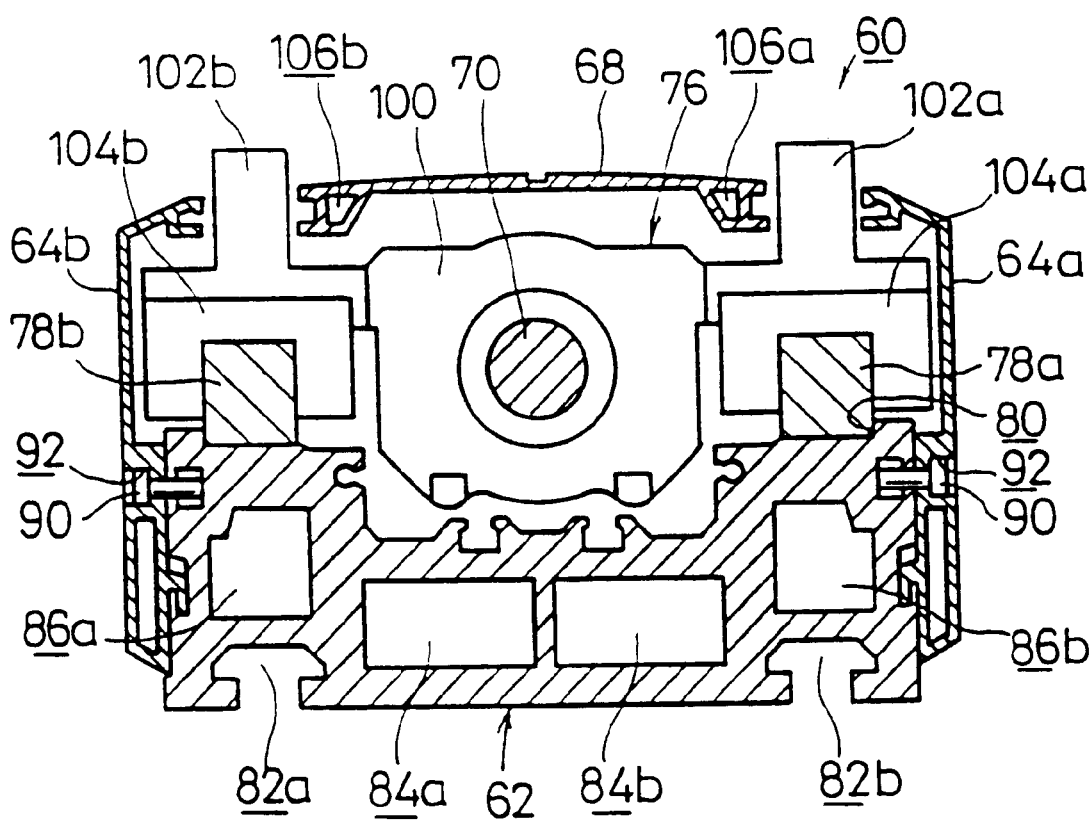
FIG. 10 is a transverse cross-sectional view taken along line X—X of FIG. 9.
Figure 11:
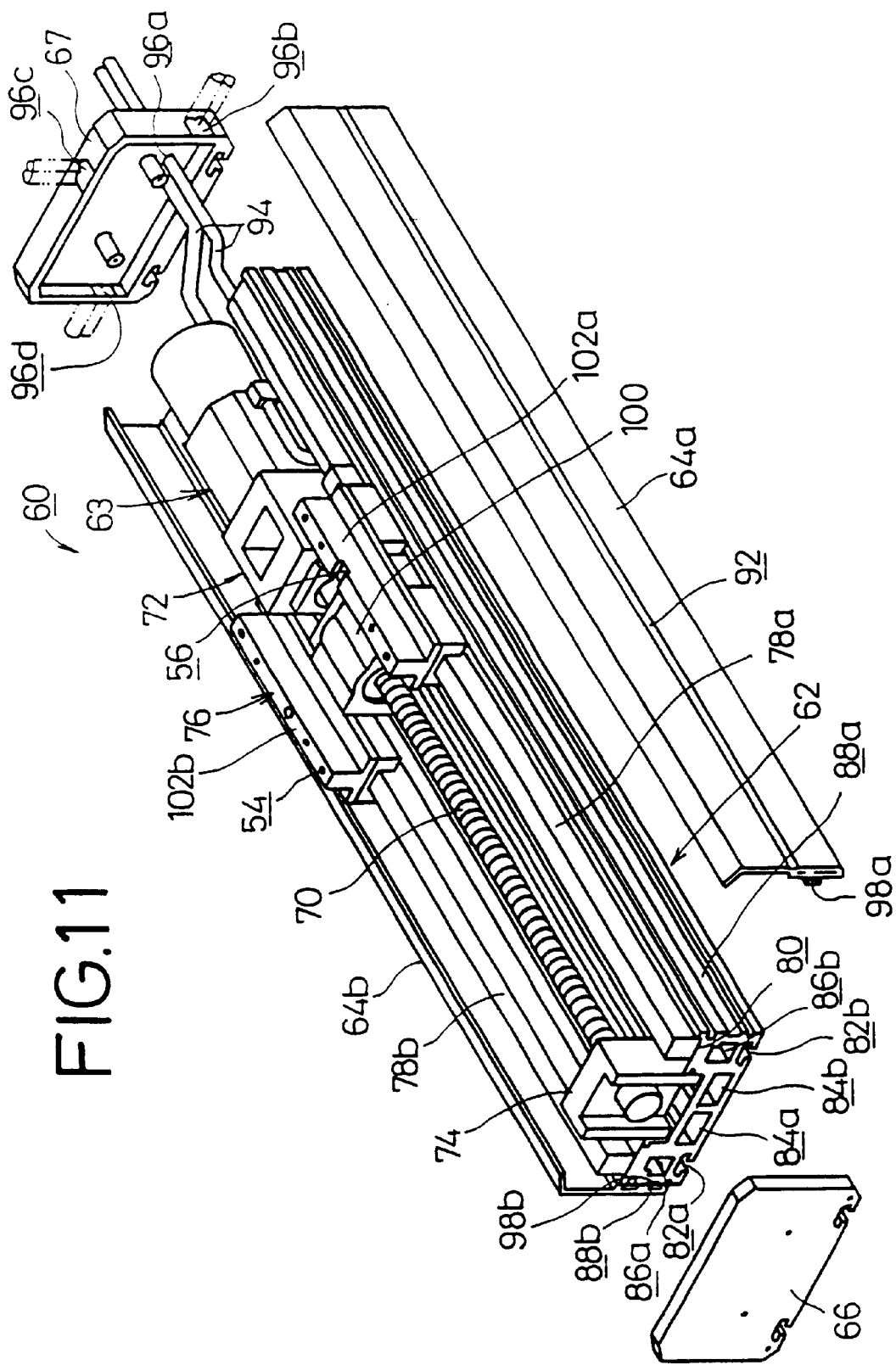
FIG. 11 is a partial exploded perspective view of the actuator shown in FIG. 9.

More specifically, as shown in FIGS. 10 and 11, the frame 62 has a pair of identical grooves 82*a*, 82*b* of substantially T-shaped cross section defined in the bottom thereof and extending substantially parallel to each other in the longitudinal direction of the frame 12, and a pair of passages 84*a*, 84*b* of substantially rectangular cross section and a pair of passages 86*a*, 86*b* of substantially square cross section defined therein between upper and lower surfaces thereof and extending substantially parallel to each other in the longitudinal direction of the frame 62. The frame 62 also has a pair of engaging grooves 88*a*, 88*b* defined longitudinally in opposite side surfaces thereof which lie perpendicularly to the bottom of the frame 62, for attachment of the side covers 64*a*, 64*b*. The frame 62 is formed by extruding or drawing a light metal. The grooves 82*a*, 82*b* defined in the bottom of the frame 62 serve to join another frame, actuator, or the like, and the passages 84*a*, 84*b*, 86*a*, 86*b* serve as wiring and fluid passages.

The end covers 66, 67 are attached to the respective longitudinal ends of the frame 62. The end cover 67 has a plurality of holes 96*a*–96*d* defined in sides thereof for drawing cables 94 therethrough. The cables 94 can be drawn from a selected one of the holes 96*a*–96*d*.

The side covers 64*a*, 64*b* have respective substantially L-shaped ridges 98*a*, 98*b* projecting on their side surfaces which engage the frame 62, the ridges 98*a*, 98*b* engaging in the respective engaging grooves 88*a*, 88*b*. The ridges 98*a*, 98*b* can be fitted into the respective engaging grooves 88*a*, 88*b* in the same manner as the first embodiment. The side covers 64*a*, 64*b* have respective long grooves 92 defined longitudinally in respective outer sides thereof opposite to the ridges 98*a*, 98*b* for passage of screws 90 therethrough for fastening the side covers 64*a*, 64*b* to the frame 62.

The table mechanism 76 comprises a ball screw bushing 100 threaded over the ball screw 70 for converting rotary motion of the ball screw 70 into linear motion, a pair of table blocks 102*a*, 102*b* fixed to respective opposite side surfaces of the ball screw bushing 100, and a pair of holders 104*a*, 104*b* of channel-shaped cross section interposed between the table blocks 102*a*, 102*b* and the guides 78*a*, 78*b* for sliding movement on the guides 78*a*, 78*b*. The table blocks 102*a*, 102*b* have connecting holes 54 defined in their upper surface for fastening another member mounted thereon. The table block 102*a* also has a positioning recess 56 defined in the upper surface thereof for accurately positioning a workpiece placed on the table mechanism 76. As shown in FIG. 10, the top cover 68 has two substantially parallel passages 106*a*, 106*b* of substantially trapezoidal cross section which are defined longitudinally in respective transverse ends of the top cover 68.

The actuator 60 offers advantages, different from those of the actuator 10, as follows:

The actuator 60 differs from the actuator 10 shown in FIG. 2 in that the frame 62 is slightly wider and hence stronger, and there are two guides 78*a*, 78*b* spaced from each other and extending substantially parallel to each other. Since the frame 62 and the guides 78*a*, 78*b* have greater rigidity, the actuator 60 can convey heavier workpieces, typically of 30 kg or less, than those that can be conveyed by the actuator 10 shown in FIG. 2.

Figure 12:
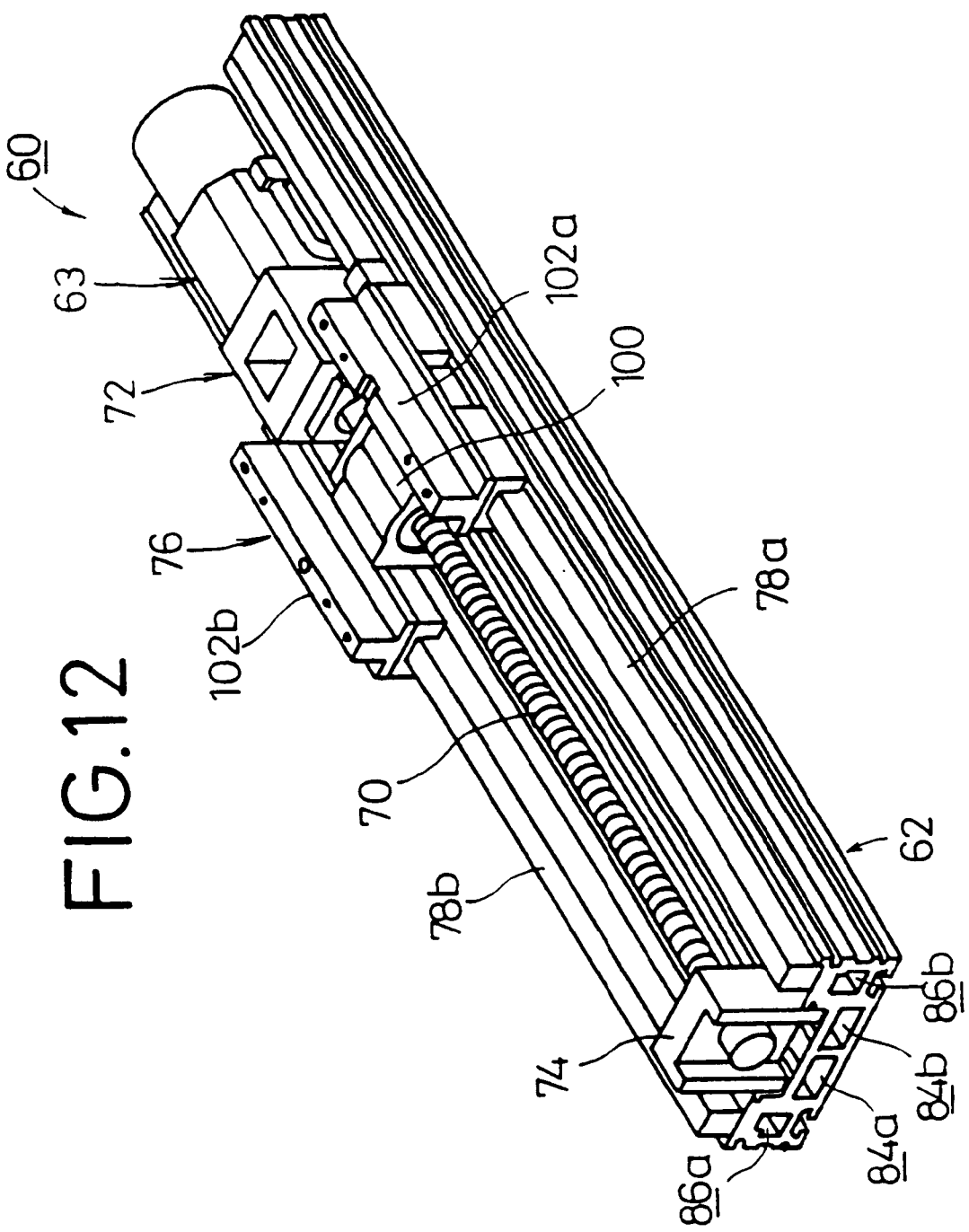
FIG. 12 is a perspective view of the actuator shown in FIG. 9, with various covers removed.
Figure 13:
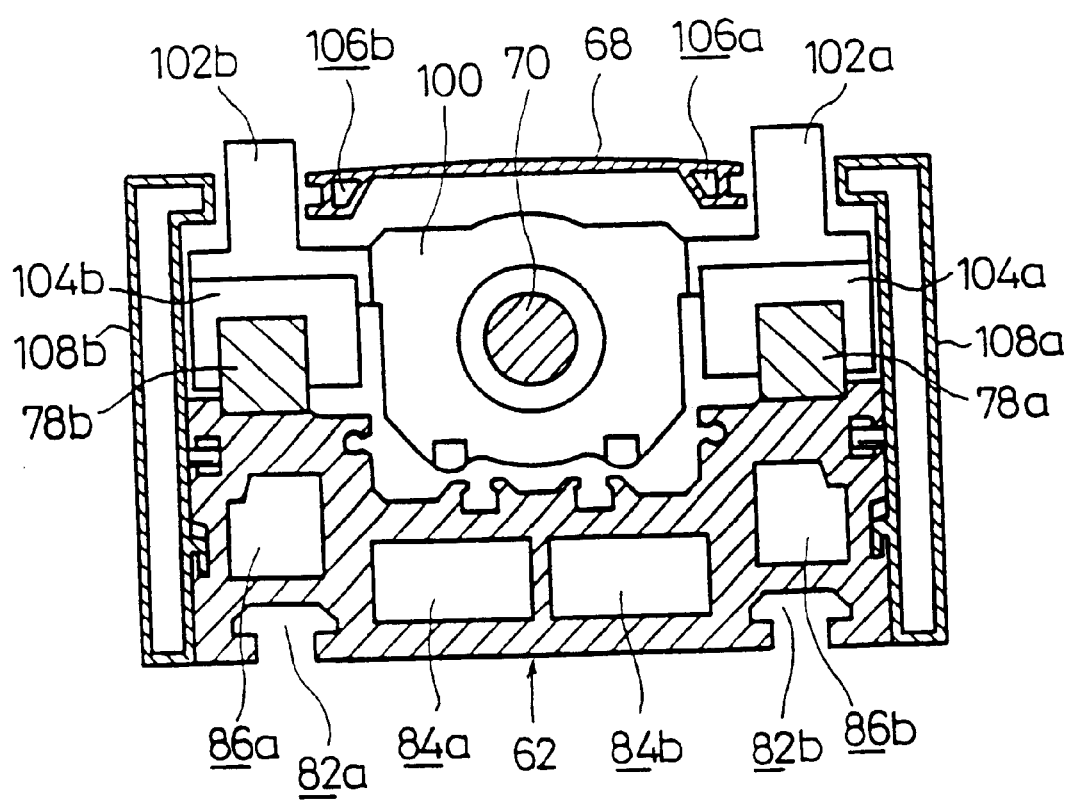
FIG. 13 is a transverse cross-sectional view of a modification of the actuator shown in FIG. 9.
Figure 14:
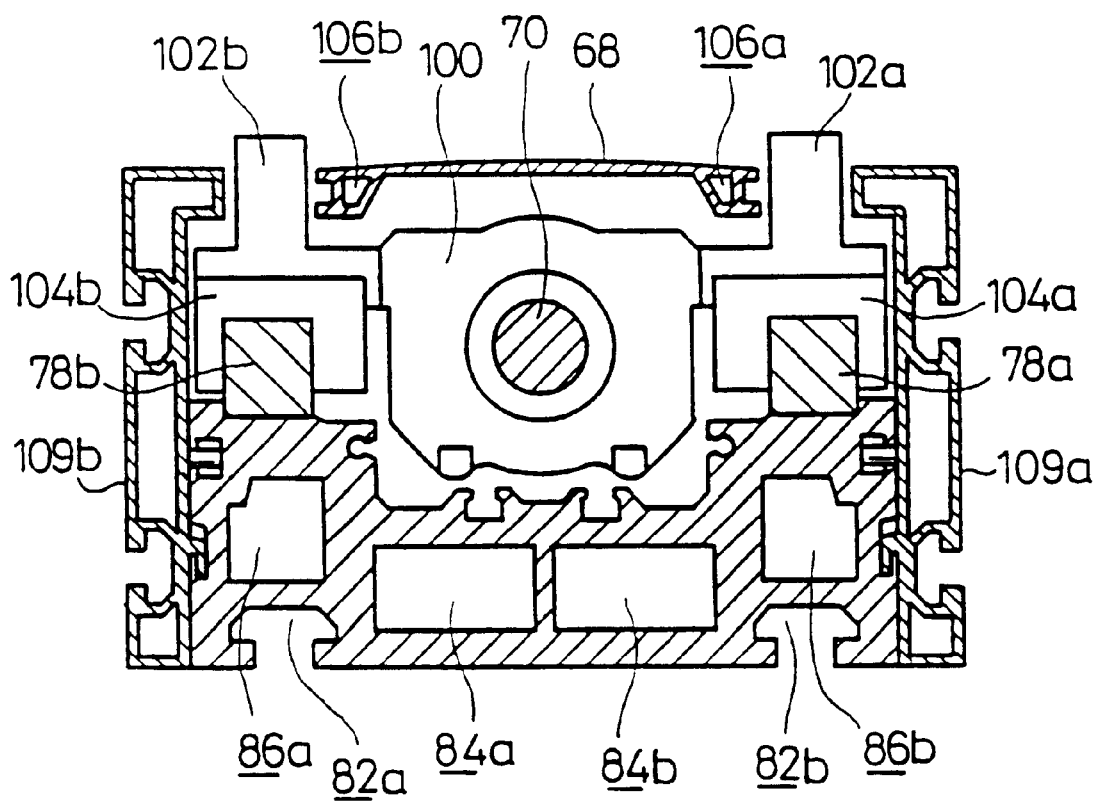
FIG. 14 is a transverse cross-sectional view of another modification of the actuator shown in FIG. 9.

The actuator 60 may be used with the side covers 64*a*, 64*b*, the end covers 66, 67, and the top cover 68 removed, as shown in FIG. 12. According to modifications of the actuator 60 as shown in FIGS. 13 and 14, side covers 108*a*, 108*b* and side covers 109*a*, 109*b*, which are of different shapes, may be mounted on the respective frames 62.

Figure 15:
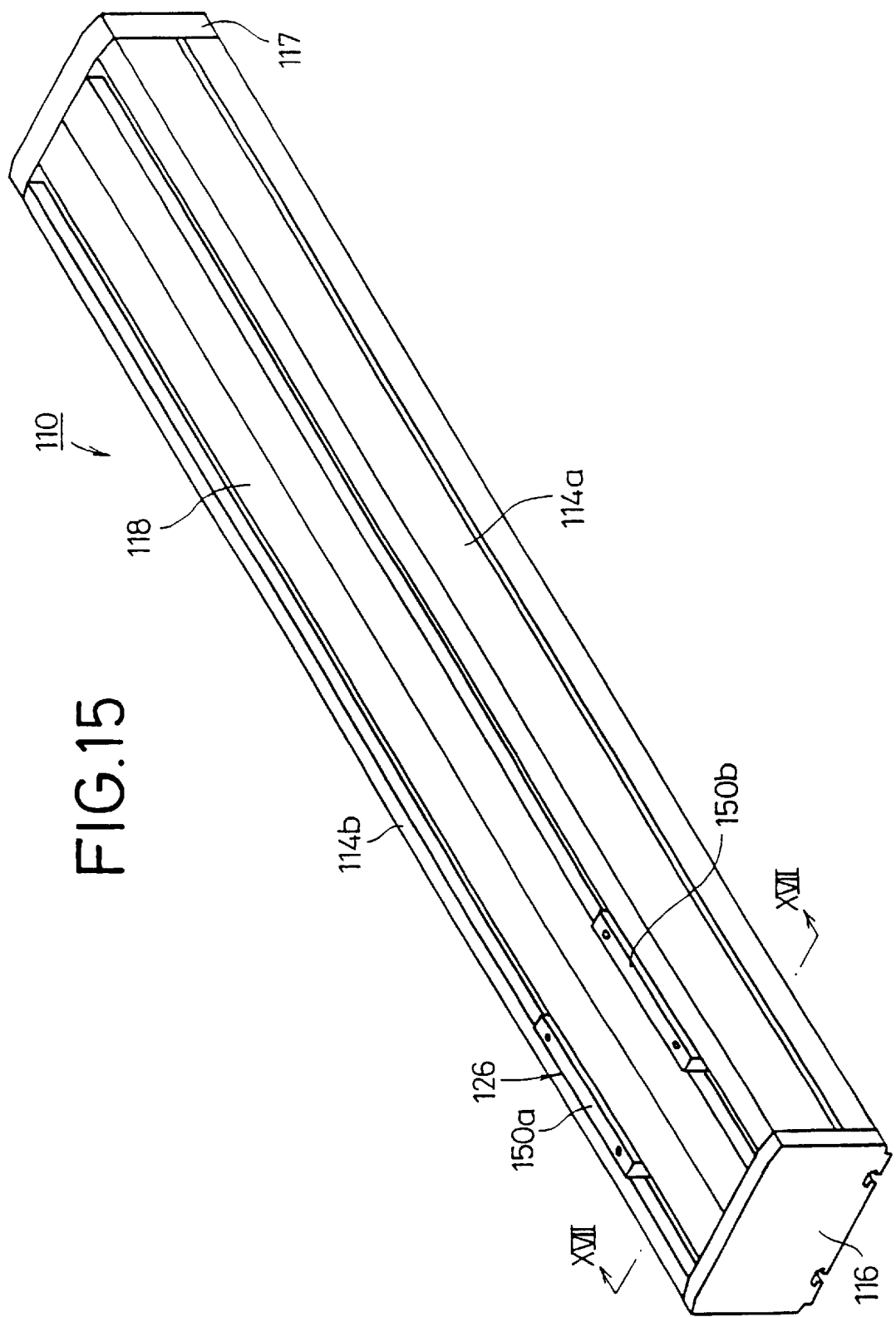
FIG. 15 is a perspective view of an actuator according to a third embodiment of the present invention.
Figure 16:
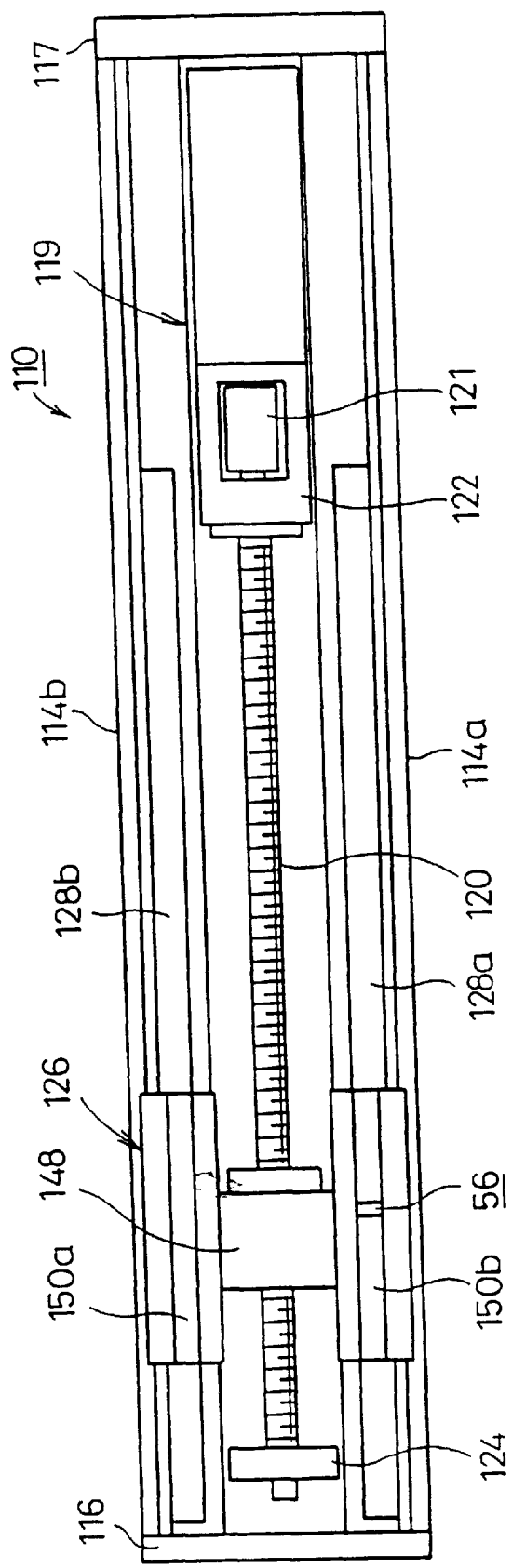
FIG. 16 is a plan view of the actuator shown in FIG. 15, with a top cover being open.
Figure 17:
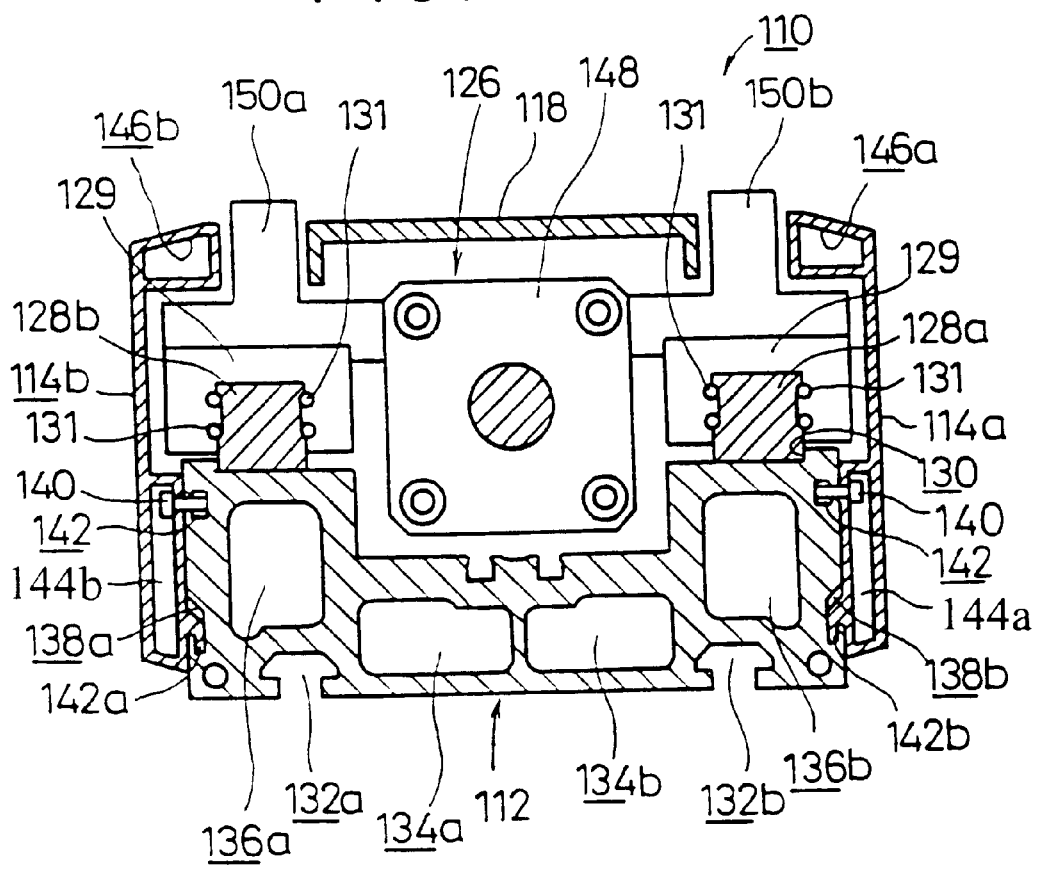
FIG. 17 is a transverse cross-sectional view taken along line XVII—XVII of FIG. 15.

An actuator according to a third embodiment of the present invention is shown in FIGS. 15 through 17. The actuator, generally denoted at 110, has a frame 112 which is of a rugged structure as with the frame 62 shown in FIG. 11, a pair of side covers 114*a*, 114*b* mounted respectively on transverse side surfaces of the frame 112, a pair of end covers 116, 117 mounted on respective opposite longitudinal ends of the frame 112, and a top cover 118 engaging upper surfaces of the side covers 114*a*, 114*b*.

On the frame 112, there are mounted an electric motor 119, a coupling block 122 in the form of a hollow block which has a coupling 121 that connects the rotatable shaft of the electric motor 119 and a ball screw 120 coaxially to each other, a bearing block 124, and a table mechanism 126. A pair of guides 128*a*, 128*b* for linearly guiding the table mechanism 126 as it is displaced by the ball screw 120 is mounted on the frame 112 and extends between the coupling block 122 and the bearing block 124. The guides 128*a*, 128*b* are fixed to the frame 112 longitudinally along and substantially parallel to respective steps 130 on the upper surface of the frame 62. A plurality of bearings 131 are disposed between the guides 128*a*, 128*b* and holders 129*a*, 129*b* of substantially channel-shaped cross section which are fitted over the guides 128*a*, 128*b*.

The frame 112 has a pair of identical grooves 132*a*, 132*b* of substantially T-shaped cross section defined in the bottom thereof and extending substantially parallel to each other in the longitudinal direction of the frame 12, and a pair of passages 134*a*, 134*b* of substantially rectangular cross section and a pair of passages 136*a*, 136*b* of substantially rectangular cross section defined therein and extending substantially parallel to each other in the longitudinal direction of the frame 112. The passages 134*a*, 134*b* and the passages 136*a*, 136*b* are arranged in axial symmetry. The frame 112 also has a pair of engaging grooves 138*a*, 138*b* defined longitudinally in opposite side surfaces thereof which lie perpendicularly to the bottom of the frame 112, for attachment of the side covers 114*a*, 114*b*, and a pair of long grooves 142 defined in the opposite side surfaces thereof for inserting screws 140 therein.

The side covers 114*a*, 114*b* have respective substantially L-shaped ridges 142*a*, 142*b* projecting on their side surfaces which engage the frame 112, the ridges 142*a*, 142*b* engaging in the respective engaging grooves 138*a*, 138*b*. The ridges 142*a*, 142*b* can be fitted into the respective engaging grooves 138*a*, 138*b* in the same manner as the first embodiment. The side covers 114*a*, 114*b* have respective pairs of passages 144*a*, 144*b*, 146*a*, 146*b* defined in upper and lower ends thereof and extending substantially parallel to each other in the longitudinal direction of the side covers 114*a*, 114*b*.

The table mechanism 126 comprises a ball screw bushing 148 threaded over the ball screw 120 for converting rotary motion of the ball screw 120 into linear motion, a pair of table blocks 150*a*, 150*b* fixed to respective opposite side surfaces of the ball screw bushing 148, and a pair of holders 129*a*, 129*b* interposed between the table blocks 150*a*, 150*b* and the guides 128*a*, 128*b* for sliding movement on the guides 128*a*, 128*b*. A plurality of bearings 131 are disposed between mating surfaces of the holders 129*a*, 129*b* and the guides 128*a*, 128*b* for reducing friction resistance between.

The table blocks 150*a*, 150*b* have connecting holes 54 defined in their upper surface for fastening another member mounted thereon. The table block 150b also has a positioning recess 56 defined in the upper surface thereof for accurately positioning a workpiece placed on the table mechanism 126. Pairs of side covers of different shapes as shown in FIGS. 7 and 8 may selectively be mounted on the frame 112.

The actuators 10, 60 according to the first and second embodiments, respectively, and the actuator 110 according to the third embodiment have various functions which are shown, for comparison, in FIG. 18.

As shown in FIG. 18, the actuator 110 employs the frame 112 which is highly rigid and the bearings 131 for reducing frictional resistance, and the electric motor 119 for displacing the table mechanism 126 has an output power ranging from 200 to 240 W. The actuator 110 can thus convey workpieces having a weight (movable load) up to 60 kg, and has a stroke up to a maximum of 1000 mm.

The operator can select an optimum one of the actuators 10, 60, 110 depending on the application, and can select and install any of various covers on the frame depending on the environment in which the selected actuator is installed.

FIGS. 19 through 23 show an actuator 160 according to a fourth embodiment of the present invention. The actuator 160 is different from the actuator 10 shown in FIG. 2 in that a timing belt is employed in place of the ball screw for linearly moving a table mechanism.

Figure 19:
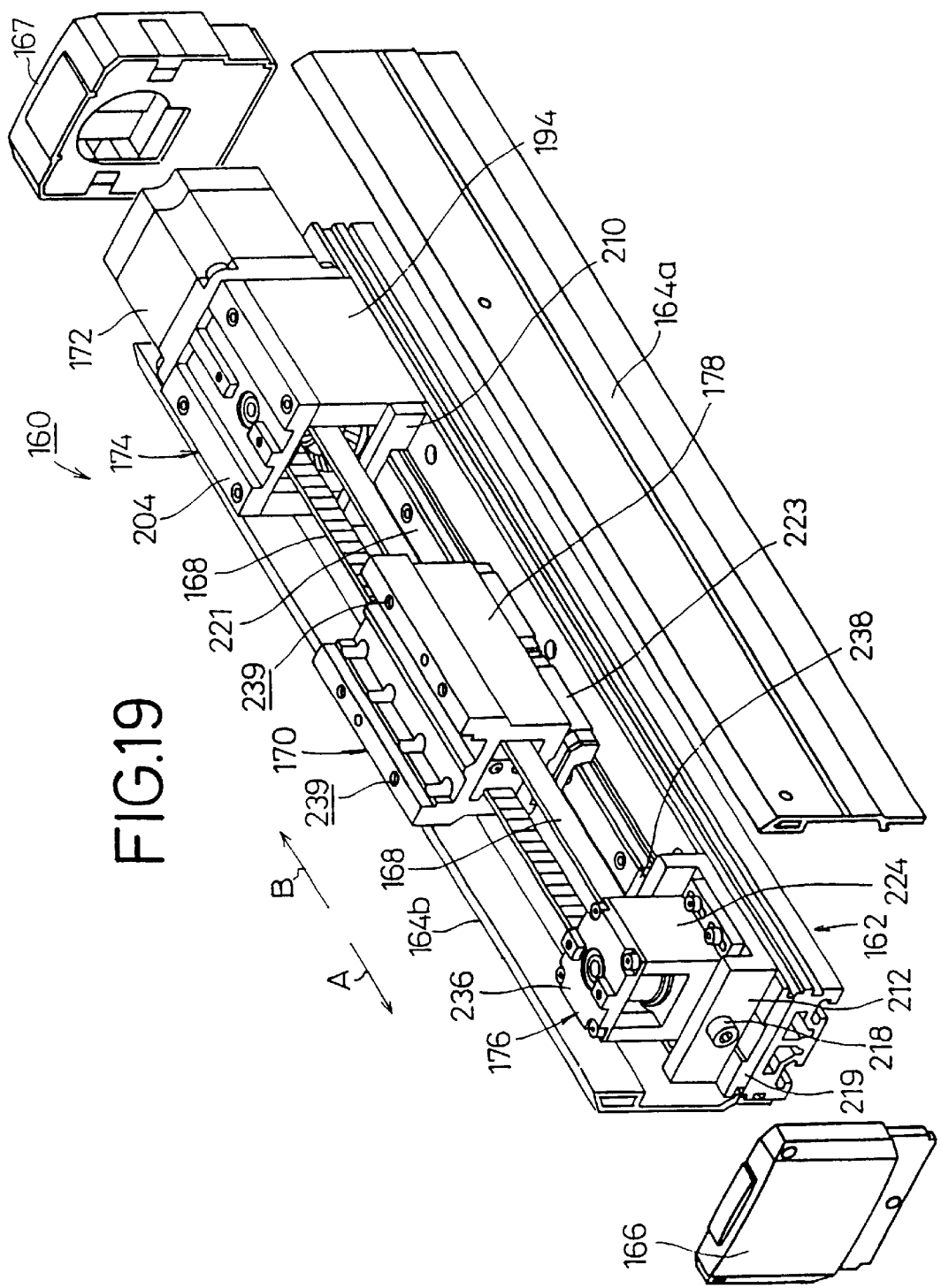
FIG. 19 is a partial exploded perspective view of an actuator according to a fourth embodiment of the present invention.
Figure 20:
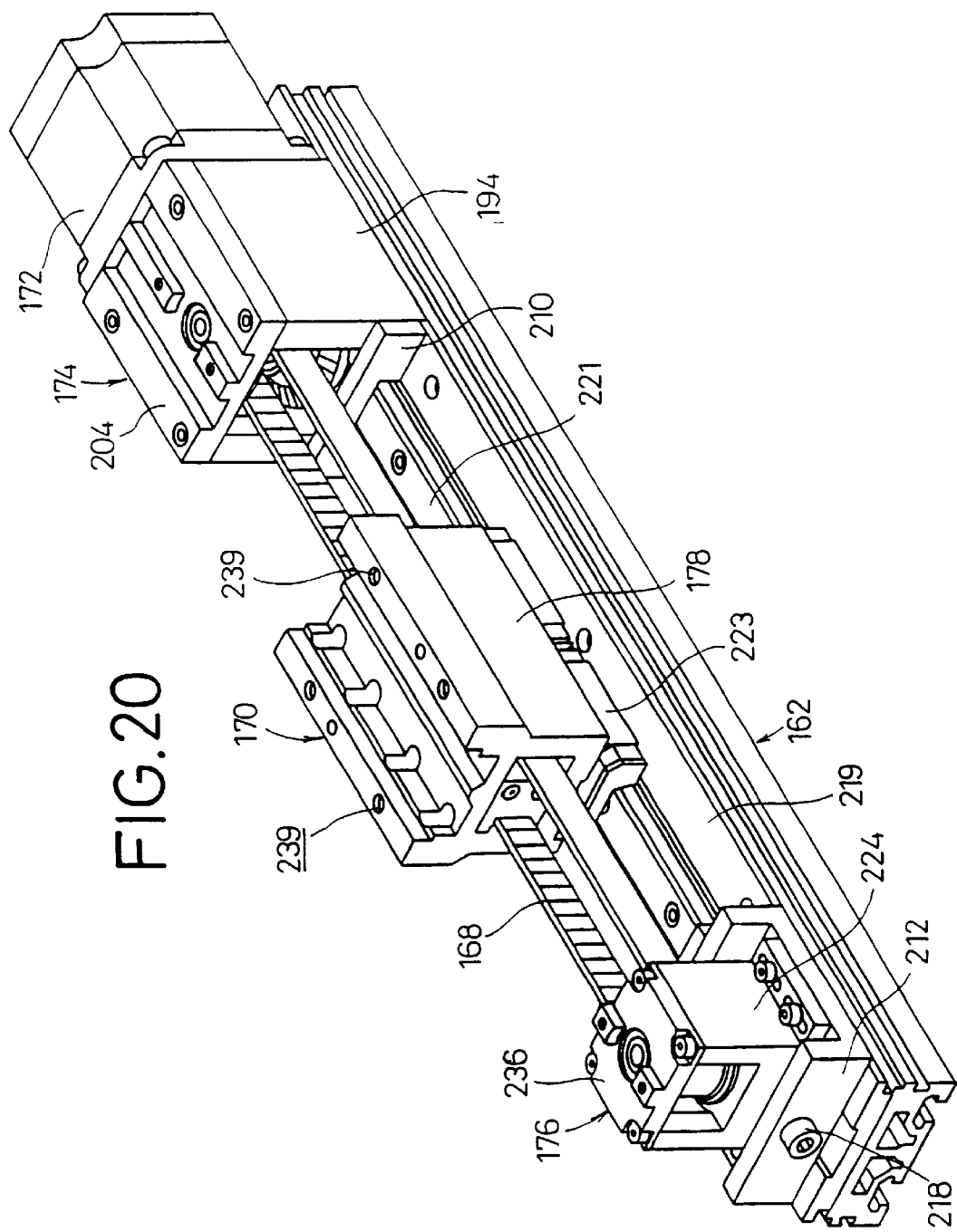
FIG. 20 is a perspective view, partly omitted from illustration, of the actuator shown in FIG. 19.

As shown in FIGS. 19 and 20, the actuator 160 has an elongate frame 162, a pair of side covers 164a, 164b mounted on the frame 162, a pair of end covers 166, 167 mounted on the frame 162, a table mechanism 170 linearly movable on the frame 162 by a timing belt 168, a motor pulley unit 174 mounted on one end of the frame 162 and having an electric motor 172 for moving the timing belt 168, and an idle pulley unit 176 mounted on the other end of the frame 162 and engaging the timing belt 168. The side covers 164a, 164b, the end covers 166, 167, and a top cover (not shown) are identical in structure to and can be mounted in the same manner as those of the first embodiment, and hence will not be described in detail below.

Figure 21A:
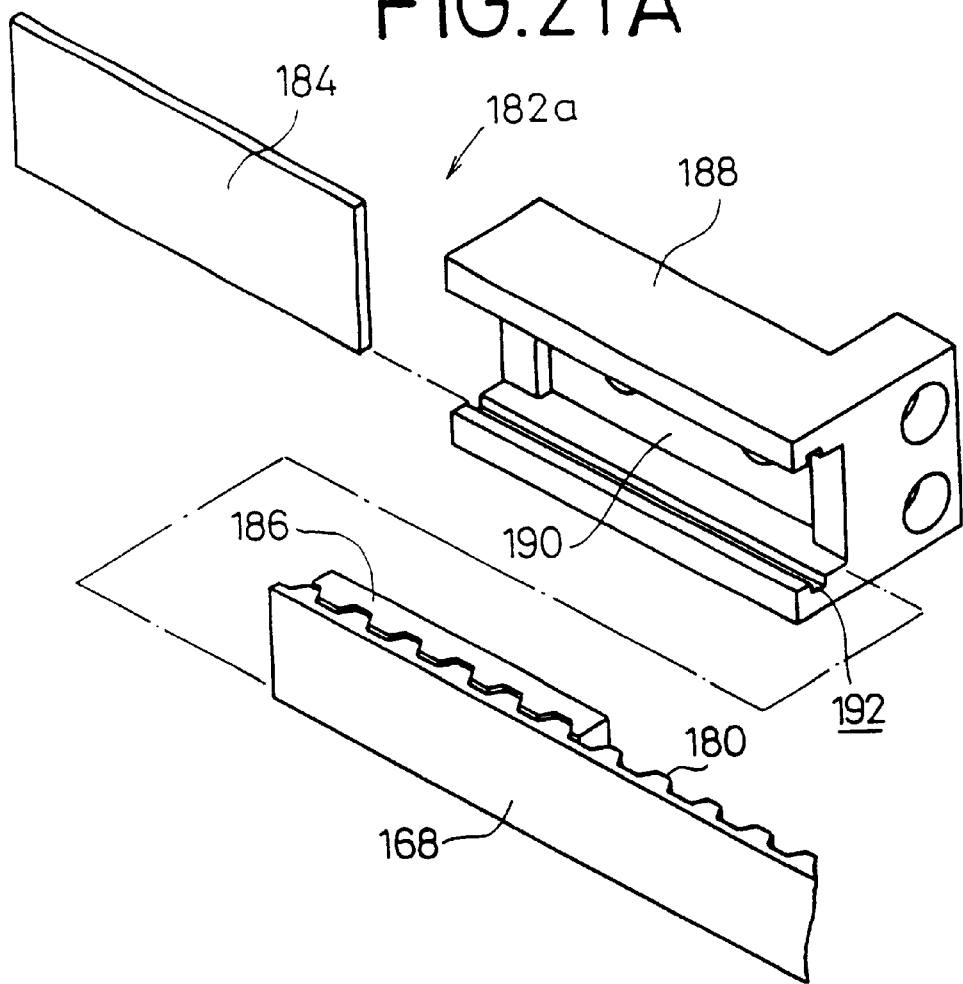
FIGS. 21A and 21B are views illustrating timing belt gripping means, respectively.
Figure 21B:
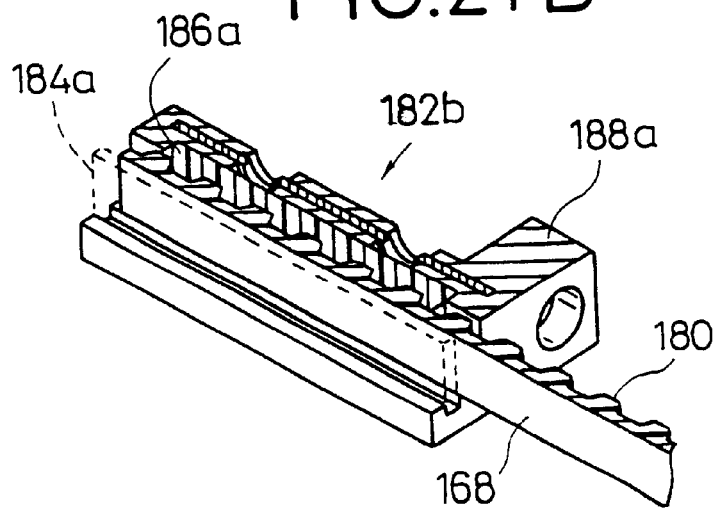

The table mechanism 170 includes a table block 178 which houses, as shown in FIGS. 21A and 21B, a pair of gripping means 182a, 182b meshing with and gripping ends of the timing belt 168 which has belt teeth 180 at a predetermined pitch. The timing belt 168 has a starting end and a terminal end which are spaced from each other and gripped respectively by the gripping means 182a, 182b. As shown in FIG. 21A, the gripping means 182a has a first flat plate 184 engaging a side surface of the timing belt 168, and a second toothed plate 186 with its teeth held in mesh with the belt teeth 180 of the timing belt 168. The first flat plate 184 and the second toothed plate 186 are mounted respectively in a groove 192 and a recess 190 that are defined in a block 188, thereby gripping an end of the timing belt 168. As shown in FIG. 21B, the gripping means 182b has a first flat plate 184a engaging a side surface of the timing belt 168, and a second toothed plate 186a with its teeth held in mesh with the belt teeth 180 of the timing belt 168. The first flat plate 184a and the second toothed plate 186a are mounted in a block 188a, thereby gripping the other end of the timing belt 168. While the timing belt 168 is described as a drive force transmitting member for transmitting drive forces from the electric motor 172 in this embodiment, the drive force transmitting member may comprise a steel belt, a chain, a wire rope, or the like. For positioning a workpiece more accurately, a ball screw, a string screw, a trapezoidal screw, or the like may be used as the drive force transmitting member.

Figure 22:
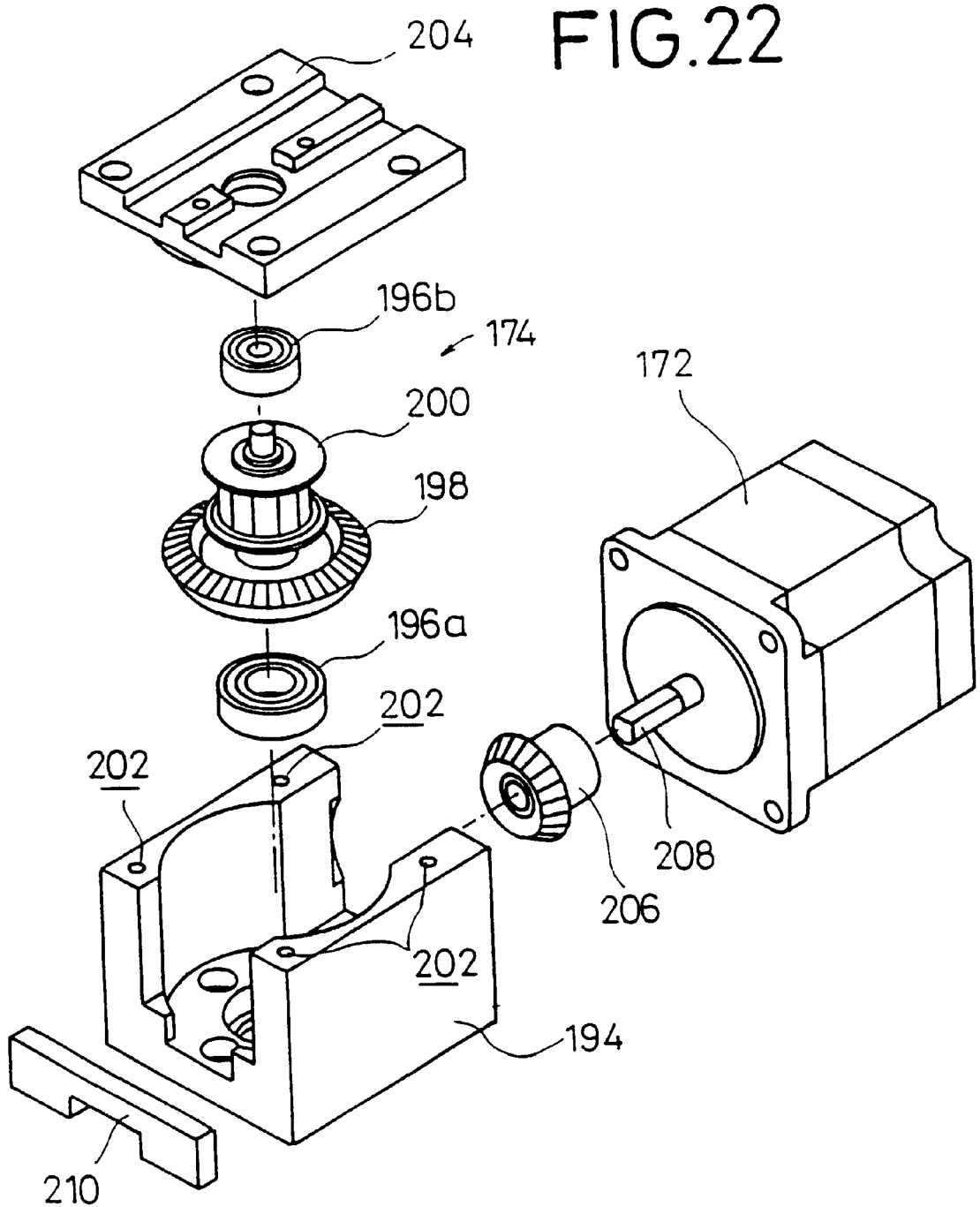
FIG. 22 is an exploded perspective view of a motor pulley unit incorporated in the actuator shown in FIG. 19.

As shown in FIG. 22, the motor pulley unit 174 comprises a gear box 194 having a cavity defined therein, a first bevel gear 198 rotatably disposed in the cavity by bearings 196a, 196b and having gear teeth on a slanted surface, a pulley 200 connected to the first bevel gear 198 by a shaft and supporting the timing belt 168, a gear box cover 204 fastened to the gear box 194 through holes defined in the four corners of the gear box 194, and the electric motor 172 which is coupled to a side surface of the gear box 194 and having a motor shaft 208 that supports a second bevel gear 206 held in mesh with the first bevel gear 198.

The motor shaft 208 of the electric motor 172 on which the second bevel gear 206 is mounted and the shaft of the pulley 200 which supports the first bevel gear 198 extend perpendicularly or obliquely to each other. The first and second bevel gears 198, 206 that are held in mesh with each other may have different or identical speed ratios. The motor pulley unit 174 including the electric motor 172 does not project out of the top cover of the actuator 160.

A damper 210 is mounted on a side surface of the gear box 194 remote from the electric motor 172 for dampening shocks produced when the table block 178 hits the motor pulley unit 174. The gear box 194 and the electric motor 172 are preferably integral with each other to keep the first and second bevel gears 198, 206 in accurate mesh with each other. The electric motor 172 should preferably comprise a servomotor or a stepping motor for accurate synchronous operation and positional control.

Figure 23:
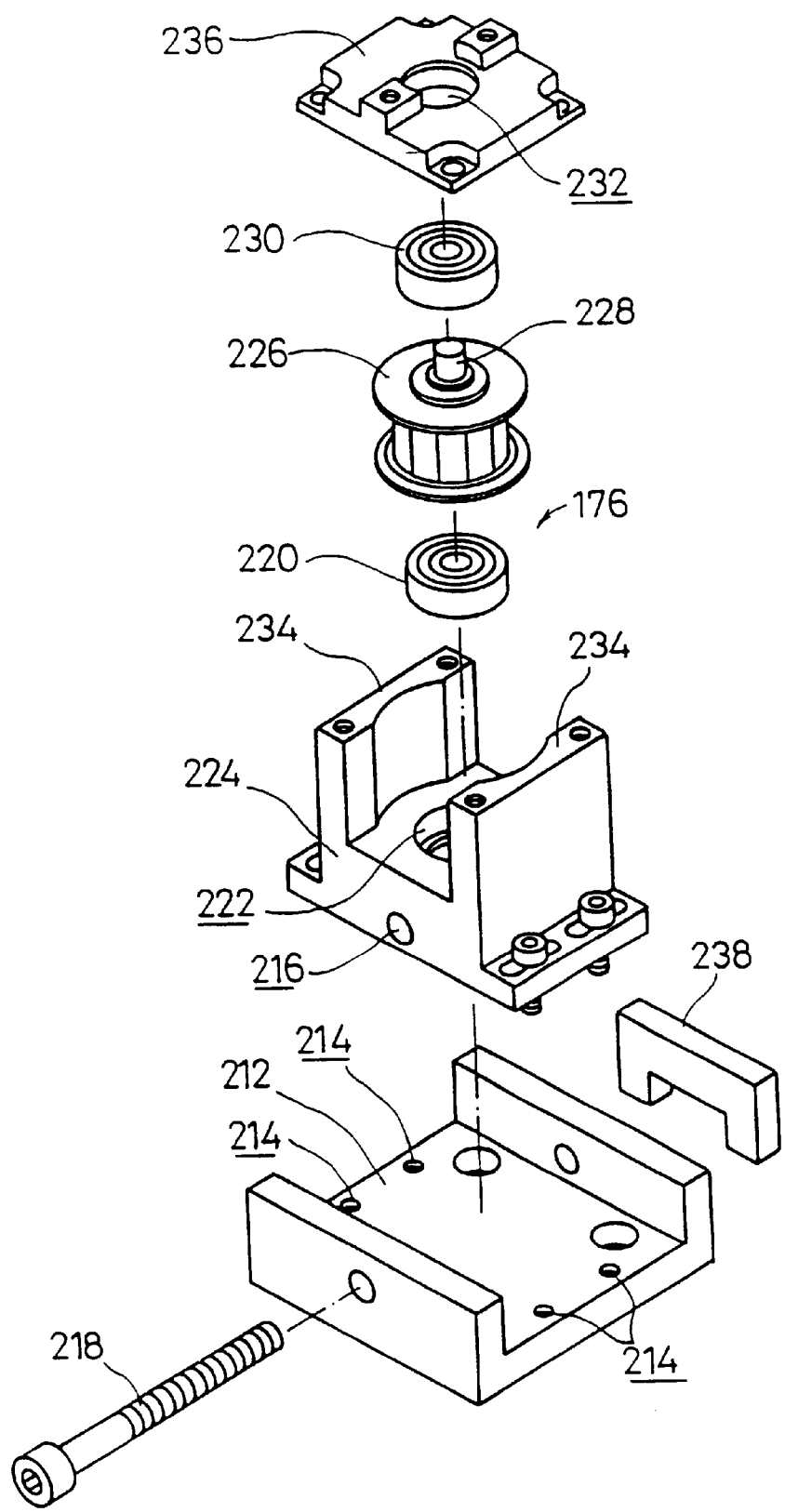
FIG. 23 is an exploded perspective view of an idle pulley unit incorporated in the actuator shown in FIG. 19.
Figure 24:
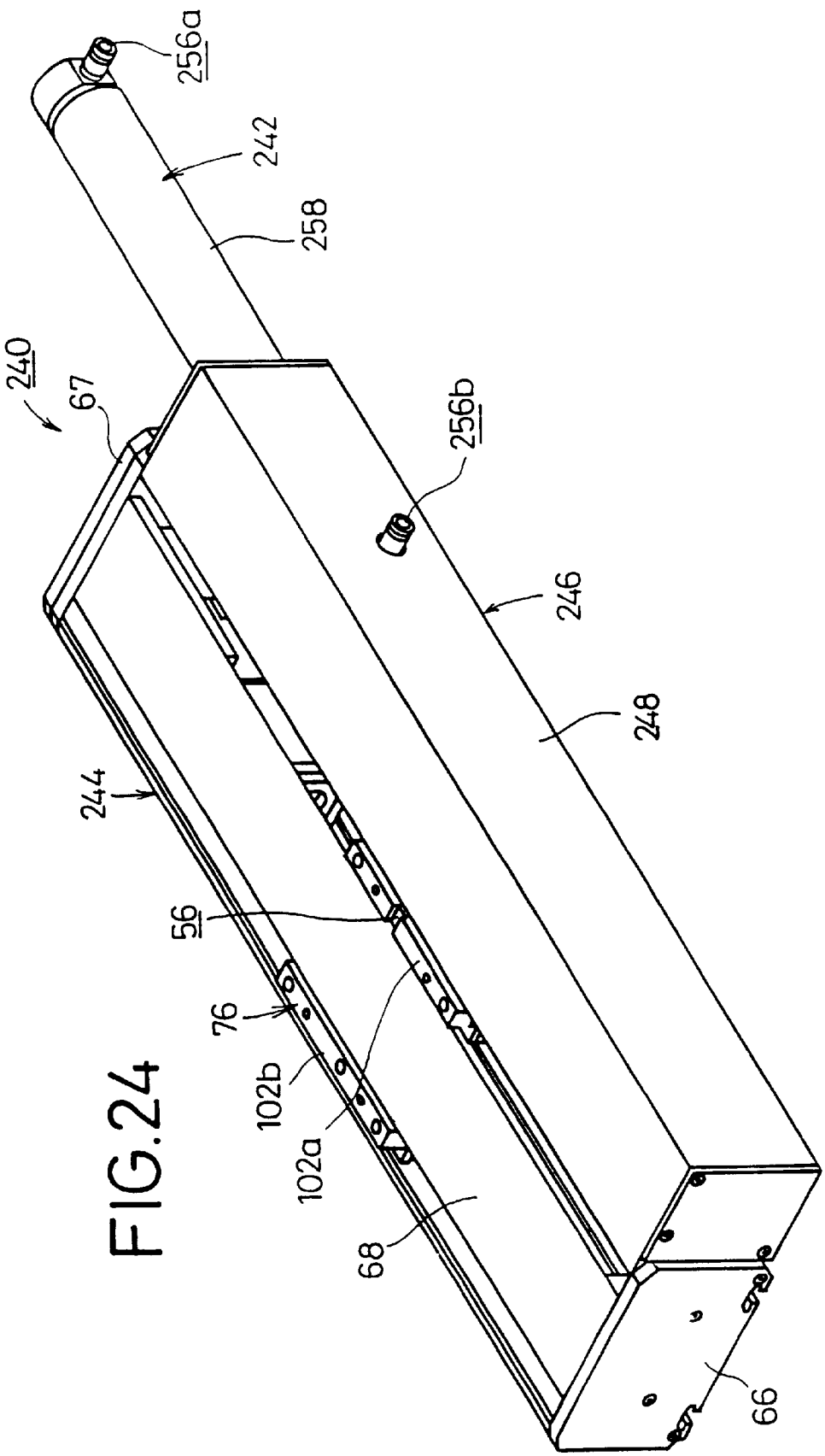
FIG. 24 is a perspective view of an actuator according to a fifth embodiment of the present invention.
Figure 25:
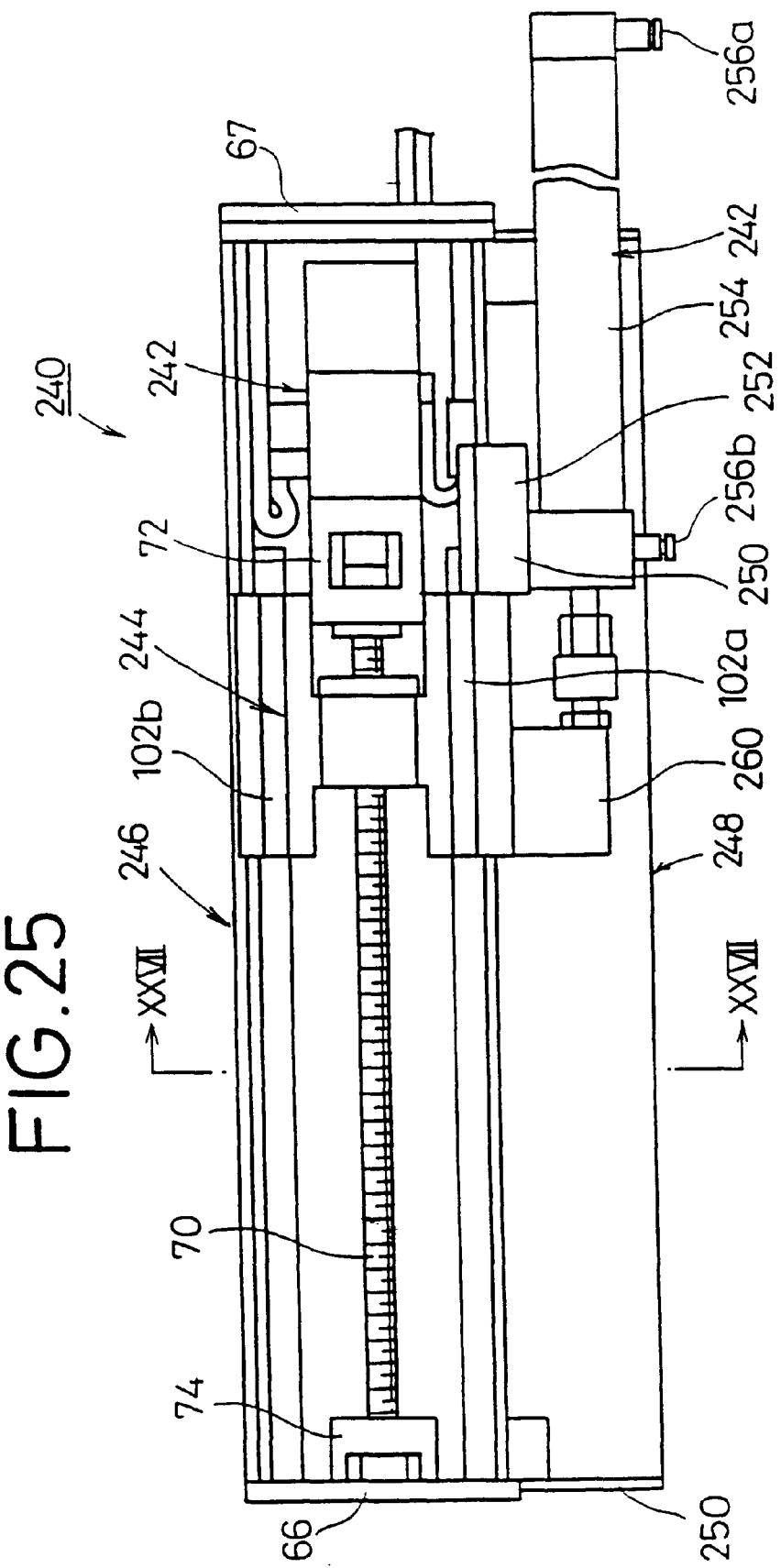
FIG. 25 is a plan view of the actuator shown in FIG. 24, with a top cover being open.
Figure 26:
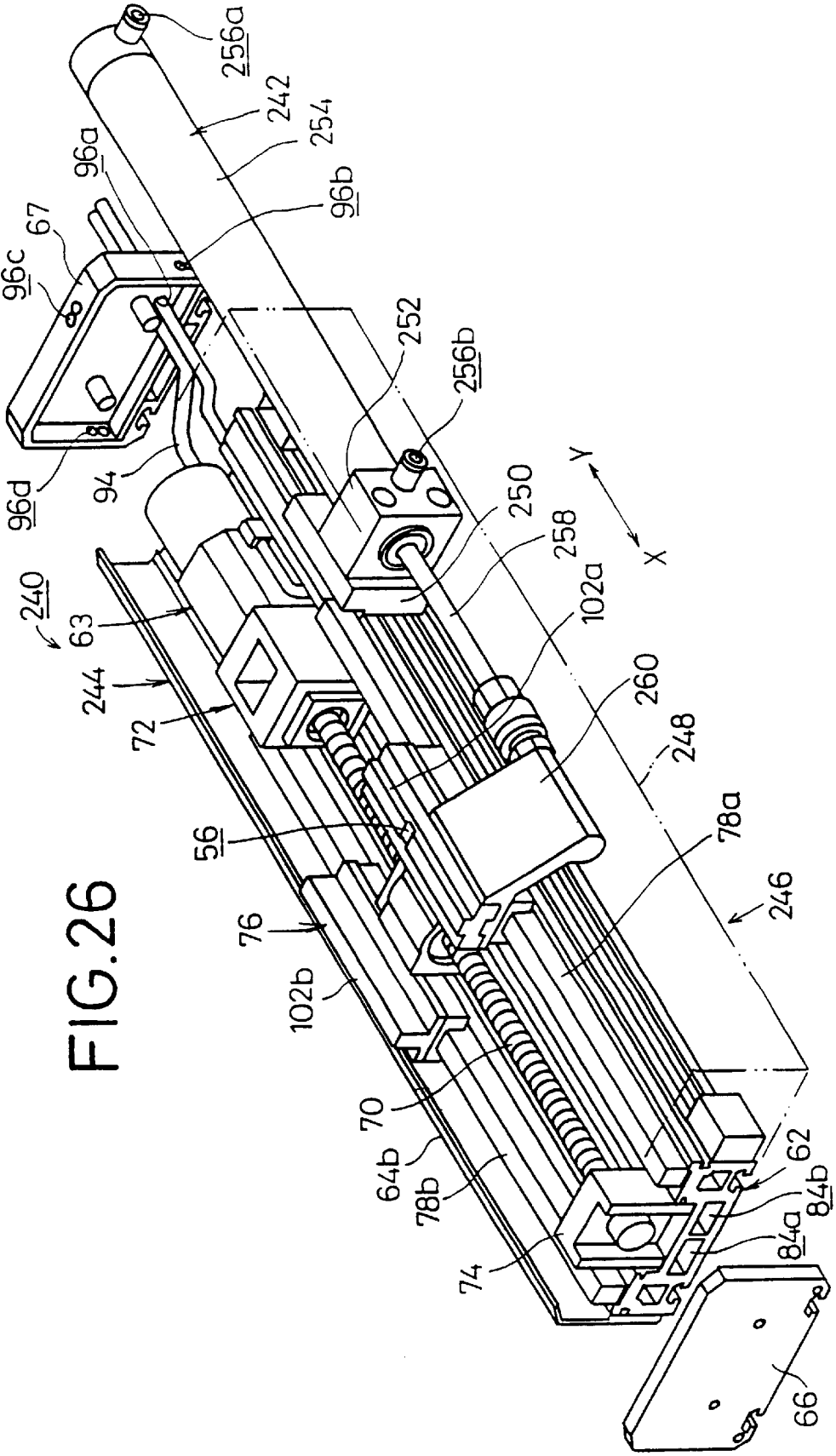
FIG. 26 is a partial exploded perspective view of the actuator shown in FIG. 24.
Figure 27:
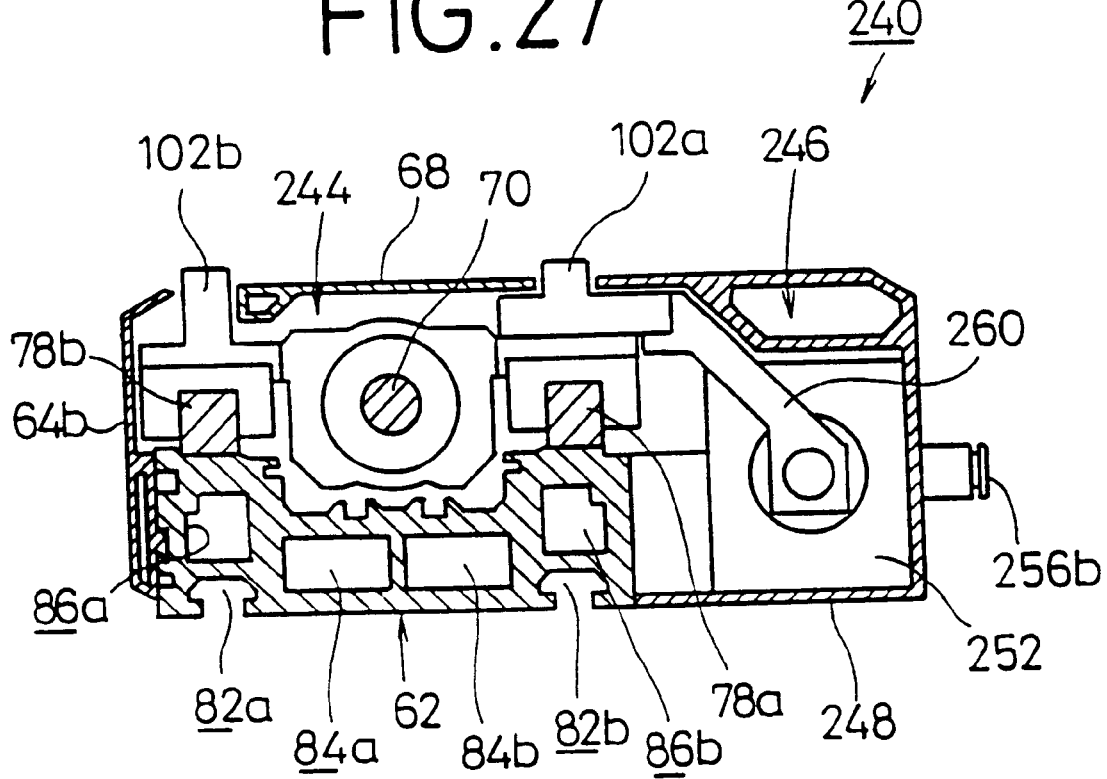
FIG. 27 is a transverse cross-sectional view taken along line XXVII—XXVII of FIG. 25.

The idle pulley unit 176 is aligned with and positioned in confronting relation to the motor pulley unit 174 with the table mechanism 170 disposed therebetween. As shown in FIG. 23, the idle pulley unit 176 comprises a pulley base 212 and a pulley box 224 fastened to the pulley base 212 through holes 214 defined in an upper surface of the pulley base 212. The pulley box 224 is coupled to the pulley base 212 by a bolt 218 inserted through the pulley base 212 into a hole 216 defined in a side of the pulley box 224. The pulley box 24 has a circular through hole 222 defined substantially centrally in its bottom and housing a bearing 220 therein. The idle pulley unit 176 also comprises a pulley 226 rotatably disposed in the pulley box 224 by a shaft through the bearing 220 and supporting the timing belt 168, and a pulley box cover 236 fastened to substantially parallel walls 234 of the pulley box 224 and having a substantially central circular hole 232 defined therein which houses a bearing 230 engaging a shaft 228 projecting upwardly from the pulley 226. The pulley 226 is therefore rotatably supported between the pulley box 224 and the pulley box cover 236. A damper 238 is held against a ledge on the pulley base 212 for abutting engagement with the table block 178.

The bolt 218 serves to adjust the tension of the timing belt 168. The tension of the timing belt 168 is adjusted by fastening the pulley box 224 loosely to the pulley base 212 by screws through the holes 214, turning the bolt 218 to move the pulley box 224 parallel to the bolt 218 thereby adjusting the tension of the timing belt 168, and then tightening the screws into the holes 214 to anchor the pulley box 224 to the pulley base 212.

As shown in FIG. 19, the motor pulley unit 174 and the idle pulley unit 176 are mounted on the respective longitudinally opposite ends of the frame 162 by a base plate 219, and the timing belt 168 is trained around the pulleys 200, 226 of the motor pulley unit 174 and the idle pulley unit 176. The table block 178 is positioned intermediate between the motor pulley unit 174 and the idle pulley unit 176 for movement in the direction indicated by the arrow A or B in response to operation of the timing belt 168. A slider 223 is mounted on the bottom of the table block 178 for sliding movement along a linear guide 221 which is mounted on the base plate 219.

Operation of the actuator 160 will be described below.

The timing belt 167 is trained around the motor pulley unit 174 to which the electric motor 172 is coupled, and the idle pully unit 176 and connected to the table block 178. The motor pulley unit 174 and the idle pulley unit 176 are fixedly mounted on the frame 162 through the base plate 219, and the table mechanism 170 is movably mounted on the linear guide 221.

The side covers 164a, 164b and the end covers 166, 167 are selectively mounted on the frame 162 depending on the environment in which the actuator 160 is installed. The side covers 164a, 164b and the end covers 166, 167 may be dispensed with as shown in FIG. 20.

The electric motor 172 connected to a power supply (not shown) is energized. When the electric motor 172 is energized, the second bevel gear 206 coupled to the motor shaft 208 is rotated, rotating the first bevel gear 198 that is held in mesh perpendicularly or obliquely with the second bevel gear 206. Therefore, the pulley 20 coupled coaxially to the first bevel gear 198 is rotated. The rotation of the pulley 200 moves the timing belt 168 which is trained around the pulley 200.

As shown in FIGS. 21A and 21B, the ends of the timing belt 168 are separate from each other and gripped by the gripping means 182a, 182b. When the electric motor 172 is rotated in one direction or the other, the first and second bevel gears 198, 206 are rotated to cause the timing belt 168 to displace the table block 178 along the linear guide 221.

Another member can be connected to the table block 178 by screws threaded into the holes 239 defined in the upper surface of the table block 178. The dampers 210, 238 on the motor pulley unit 174 and the idle pulley unit 176 serve to dampen shocks produced when the table block 178 makes linear reciprocating movement.

It is possible for the operator to select and install various covers on the actuator 160 as with the actuator 10 according to the first embodiment of the present invention.

FIGS. 24 through 27 show an actuator 240 according to a fifth embodiment of the present invention. The actuator 240 includes a cylinder 242 integrally incorporated in a unit similar to the actuator 60 shown in FIG. 9.

The actuator 240 comprises an actuator unit 244 including an electric motor 63, a table mechanism 76, etc., and a balancer unit 246 joined to the actuator unit 244. The actuator unit 244 is substantially the same in structure and operation as the actuator 60 shown in FIG. 9. Therefore, those parts of the actuator unit 244 which are identical to those of the actuator 60 are denoted by identical reference numerals, and will not be described in detail below.

The balancer unit 246 comprises a casing 248 substantially in the form of a prism with a cylinder 242 having an end fixedly mounted in the casing 248. Specifically, a cube-shaped coupling block 252 is fixed by a plate 250 to a transverse side surface of an elongate frame 62, and a longitudinal end of the cylinder 242 is secured to the coupling block 252. The cylinder 242 has a piston (not shown) reciprocally movable in a cylinder tube 254 which has a pair of ports 256a, 256b defined respectively in opposite longitudinal ends thereof for supplying and discharging a fluid under pressure into and out of the cylinder tube 254. To the piston, there is connected a piston rod 258 partly extending out of the cylinder tube 254 and having a distal end joined to a joint plate 260 which is inclined a certain angle to a horizontal plane. The joint plate 260 has an end fixed to a table block 102a of a table mechanism 76. The balancer unit 246 serves to assist the electric motor 63 in displacing the table mechanism 76 in the direction indicated by the arrow X or Y when the piston rod 258 is also displaced in the direction X or Y by a fluid supplied under pressure through the port 256a into the cylinder tube 254. Therefore, the balancer unit 246 reduces the burden on the electric motor 63.

The actuator 240 operates as follows:

The actuator 240 is normally used in a substantially vertical direction. When the table mechanism 76 is substantially vertically moved by the electric motor 63, a workpiece supported by the table mechanism 76 can be lifted or lowered. Since the actuator 240 is vertically oriented, the electric motor 63 is subject to the weight of the table mechanism 76 and the workpiece supported thereby. However, the burden or load on the electric motor 63 can be lessened because it is assisted by drive forces produced by the cylinder 242. The actuator 240 may also be used in an inclined condition.

FIGS. 28 through 32 show an actuator 270 according to a sixth embodiment of the present invention. The actuator 270 includes one or more cylinders for lessening the load on an electric motor, the cylinders being housed in a frame.

Figure 32:
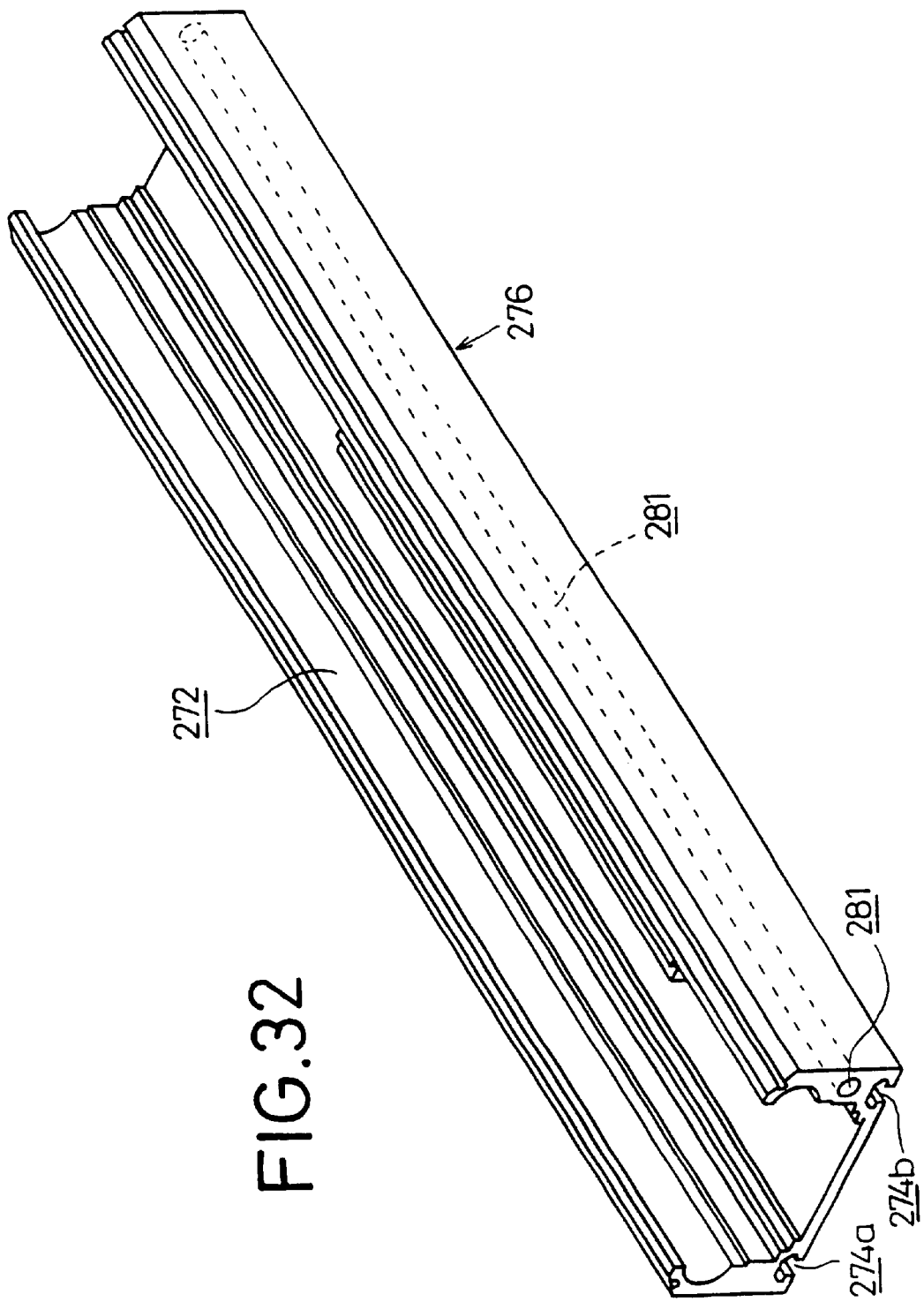
FIG. 32 is a perspective view of a frame of the actuator shown in FIG. 28.

As shown in FIG. 32, the actuator 270 has an elongate frame 276 having an opening or recess 272 defined therein which extends fully longitudinally therethrough. The frame 276 also has a pair of transversely spaced grooves 274a, 274b of substantially T-shaped cross section which are defined in a bottom surface facing away from the opening 272. The grooves 274a, 274b are used to install the actuator 270 on an apparatus (not shown) which is to be combined with the actuator 270.

Figure 28:
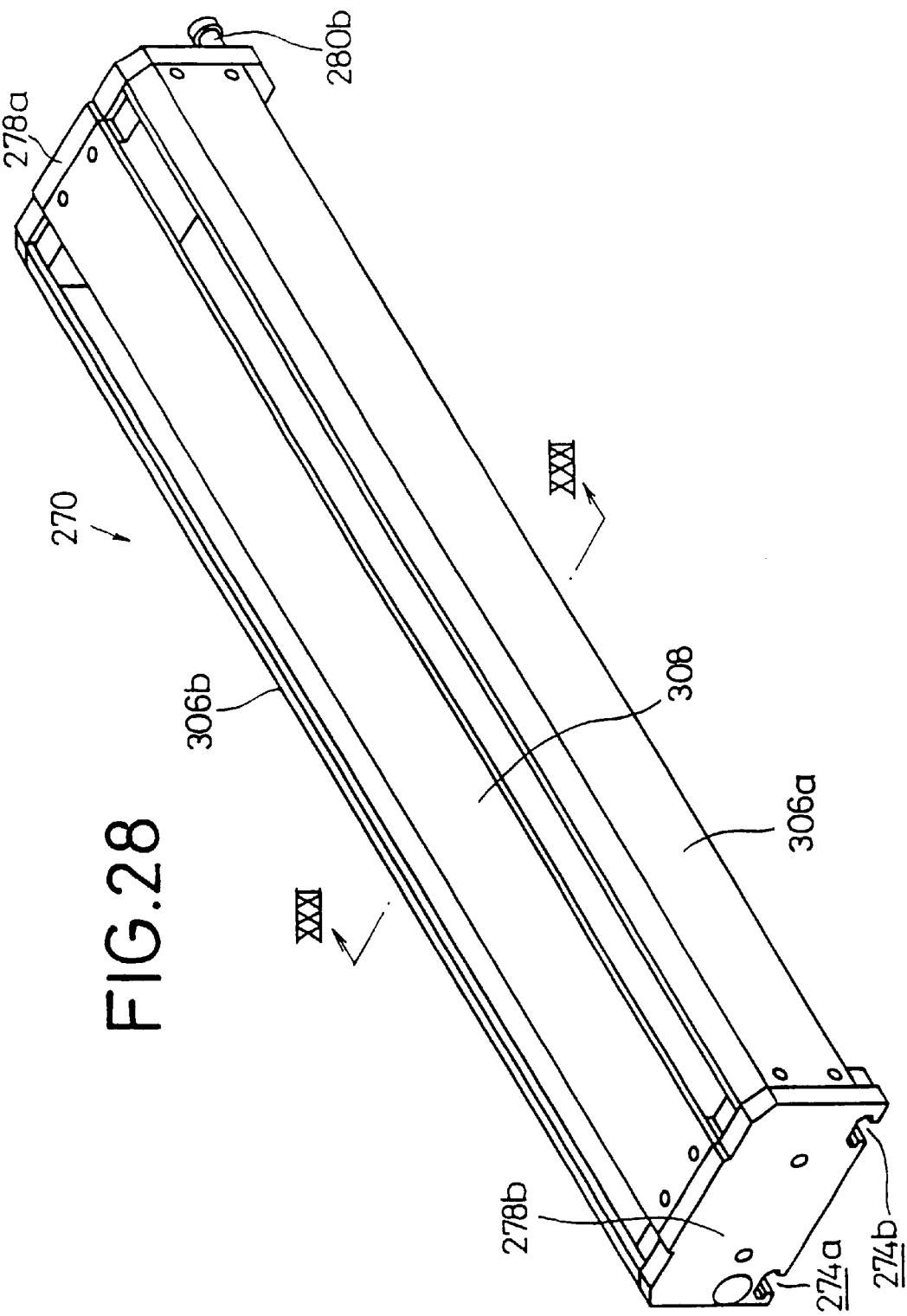
FIG. 28 is a perspective view of an actuator according to a sixth embodiment of the present invention.
Figure 29:
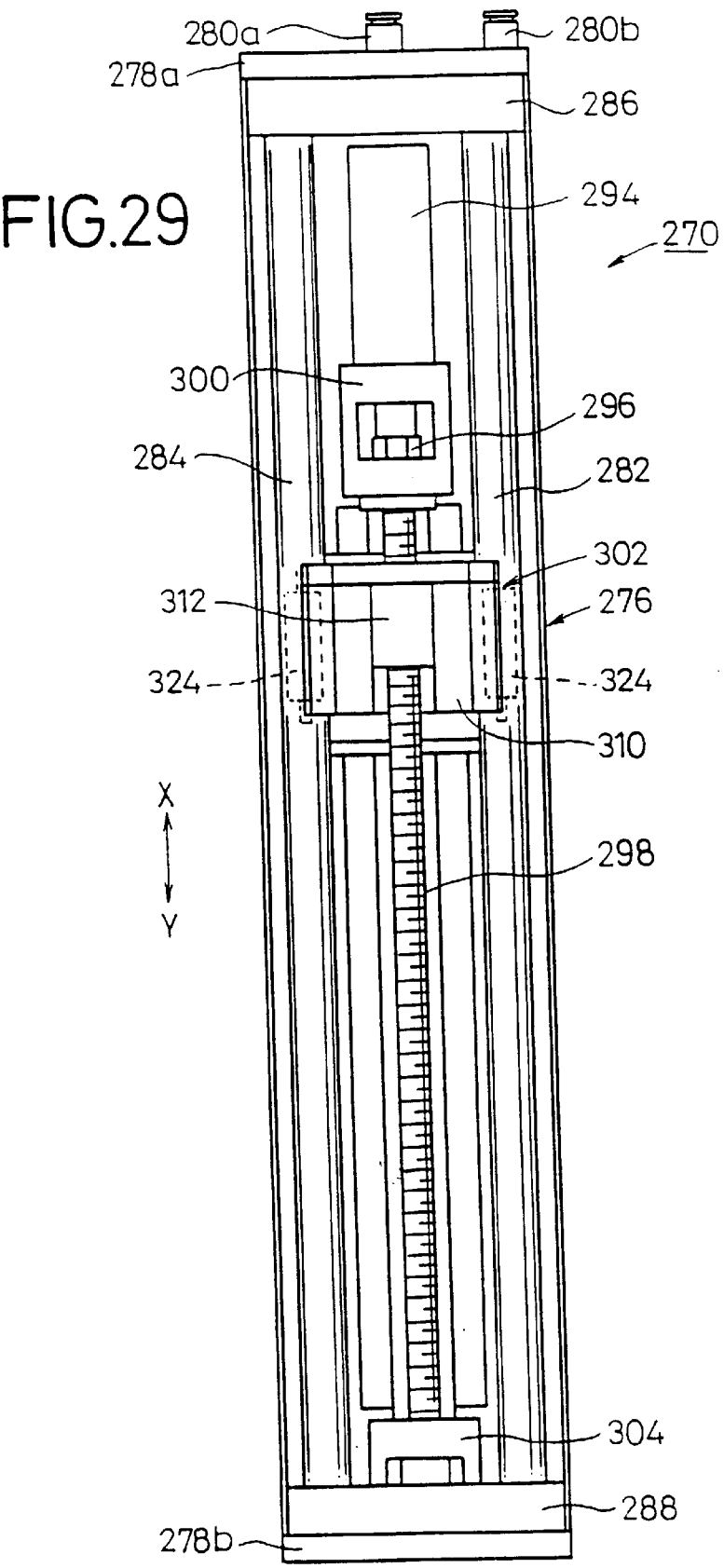
FIG. 29 is a plan view of the actuator shown in FIG. 28, with a top cover being open.

As shown in FIGS. 28 and 29, the actuator 270 includes a pair of end covers 278a, 278b coupled respectively to the longitudinal opposite ends of the frame 276, and a pair of pipe joints 280a, 280b connected to the end cover 278a. The pipe joint 280a, which is positioned substantially centrally on the end cover 278a, is vented to the atmosphere and serves to discharge a fluid under pressure from the actuator 270. The pipe joint 280b serves as a port for supplying a fluid under pressure into the actuator 270. The frame 276 has a passage 281 (see FIG. 32) defined therein and extending fully longitudinally therethrough for delivering a fluid under pressure introduced from the pipe joint 280b to an end plate 288. The passage 281 is connected to the pipe joint 280b through a hole (not shown) defined in an end plate 286. Since the passage 281 is defined in the frame 276, it is not necessary to employ an external fluid passage outside of the actuator 270. Therefore, the actuator 270 can be installed in a small space without undue limitations, so that an effective space utilization can be achieved by the actuator 270.

Figure 30:
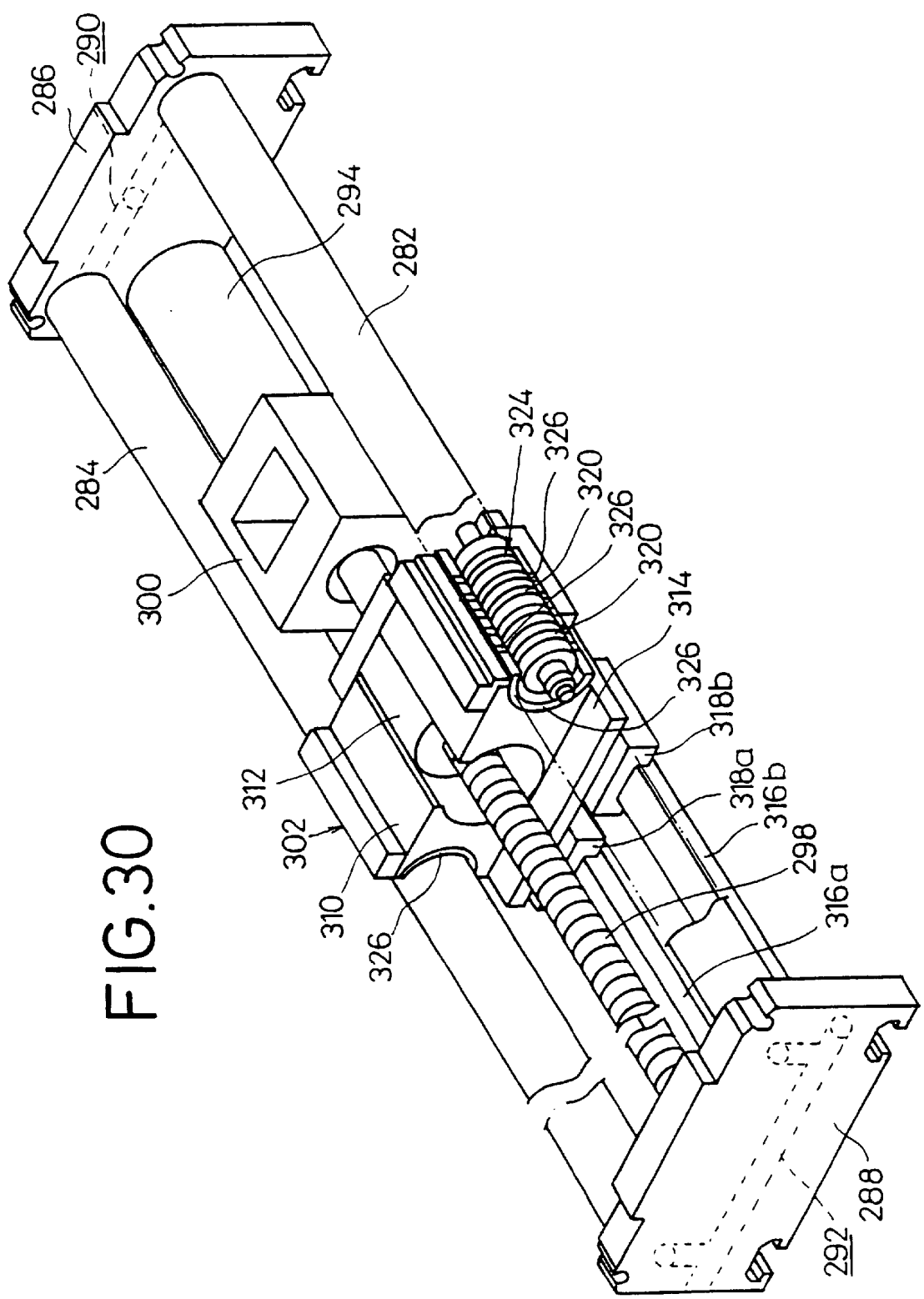
FIG. 30 is a partial perspective view of the actuator shown in FIG. 28.

As shown in FIG. 30, a pair of parallel cylinder tubes 282, 284 spaced transversely from each other is disposed in the opening 272 of the frame 276. End plates 286, 288 (see FIGS. 29 and 30) are hermetically joined to longitudinal opposite ends of the cylinder tubes 282, 284. The end plate 286 has a passage 290 defined therein which communicates between the pipe joint 280a and chambers that are defined in the respective cylinder tubes 282, 284. The end plate 288 has a passage 292 defined therein in communication with the passage 281 and the chambers in the cylinder tubes 282, 284.

As shown in FIGS. 29 and 30, the opening 272 accommodates therein an electric motor 294 positioned closely to the end plate 286, a coupling block 300 which couples the rotatable shaft of the electric motor 294 coaxially to an end of a ball screw shaft 298 through a coupling member 296, a table mechanism 302 for supporting a workpiece thereon, and a bearing block 304 which supports the other end of the ball screw shaft 298 on the end plate 288.

As shown in FIGS. 28 and 30, side covers 306a, 306b are mounted respectively on transverse sides of the frame 276, and a top cover 308 is connected at its longitudinal ends to upper surfaces of the end covers 278a, 278b in covering relation to the opening 272 except for elongate gaps through which the table mechanism 302 moves.

Figure 31:
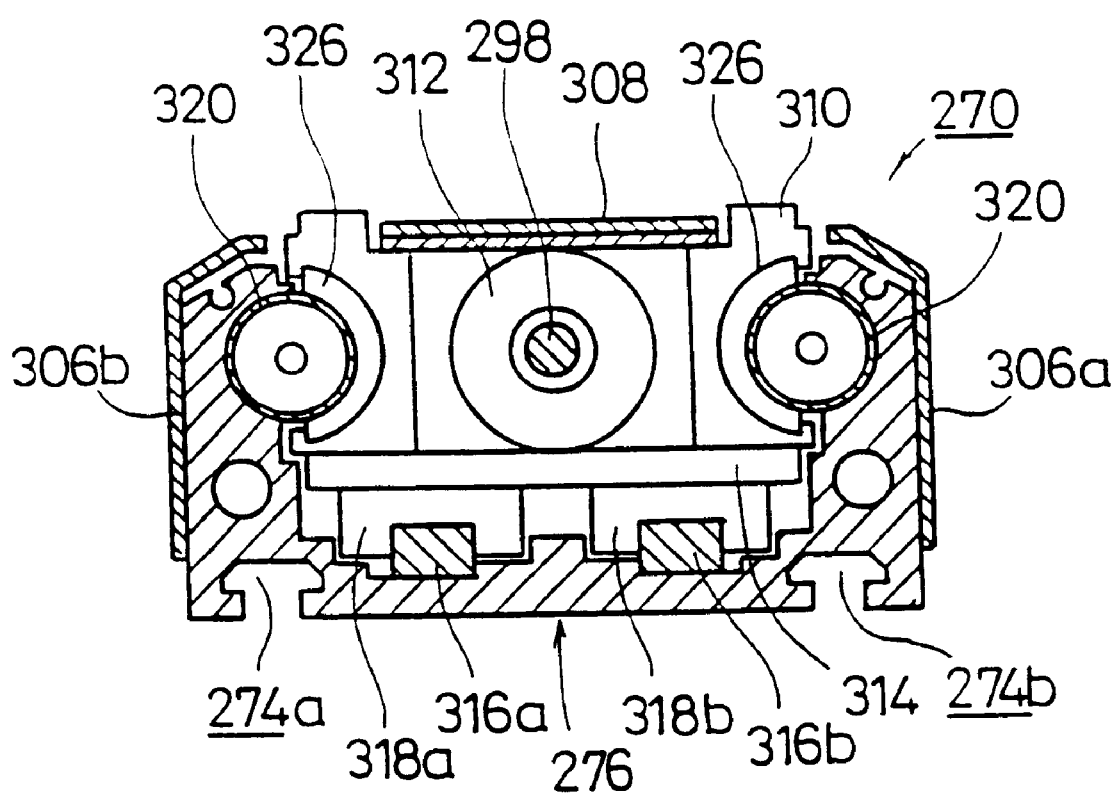
FIG. 31 is a transverse cross-sectional view taken along line XXXI—XXXI of FIG. 28.

As shown in FIGS. 30 and 31, the table mechanism 302 is disposed between the cylinder tubes 282, 284. The table mechanism 302 comprises a table block 310 slidably movable on outer circumferential surfaces of the cylinder tubes 282, 284 in the longitudinal direction of the frame 276, the table block 310 having a substantially cylindrical recess defined therein, a slide block 312 fixedly disposed in the substantially cylindrical recess in the table block 310 and threaded over the ball screw shaft 298, a plate 314 fixed to the bottom of the table block 310, a pair of guide members 316a, 316b fixedly mounted on the bottom of the opening 272 and extending longitudinally thereof, the guide members 316a, 316b being spaced transversely from each other; and a pair of slide members 318a, 318b attached to the plate 314 and held in slidable contact with the respective guide members 316a, 316b. The table block 310 has a pair of recesses of substantially semicircular cross section defined in respective outer side surfaces thereof and extending in the longitudinal direction of the cylinder tubes 282, 284, the recesses opening toward the outer circumferential surfaces of the cylinder tubes 282, 284. Semicylindrical members 322 each supporting a plurality of parallel permanent magnets 326 of substantially semicircular cross section are fixedly mounted in the respective recesses of the table block 310. The permanent magnets 320 may not be of a substantially semicircular cross section, but may be of any cross-sectional shape which surrounds partly or wholly the outer circumferential surfaces of the cylinder tubes 282, 284.

Pistons 324 are positioned in the chambers in the cylinder tubes 282, 284 for reciprocating movement in the chambers under a fluid pressure. Since the pistons 324 are identical in structure to each other, only one of the pistons 324 will be described in detail below. A plurality of parallel permanent magnets 326 which are substantially disk-shaped are mounted on the piston 324. The cylinder tubes 282, 284 and the pistons 324 jointly constitute rodless cylinders in which no piston rods are connected to the pistons 324. Any displacement of the pistons 324 in the chambers in the cylinder tubes 282, 284 can be transmitted to the table mechanism 302 through a magnetic action between the permanent magnets 320, 326. While both the table block 310 and the pistons 324 have the permanent magnets 320, 326 in the illustrated embodiment, these permanent magnets 320, 326 may be dispensed with, and either the table block 310 or the pistons 324 may be made of a permanent magnet and the other may be made of a magnetic material. Alternatively, the permanent magnets 320, 326 may be replaced with electromagnets for increased durability and reduced cost.

Operation of the actuator 270 shown in FIGS. 28 through 31 will be described below.

Typically, the actuator 270 may be used as an air balancer. First, the actuator 270 is installed in a substantially vertical direction and fixed in the upstanding position by a suitable fixing device (not shown). As shown in FIG. 29, the end cover 278a with the pipe joints 280a, 280b fixed thereto is oriented upwardly, and a tube or the like is connected to the pipe joint 280b with the other pipe joint 280a open.

Compressed air is introduced into the actuator 270 through the tube and the pipe joint 280b, and the electric motor 294 is energized by a power supply (not shown) electrically connected to the electric motor 294. When the electric motor 294 is energized, the ball screw shaft 398 is rotated about its own axis, displacing the table mechanism 302 in the direction indicated by the arrow X in FIG. 29.

The compressed air introduced from the pipe joint 280b flows through the hole in the end plate 286 and the passage 281 defined in the frame 276 into the passage 292 in the end plate 288. The compressed air is then supplied from the passage 292 simultaneously into the chambers in the cylinder tubes 282, 284. The pistons 324 in the chambers in the cylinder tubes 282, 284 are now pushed in the direction X by the supplied compressed air. At this time, the disk-shaped permanent magnets 326 mounted on the pistons 324 magnetically pull the permanent magnets 326 supported by the semicylindrical members 322 fixed to the table block 310. Therefore, when the pistons 324 in the chambers in the parallel cylinder tubes 282, 284 are displaced in the direction X, the table block 310 is pulled also in the direction X.

Consequently, the table mechanism 302 is displaced in the direction X by both the rotation of the ball screw shaft 298 by the electric motor 294 and the displacement and hence magnetic action of the pistons 324 which move in the cylinder tubes 282, 284. Even if a workpiece carried on the table mechanism 302 is heavy, any load imposed on the electric motor 294 by the workpiece is reduced, and the heavy workpiece can be conveyed in the direction X. If an encoder (not shown) is connected to the electric motor 294, then it is possible to detect the position of the workpiece based on signal from the encoder and hence to position the workpiece highly accurately in the direction X.

The actuator 270 according to this embodiment functions as a vertical air balancer which operates based on the coaction of the electric motor 294 and the two rodless cylinders for vertically conveying a workpiece. However, the actuator 270 may be placed substantially horizontally and either the electric motor 294 or the rodless cylinders may be operated to convey a workpiece horizontally.

While the two parallel cylinder tubes 282, 284 and hence the two parallel rodless cylinders are disposed in the opening 272 in the above embodiment, the actuator 270 may have only one rodless cylinder in combination with the electric motor 294.

Figure 33:
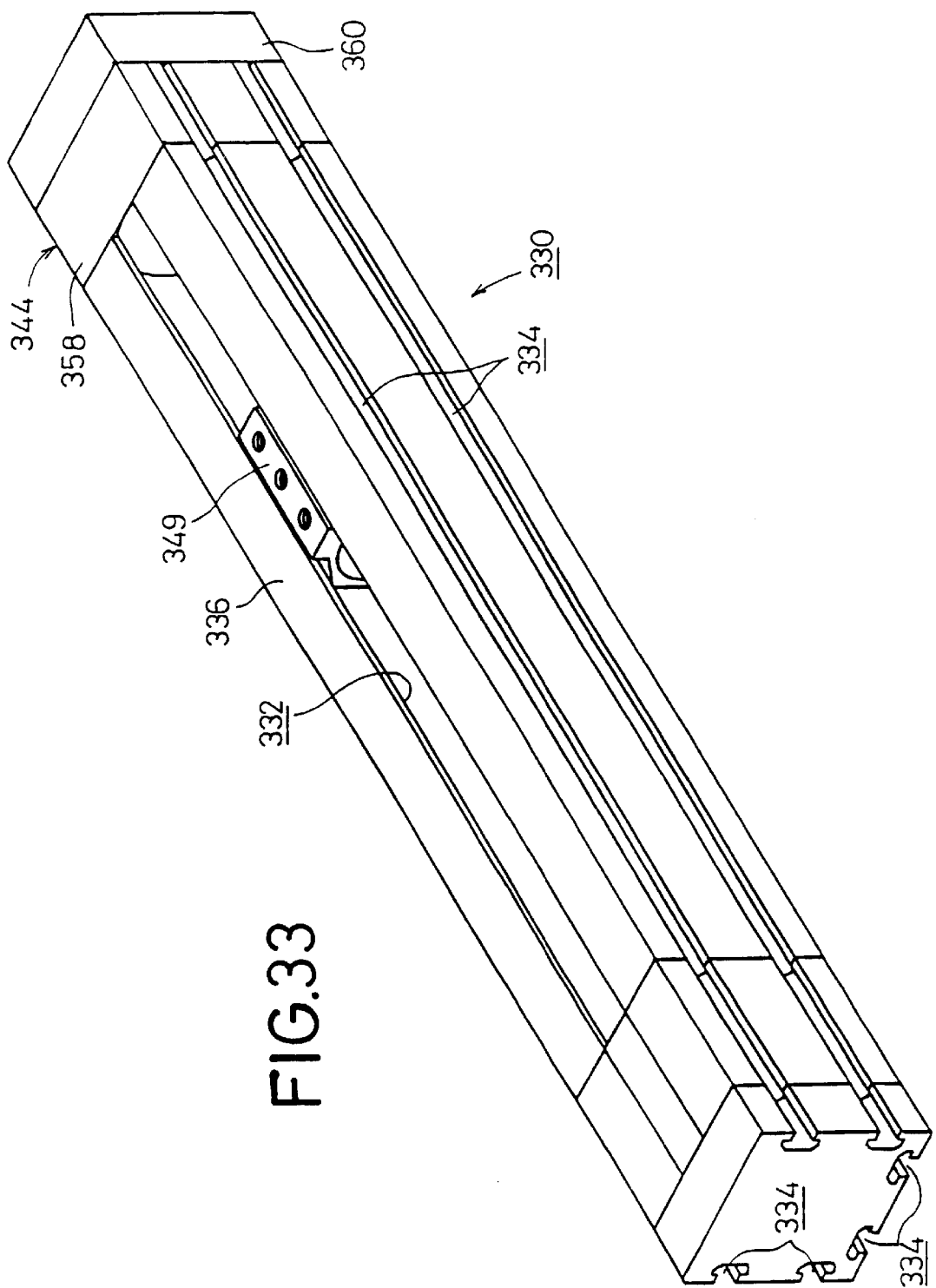
FIG. 33 is a perspective view of an actuator according to a seventh embodiment of the present invention.
Figure 34:
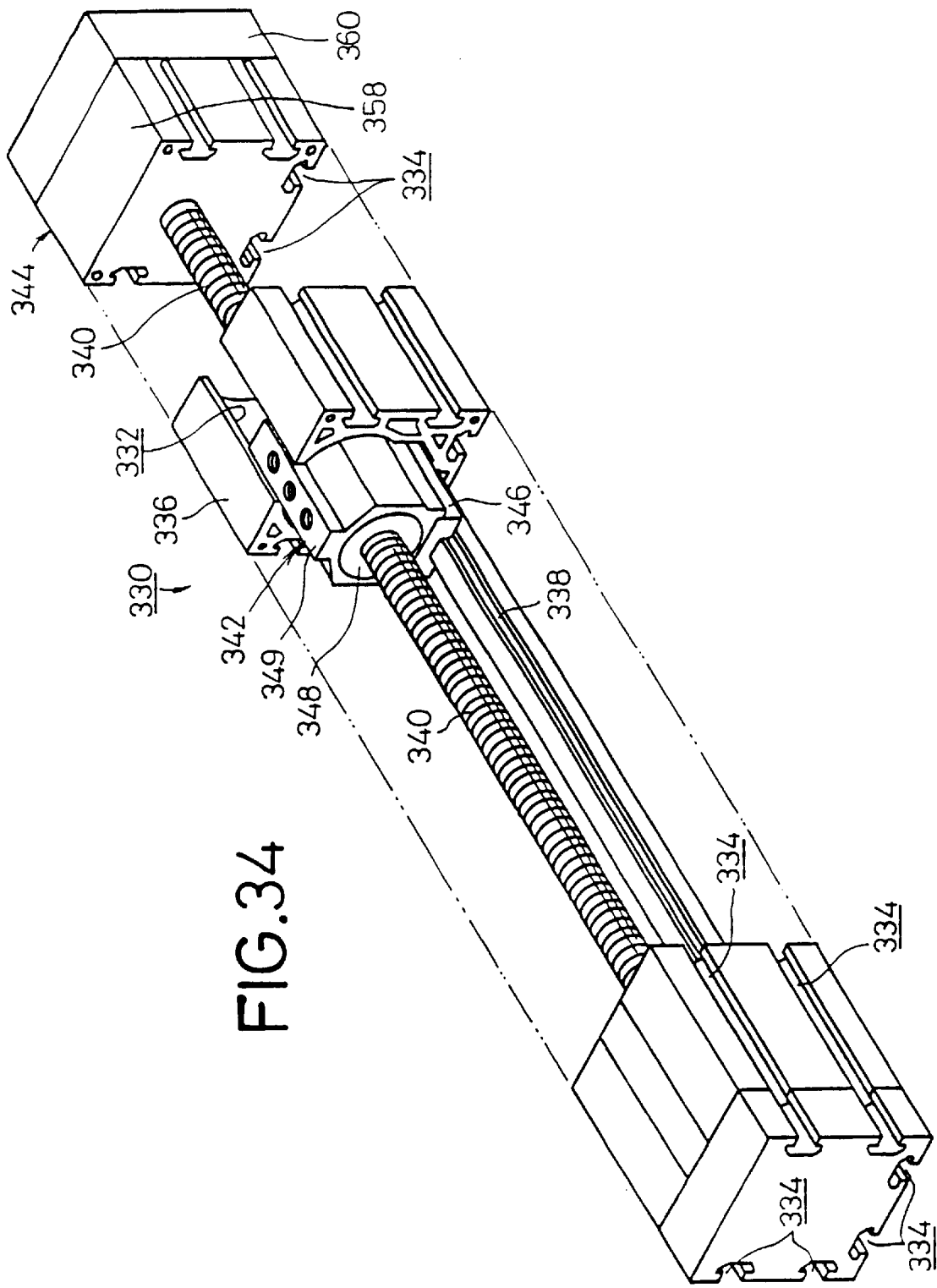
FIG. 34 is a perspective view, partly omitted from illustration, of the actuator shown in FIG. 33.
Figure 35:
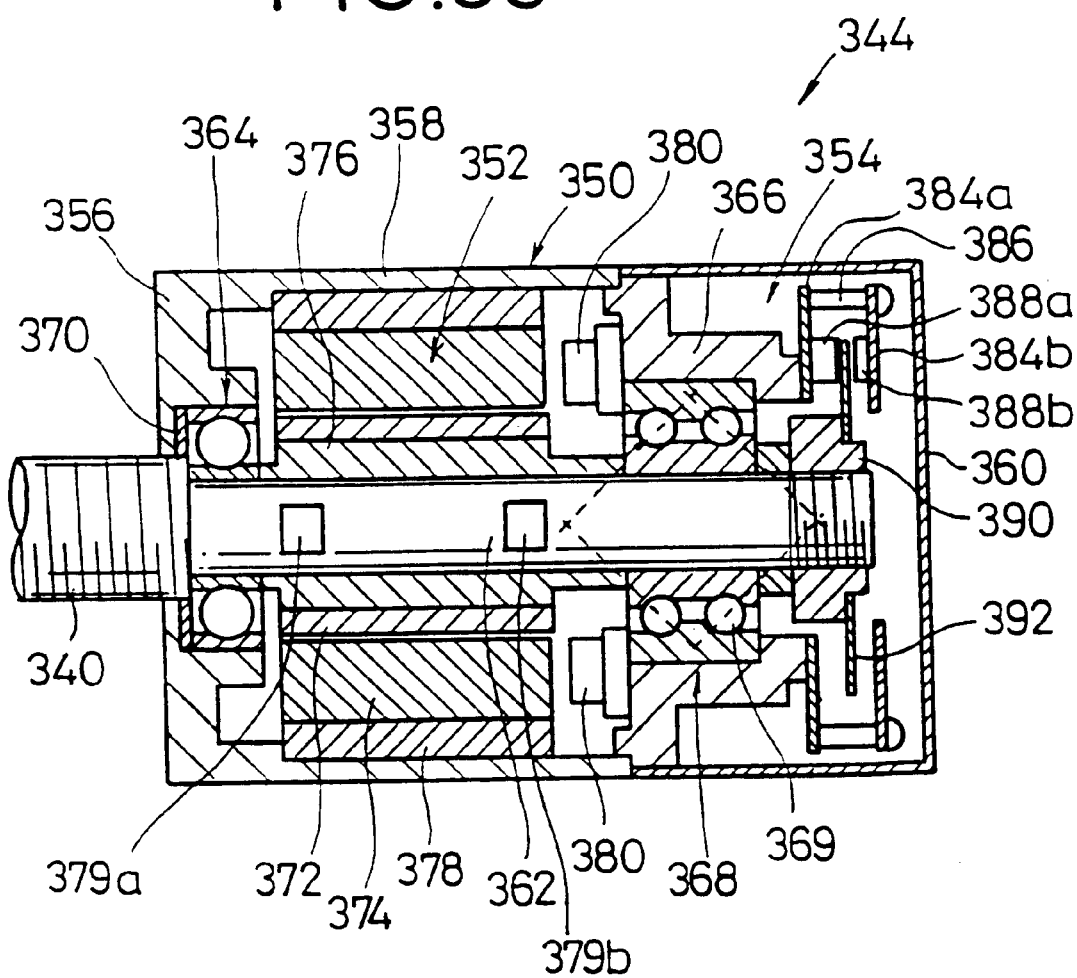
FIG. 35 is a cross-sectional view of the actuator shown in FIG. 33.

An actuator according to a seventh embodiment of the present invention is shown in FIGS. 33 through 35.

The actuator, generally denoted at 330, comprises a frame 336 having a plurality of substantially parallel long grooves 334 of substantially T-shaped cross section defined in side surfaces thereof except for a side surface with an opening 332 defined therein, a linear guide 338 disposed on the bottom of the frame 336, a table mechanism 342 linearly displaceable along the linear guide 338 upon rotation of a ball screw shaft 340, and an electric motor 344 coupled to an end of the frame 336.

As shown in FIG. 34, the table mechanism 342 comprises a bearing 346 slidable along the linear guide 338, and a table 349 fixed to the bearing 346 and linearly displaceable in response to rotation of the ball screw shaft 340 which is threaded in a ball screw bushing 348 mounted in the table 349.

As shown in FIG. 35, the electric motor 344 comprises a motor unit 352 and an encoder unit 354 which are housed in a casing 350. The casing 350 includes a frame 358 having a bracket 356 and an end cover 360 attached to the frame 358. The casing 350 houses a drive shaft 362 coaxially integral with the ball screw shaft 340, the drive shaft 362 serving as a motor shaft. The drive shaft 362 is rotatably supported by a first bearing 364 retained by the bracket 356 and a second bearing 368 retained by an encoder frame 366 (described later on).

Figure 1:
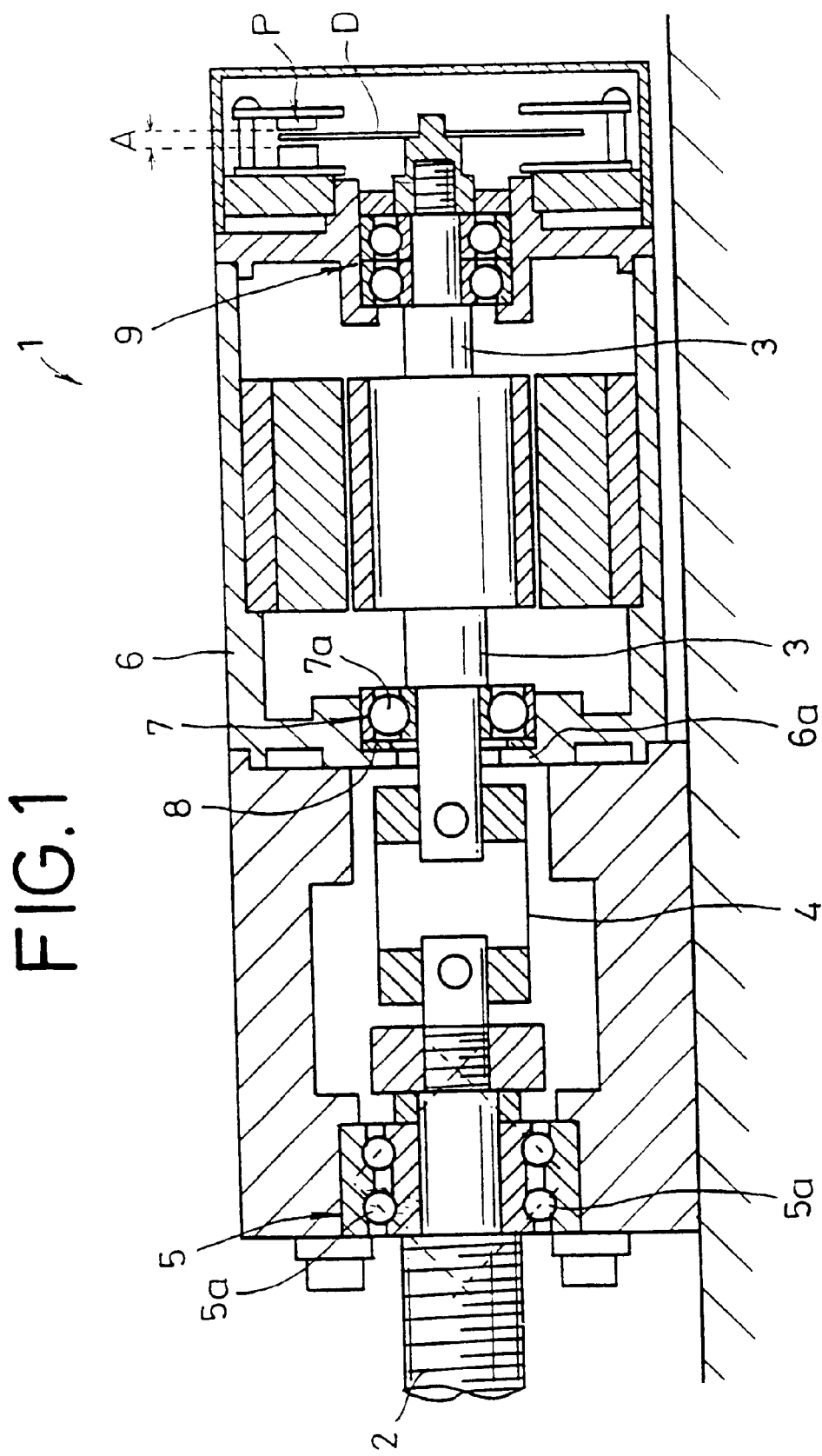
FIG. 1 is a cross-sectional view of a conventional electric motor incorporated in an actuator.

The first bearing 364, which comprises a deep-groove ball bearing, is axially supported by a spring washer 370 that is located laterally of the first bearing 364. The first bearing 364 and the spring washer 370 are of substantially the same structure as those of the electric motor 2 in the conventional actuator 1 shown in FIG. 1, but differ therefrom as follows:

The first bearing 364 is positioned closely to a region in which the drive shaft 362 is exposed out of the casing 350, and holds the drive shaft 362 radially inwardly to maintain a clearance highly accurately between a permanent magnet 372 and a ring-shaped stator coil 374 of the motor unit 352 and also to prevent vibrations caused by flexural movement of the ball screw shaft 340 from being transmitted to the motor unit 352.

Displacements generated due to the difference between thermal expansions of the materials of the frame 358 and the drive shaft 362 at the time the electric motor 344 is heated are absorbed by the spring washer 370 when it is axially displaced owing to its own elastic deformation. As a result, the first bearing 364 is prevented from suffering axial stresses therein.

The motor unit 352 also has a ring-shaped motor rotor 376 and a stator core 378. The ring-shaped motor rotor 376 and the permanent magnet 372 are successively radially fitted over the drive shaft 362, and the ring-shaped stator coil 374 and the stator core 378 are successively radially fixed to an inner wall surface of the frame 358 which extends around the permanent magnet 372. The drive shaft 362 and the motor rotor 376 are fixed to each other by set screws (not shown) which are threaded through the motor rotor 376 and held against flat surfaces 379a, 379b formed on the drive shaft 362. Alternatively, the drive shaft 362 and the motor rotor 376 may be fixed to each other by a key slot and a key, a retaining ring, a collar, an adhesive, or the like. Further alternatively, a magnet may be mounted directly on the drive shaft 362, and thereafter magnetized thereby integrally forming the drive shaft 362 and the motor rotor 376 with each other. With these fixing arrangements, it is possible to remove the drive shaft 362 out of the casing 350.

The encoder unit 354 includes an encoder frame 366 fixed to an inner wall surface of the end cover 360. The second bearing 368 is supported in the encoder frame 366 by a bearing holder 380. The second bearing 368 comprises a double angular ball bearing having two parallel arrays of balls 369. The two parallel arrays of balls 369 of the second bearing 368 are inclined at respective angles to a line perpendicular to the axis of the second bearing 368, so that they are capable of absorbing a load in the direction of the axis of the second bearing 368 and also a load in a direction perpendicular to the axis of the second bearing 368. The second bearing 368 may be replaced with another combined angular ball bearing, a combined conical roller bearing, a double conical roller bearing, or the like.

The encoder unit 354 has a pair of boards 384a, 384b spaced from each other and fastened to the encoder frame 366 by pins, and a pair of photosensors 388a, secured to the boards 384a, 384b, respectively, the photosensors 388a, 388b serving as a light-emitting element and a light-detecting element, respectively. A nut 390 is threaded over the distal end of the drive shaft 362, and a doughnut-shaped encoder disk 392 is fixedly mounted on and around the nut 390. The encoder disk 392 has a plurality of slits (not shown) positioned between the photosensors 388a, 388b. Light emitted from the light-emitting element passes through the slits and is then detected by the light-detecting element for detecting the rotational speed of the motor 344 and the position of the table 349.

Operation and advantages of the actuator 330 will be described below.

A power supply (not shown) electrically connected to the motor 344 through leads is turned on to energize the motor unit 352 for thereby rotating the drive shaft 362 in a predetermined direction. The rotary motion of the drive shaft 362 is transmitted through the ball screw shaft 340 to the ball screw bushing 348, which is linearly moved along the ball screw shaft 340 to displace the table 349 therealong.

While the motor 344 is in operation, the first bearing 364 absorbs vibrations of the ball screw shaft 340 and hence prevents vibrations from being transmitted to the drive shaft 362. Accordingly, the motor unit 352 can stably continuously rotate the drive shaft 362 without being damaged.

When the motor 344 is heated during its operation, the frame 358 tends to be displaced in the axial direction of the drive shaft 362 because of the different thermal expansions of the materials of the frame 358 and the drive shaft 362. However, such a displacement can be absorbed by the spring washer 370 when it is axially elastically deformed. Consequently, axial stresses are prevented from being imposed on the first bearing 364.

Since the second bearing 368 supports the drive shaft 362 in a direction perpendicular to the axis thereof and also in the axial direction thereof, the desired clearance between the photosensors 388a, 388b can be maintained highly accurately, allowing the encoder disk 392 to rotate accurately and reliably between the photosensors 388a, 388b.

The encoder unit 354 can be dislodged from the drive shaft 362 when the end cover 360 is detached from the frame 358.

In the electric motor 344 integrally incorporated in the actuator 330, the ball shaft screw 340 and the drive shaft 362 are integrally formed with each other without any coupling used therebetween. Therefore, the electric motor 344 can be reduced in size as it requires no space for accommodating such a coupling, and can rotate the drive shaft 352 without producing extra inertial forces. As a result, the actuator 330 can be reduced in size and weight for increased versatility.

Figure 36:
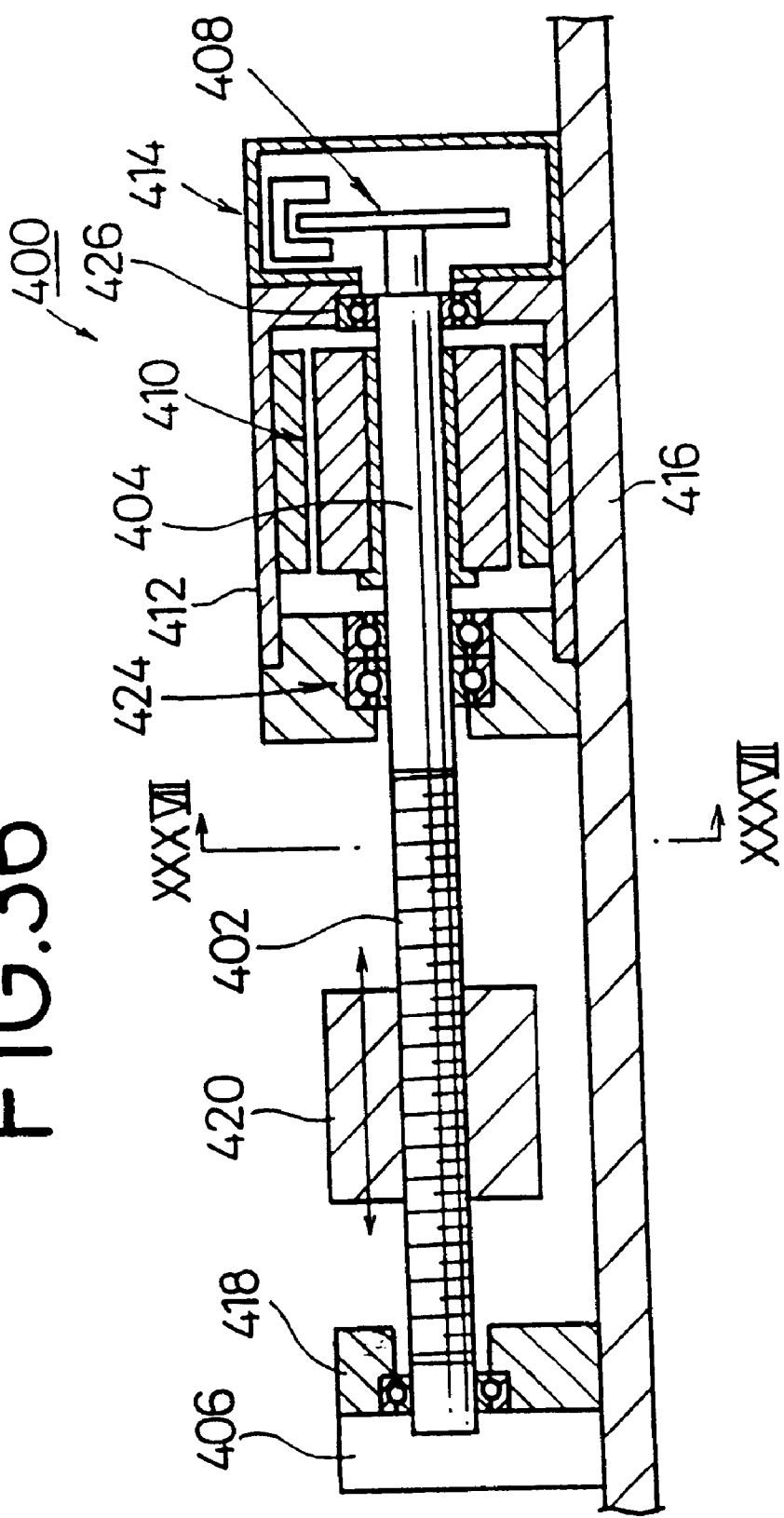
FIG. 36 is a schematic cross-sectional view of an actuator according to an eighth embodiment of the present invention.
Figure 37:
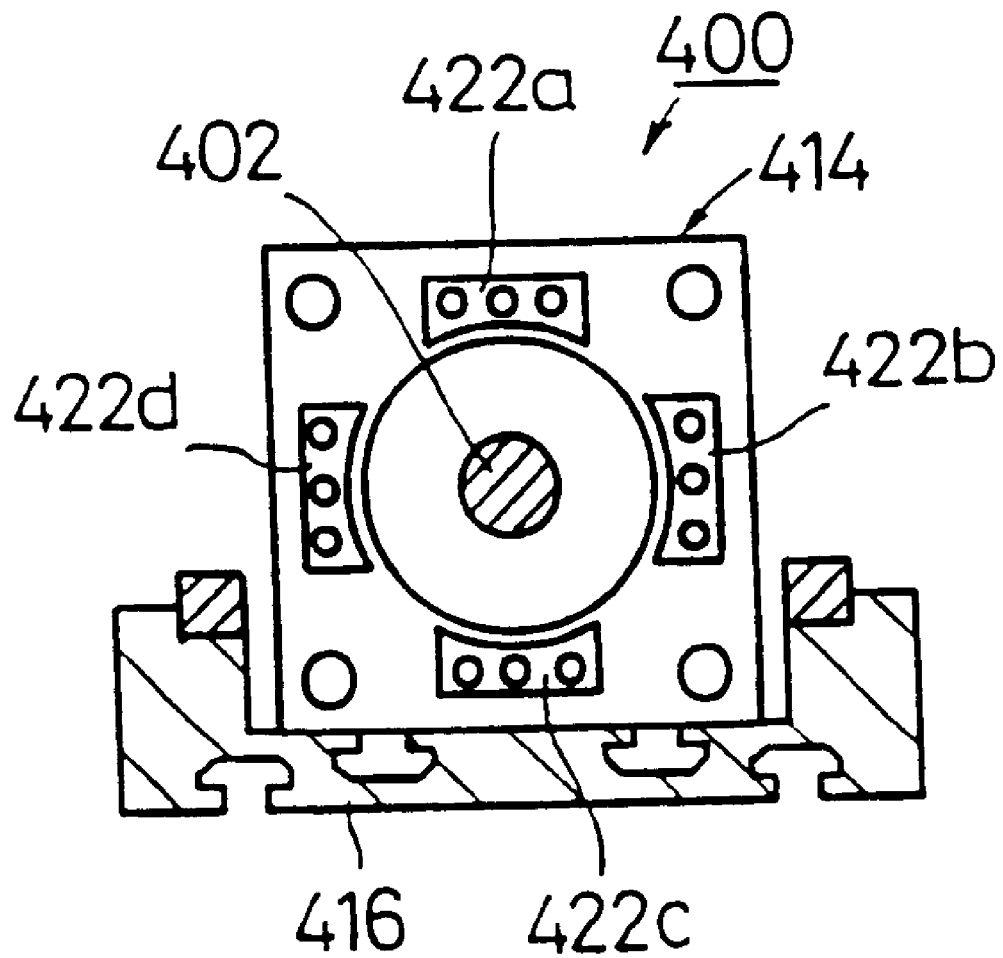
FIG. 37 is a transverse cross-sectional view taken along line XXXVII—XXXVII of FIG. 36.

An actuator according to an eighth embodiment of the present invention is illustrated in FIGS. 36 and 37.

As shown in FIG. 36, the actuator, generally denoted at 400, is similar to the actuator 330 shown in FIG. 34 in that a ball screw 402 and a motor shaft 404 are coaxially integrally formed with each other for reducing the size of the actuator 400, but differs therefrom in that a brake block 406 housing a brake mechanism is attached to an end of the ball screw 402, and a drive controller 414 housing an encoder 408 such as an absolute encoder, a semiabsolute encoder, or the like and an electric motor 410 in a housing 412 is fixed to a frame 416. The end of the ball screw 402 is rotatably supported by a bearing block 418 that is fixed to the frame 416 near the brake block 406. A table block 420 is disposed between the bearing block 418 and the drive controller 414 for displacement in the directions indicated by the arrows.

As shown in FIG. 37, the drive controller 414 has bus lines 422a–422d extending axially along the ball screw 402 for carrying a power supply current and a control signal for the electric motor 410 and a signal produced by the encoder 408.

The motor shaft 404 in the housing 412 is rotatably supported by first and second double bearings 424, 426 positioned respectively at the opposite ends of the motor shaft 404 for preventing vibrations from the ball screw 402 from being transmitted to the motor shaft 404. Since the bus lines 422a~422b are disposed in the drive controller 414, no spaces are required as signal and wiring passages, and hence the actuator 400 can be compact in size.

FIGS. 38 through 41 show an actuator 430 according to a ninth embodiment of the present invention. Those parts of the actuator 430 which are identical to those of the actuator 400 shown in FIGS. 36 and 37 are denoted by identical reference numerals, and will not be described in detail.

Figure 38:
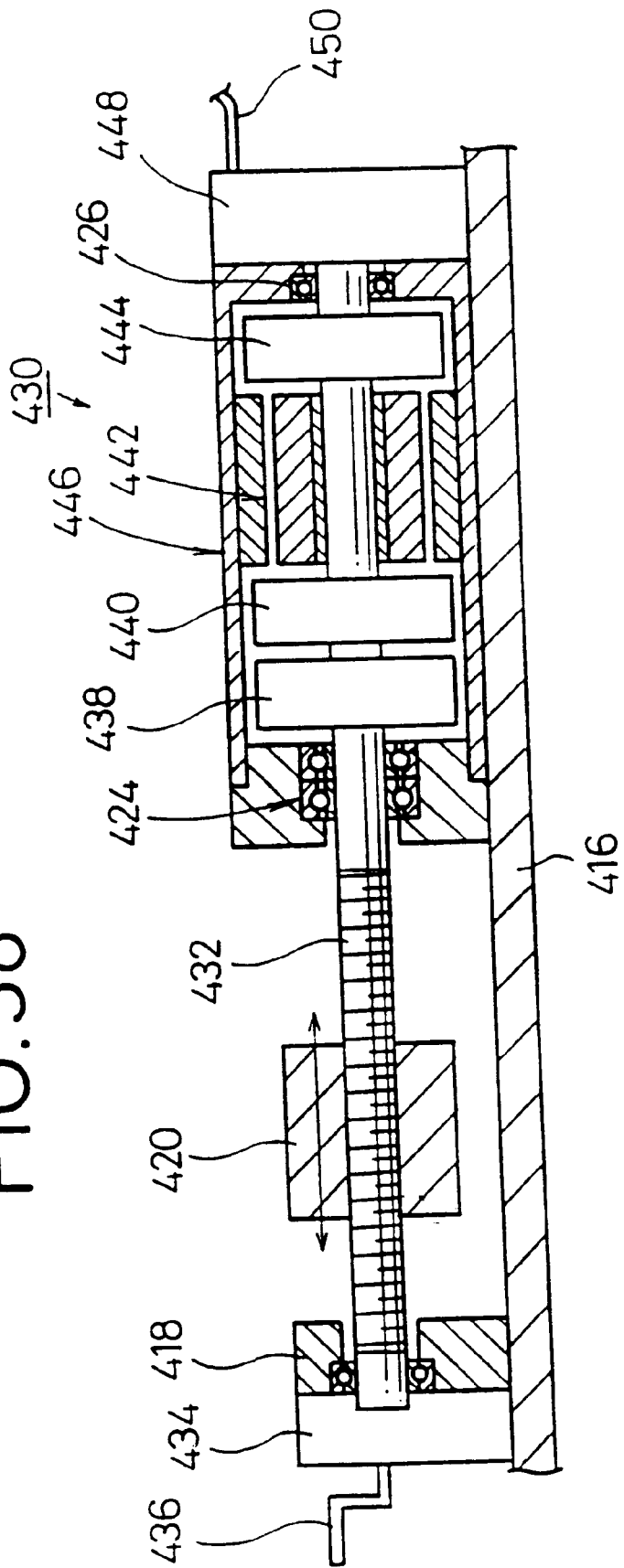
FIG. 38 is a schematic cross-sectional view of an actuator according to a ninth embodiment of the present invention.

As shown in FIG. 38, the actuator 430 has an encoder block 434 housing a linear encoder and a manual handle 436 positioned at an end of a ball screw 432. The actuator 430 also includes a drive control block 446 composed of a brake mechanism 438, a clutch mechanism 440, an electric motor 442, and an encoder 444. The encoder block 434 and the drive control block 446 are fixedly mounted on a frame 416 through long grooves defined in the frame 416.

A terminal block 448 is joined to the drive control block 446, and the drive control block 446 and the terminal block 448 are connected to each other by bus lines 422a~422d, and to an external control device (not shown) by a lead 450.

Figure 39:
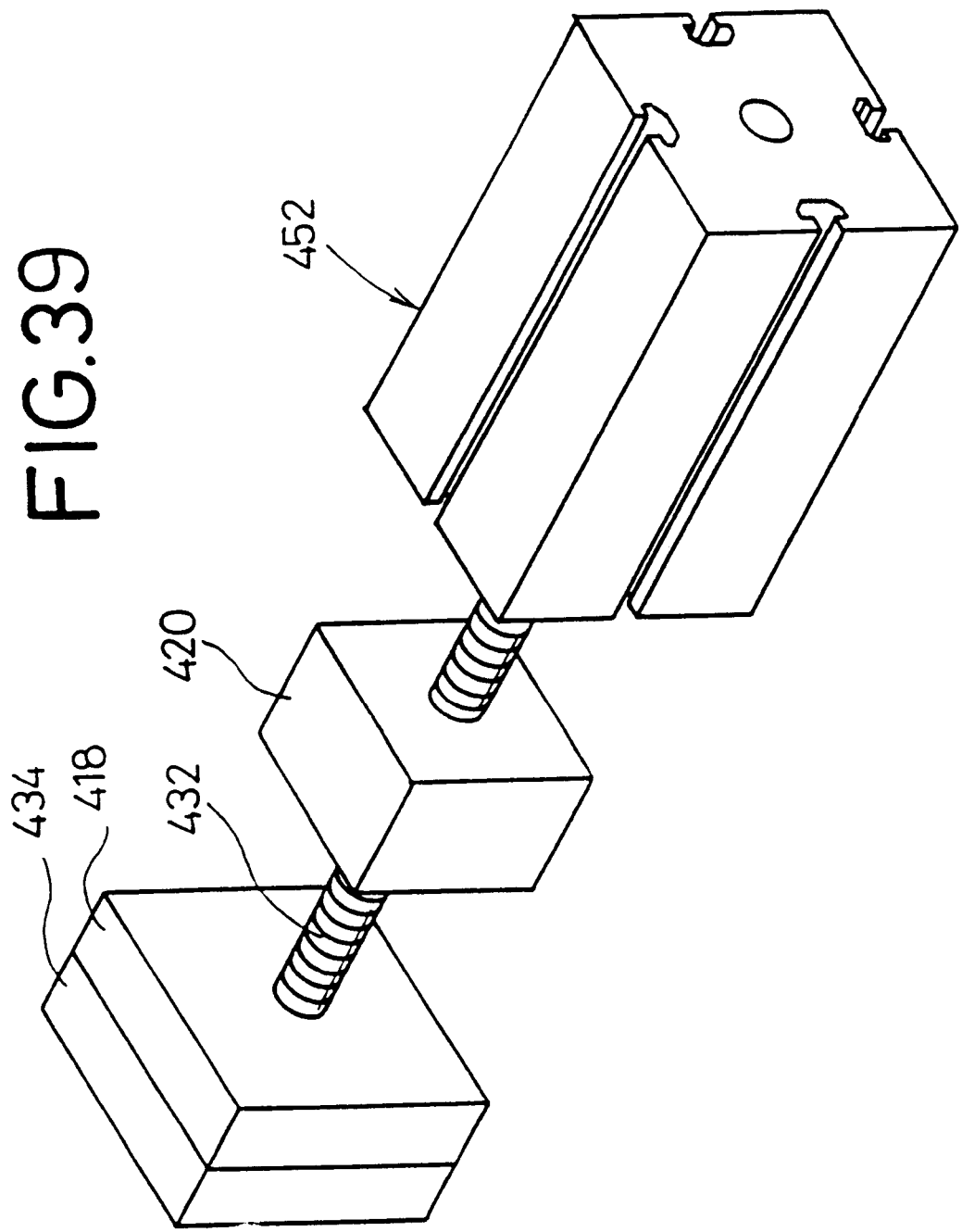
FIG. 39 is a perspective view, partly omitted from illustration, of a modification of the actuator shown in FIG. 38.
Figure 40:
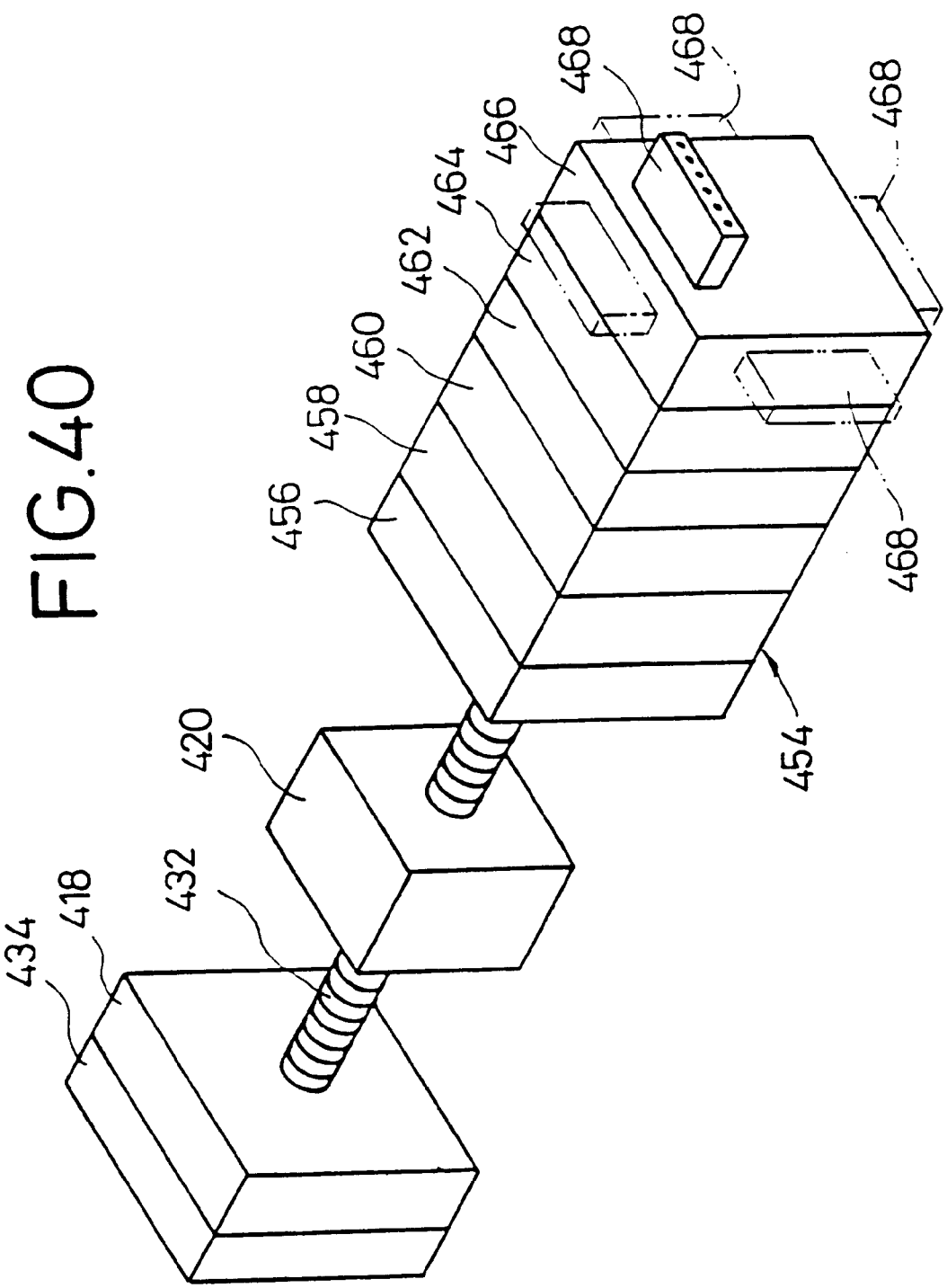
FIG. 40 is a perspective view of another modification of the actuator shown in FIG. 38.
Figure 41:
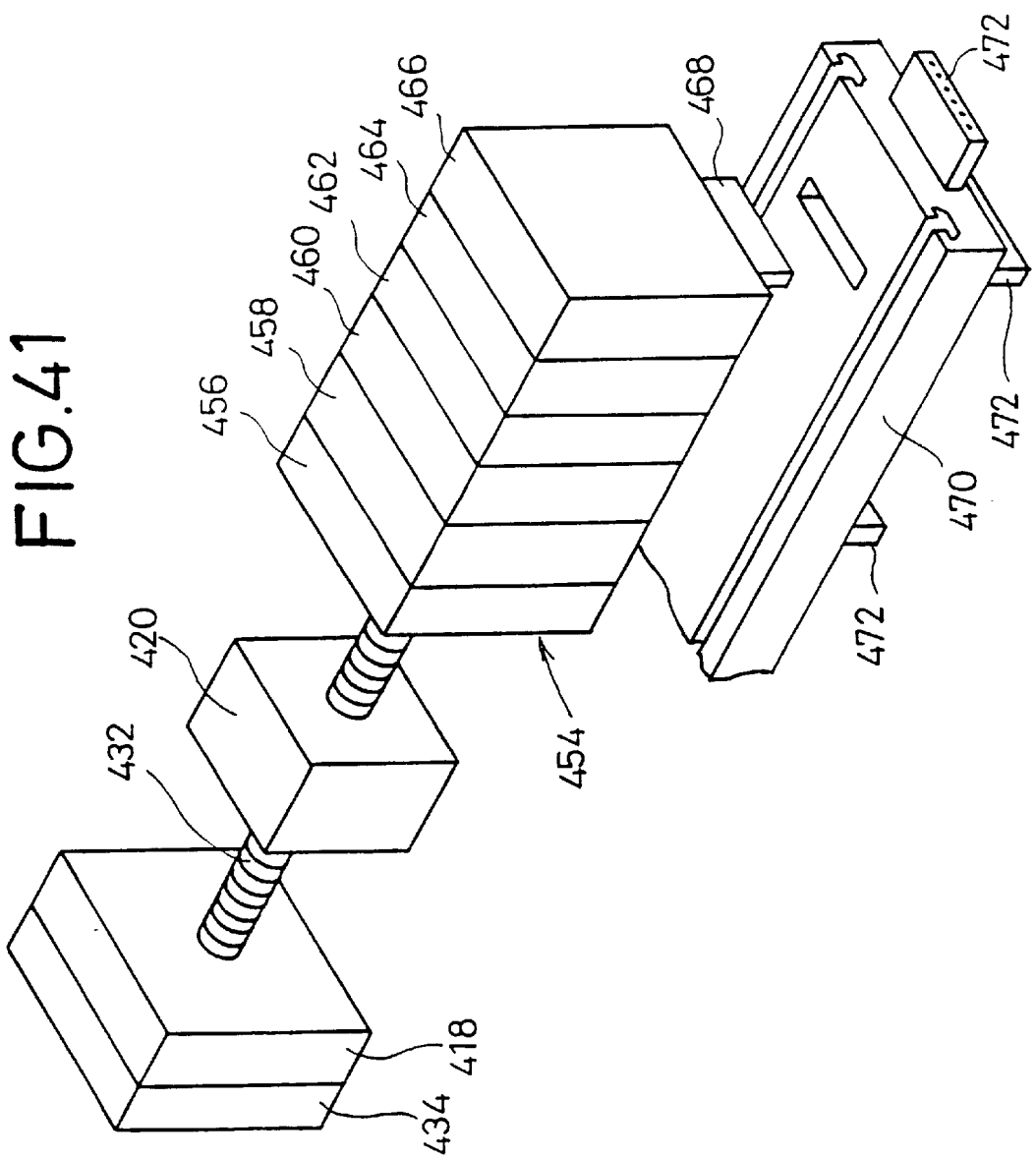
FIG. 41 is a perspective view of still another modification of the actuator shown in FIG. 38.

As shown in FIG. 39, the drive control block and the terminal block may be integrally combined as a block 452. Alternatively, as shown in FIG. 41, various components of the drive control block may be divided as a plurality of blocks which may be separably combined with each other. Specifically, a drive control block 454 comprises a bearing block 456 housing a double bearing, a brake block 458 housing a brake mechanism, a clutch block 460 housing a clutch mechanism, a motor block 462 housing an electric motor, an encoder block 464 housing an encoder, and a terminal block 466 housing a concentrated wiring mechanism. An interface drive 468 may be mounted on the terminal block 466 in a selected one of various directions including a direction parallel to the axis of the ball screw 432 and directions normal to the axis of the ball screw 432. Further alternatively, as shown in FIG. 41, signals may be transmitted to and from the interface drive 468 through connectors 472 mounted on the bottom of a frame 470. Since the components of the drive control block are divided as separable blocks, desired blocks may be combined into a drive control block.

Figure 42:
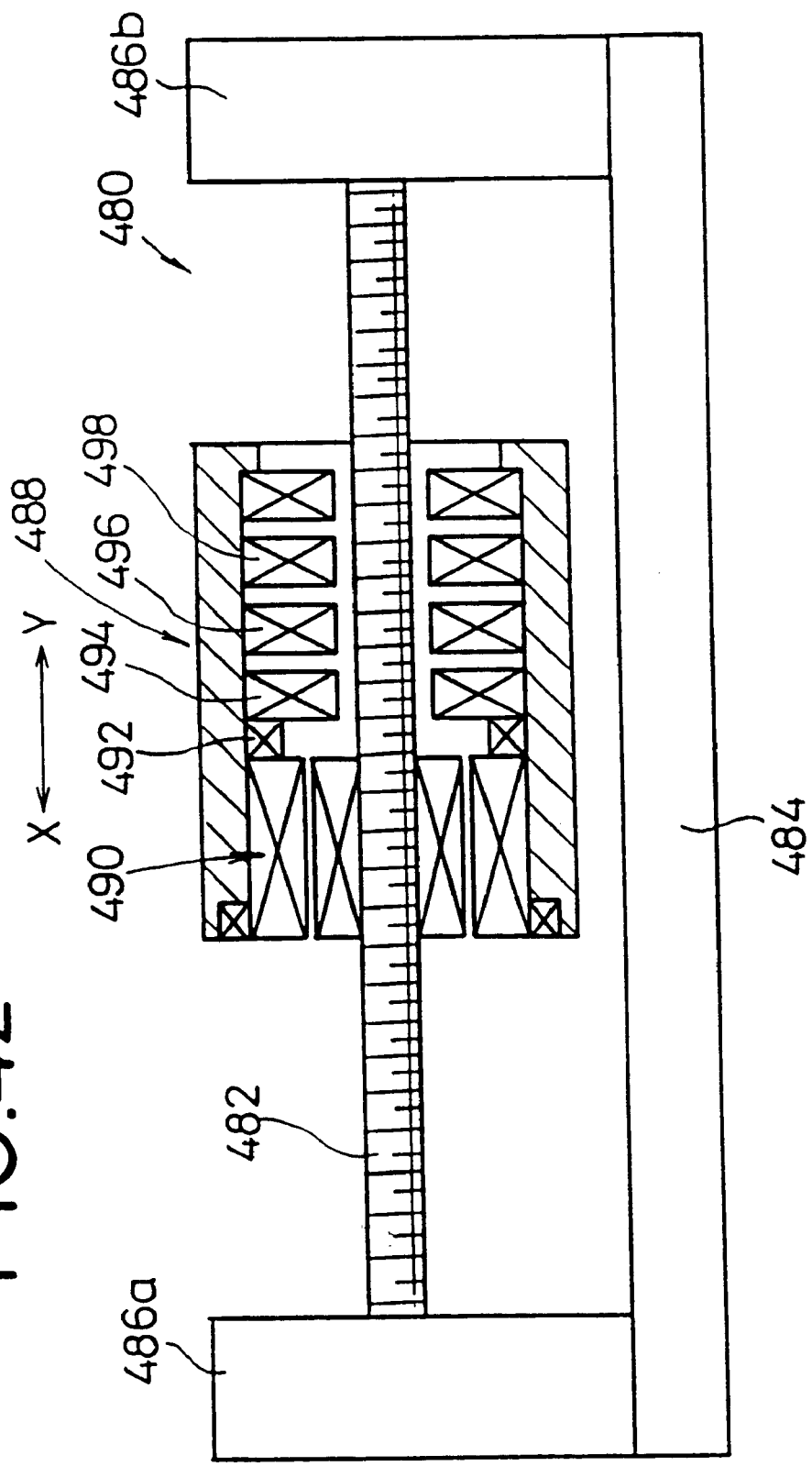
FIG. 42 is a schematic cross-sectional view of an actuator according to a tenth embodiment of the present invention.
Figure 43:
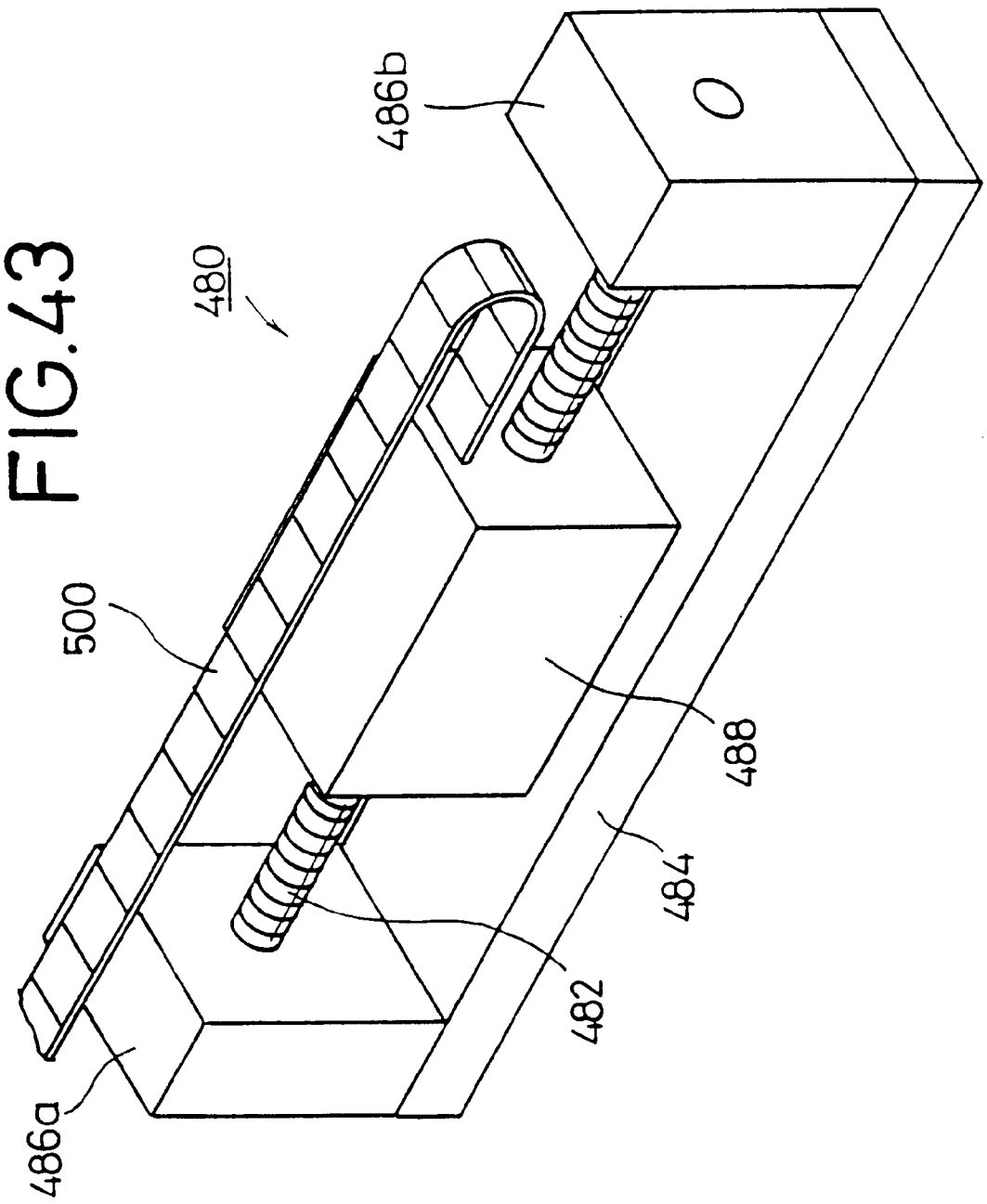
FIG. 43 is a perspective view, partly omitted from illustration, of the actuator shown in FIG. 42.
Figure 44:
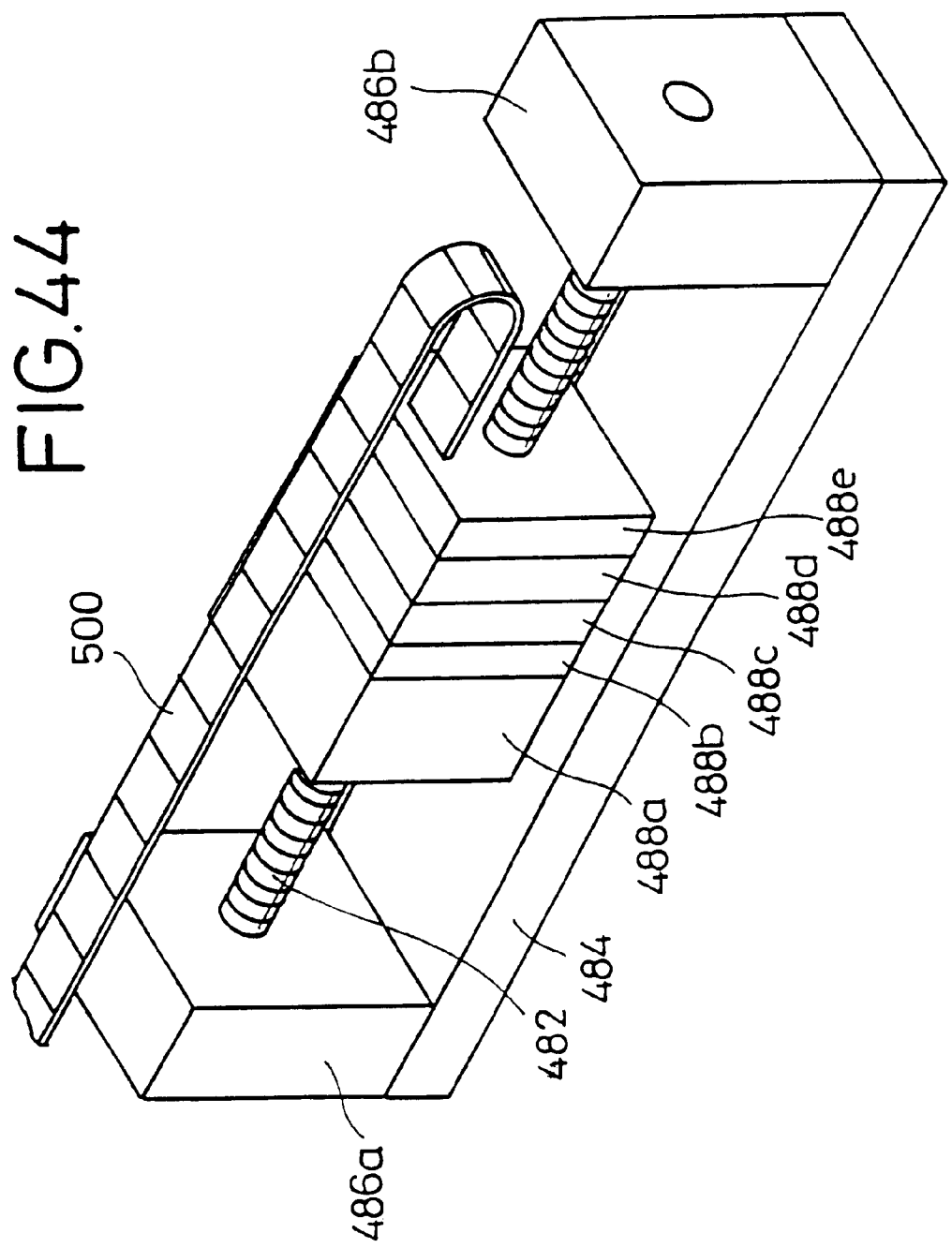
FIG. 44 is a perspective view of a modification of the actuator shown in FIG. 42.

FIGS. 42 through 44 show an actuator 480 according to a tenth embodiment of the present invention.

The actuator 480 has a ball screw 482 fixedly supported at its opposite ends by a pair of bearing blocks 486a, 486b fixedly mounted on a frame 484, and a movable block 488 supported on the ball screw 482 for displacement in the direction indicated by the arrow X or Y between the bearing blocks 486a, 486b. The movable block 488 is of a unitary structure, and houses an electric motor 490, a bearing 492, an encoder 494, a brake mechanism 496, and a clutch mechanism 498. As the movable block 488 is displaceable along the ball screw 482 whose opposite ends are fixed, the ball screw 482 is prevented from flexural movement which would be caused in directions normal to the axis thereof if it were rotated. A power supply current and signals are supplied to the movable block 488 through a flexible board 500 disposed over the movable block 488 as shown in FIG. 43. The flexible board 500 is connected to the movable block 488 by a socket (not shown). As shown in FIG. 44, the components of the movable block 488 may be divided into respective blocks 488a~488e which are separably coupled.

Figure 45:
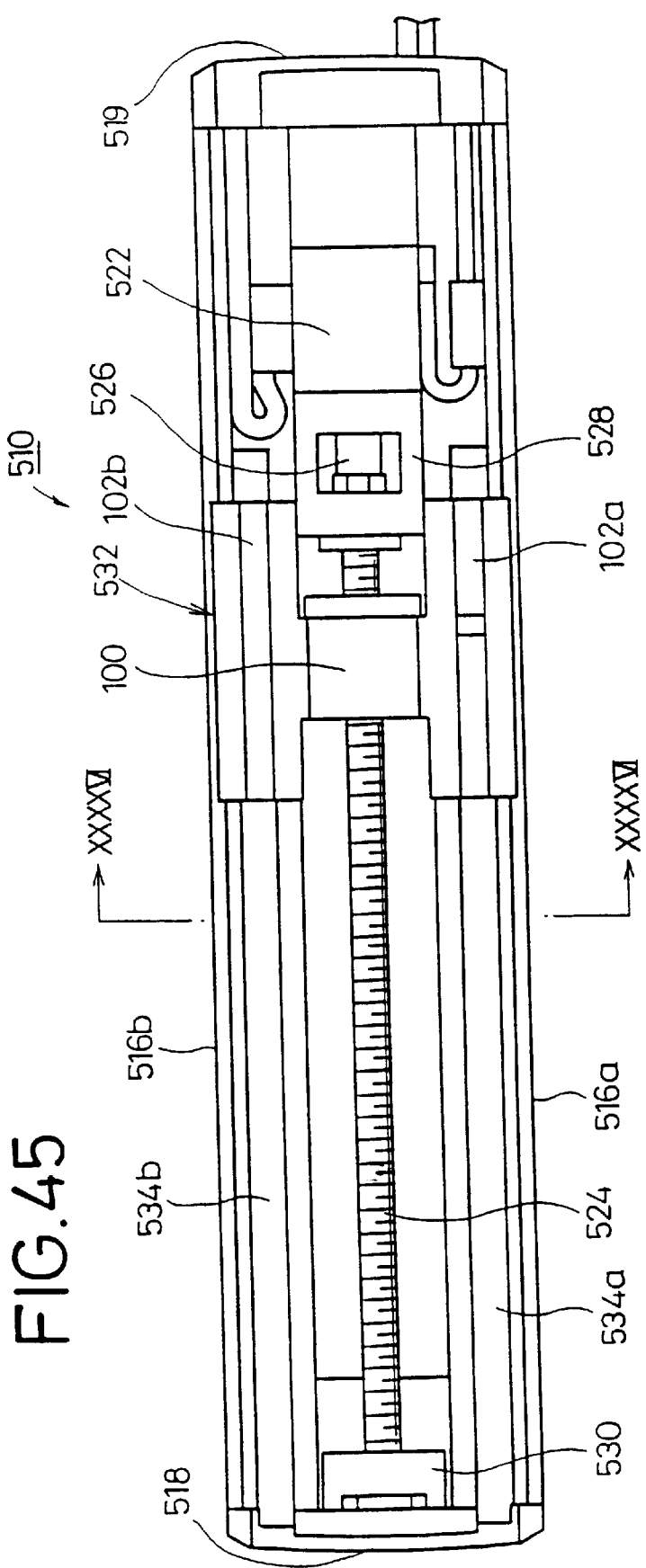
FIG. 45 is a plan view of an actuator according to an eleventh embodiment of the present invention.
Figure 46:
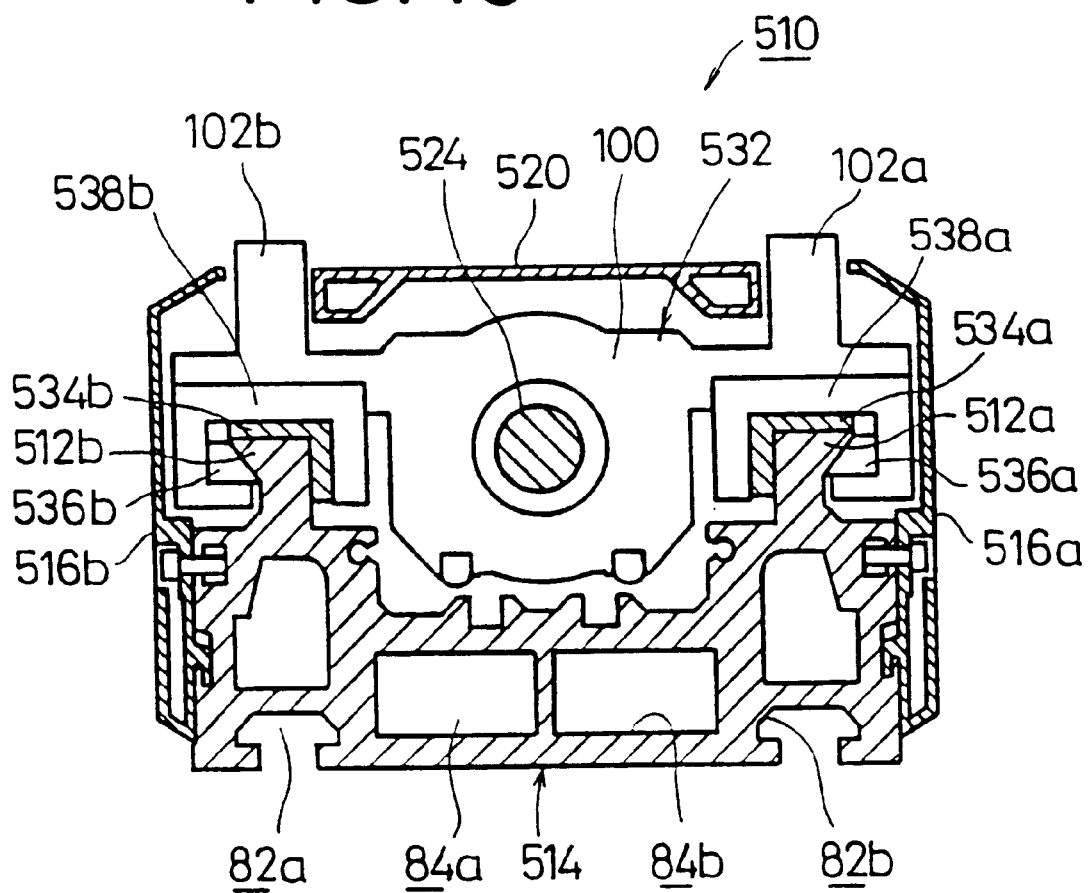
FIG. 46 is a transverse cross-sectional view taken along line XXXXVI—XXXXVI of FIG. 45.
Figure 47:
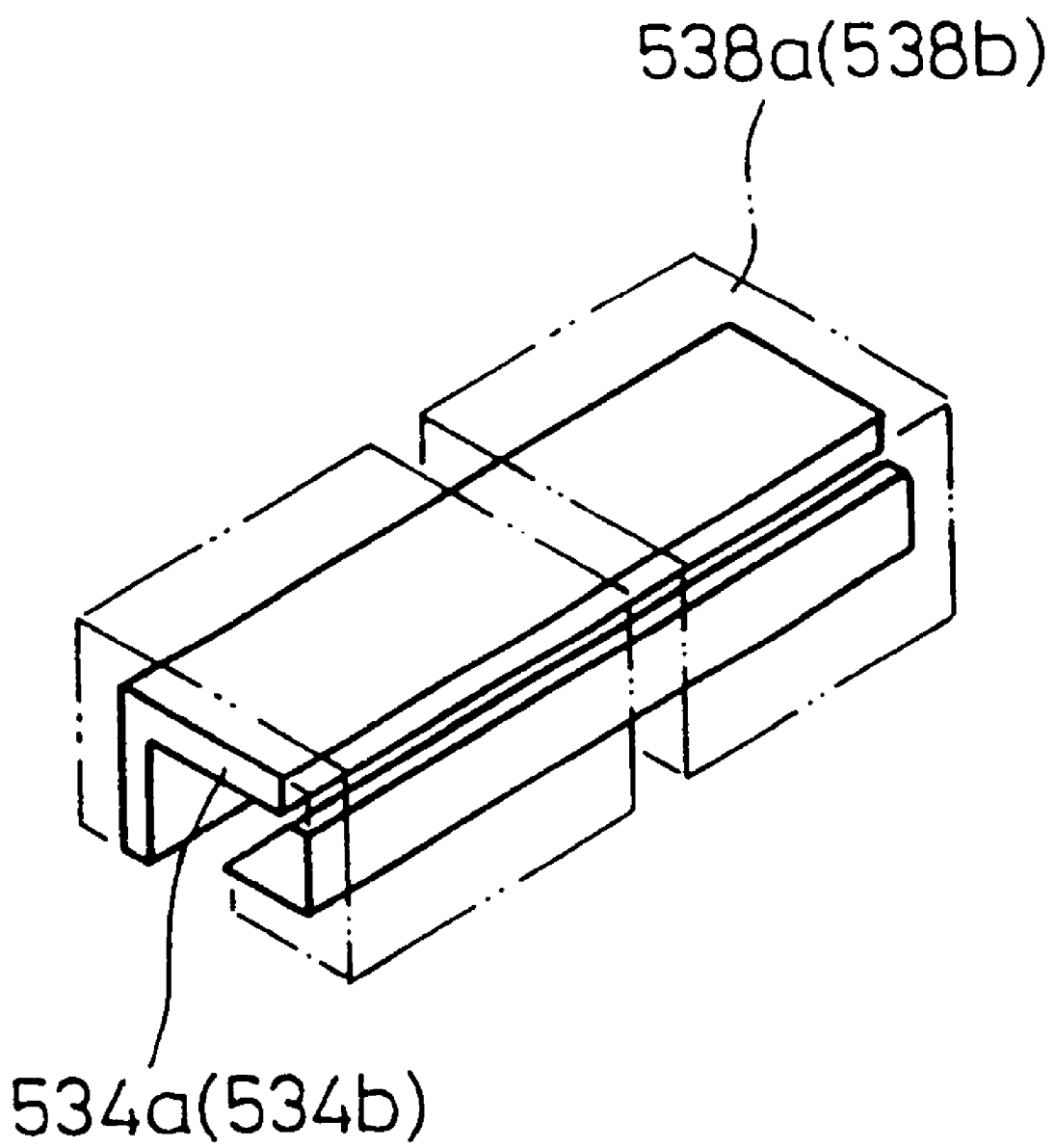
FIG. 47 is a perspective view of a side plate.

An actuator according to an eleventh embodiment of the present invention is shown in FIGS. 45 through 47.

The actuator, generally denoted at 510, comprises a frame 514 having a pair of integrally formed guides 512a, 512b projecting upwardly, a pair of side covers 516a, 516b mounted respectively on transverse side surfaces of the frame 514, a pair of end covers 518, 519 mounted on respective opposite longitudinal ends of the frame 514, and a top cover 520 engaging upper surfaces of the side covers 516a, 516b.

On the frame 514, there are mounted an electric motor 522, a coupling block 528 which has a coupling 526 that connects the rotatable shaft of the electric motor 522 and a ball screw shaft 524 coaxially to each other, a bearing 530 by which one end of the ball screw shaft 524 is rotatably supported, and a table mechanism 532 threaded over the ball screw shaft 524 for being displaced in the direction indicated by the arrow X or Y upon energization of the electric motor 522. Those parts of the actuator 510 which are identical to those of the actuator 60 shown in FIG. 10 are denoted by identical reference numerals, and will not be described in detail below.

In the actuator 510, the guides 512a, 512b extending longitudinally between the opposite ends of the frame 514 are integrally formed with the frame 514. The actuator 510 further includes a pair of first side plates 534a, 534b (see FIG. 47) of substantially L-shaped cross-section fixed to the guides 512a, 512b, respectively, and a pair of second side plates 536a, 536b of substantially trapezoidal cross section which are held in slidable contact with sides of the respective guides 512a, 512b.

In the actuator 60 shown in FIG. 10, the guides 78a, 78b and the holders 104a, 104b of channel-shaped cross section are interposed between the table blocks 102a, 102b of the table mechanism 76 and the frame 62. In the actuator 510 according to the eleventh embodiment, as shown in FIG. 46, the guides 512a, 512b and the frame 514 are integrally formed of one material such as aluminum, and the first side plates 534a, 534b and the second side plates 536a, 536b are anodized and then coated with a polytetrafluoroethylene layer. The first side plates 534a, 534b are fixed to the guides 512a, 512b, respectively, and the second side plates 536a, 536b are fixedly mounted in the holders 538a, 538b, respectively, which are of channel-shaped cross section, and laterally support the guides 512a, 512b. Since the first side plates 534a, 534b and the second side plates 536a, 536b are anodized and then coated with a polytetrafluoroethylene layer, frictional forces which are applied thereby to the guides 512a, 512b when the table mechanism 532 is displaced are reduced, and hence the first side plates 534a, 534b, the second side plates 536a, 536b, and the guides 512a, 512b have increased durability.

Various actuator systems which incorporate actuators according to the foregoing embodiments of the present invention will be described below.

Figure 48:
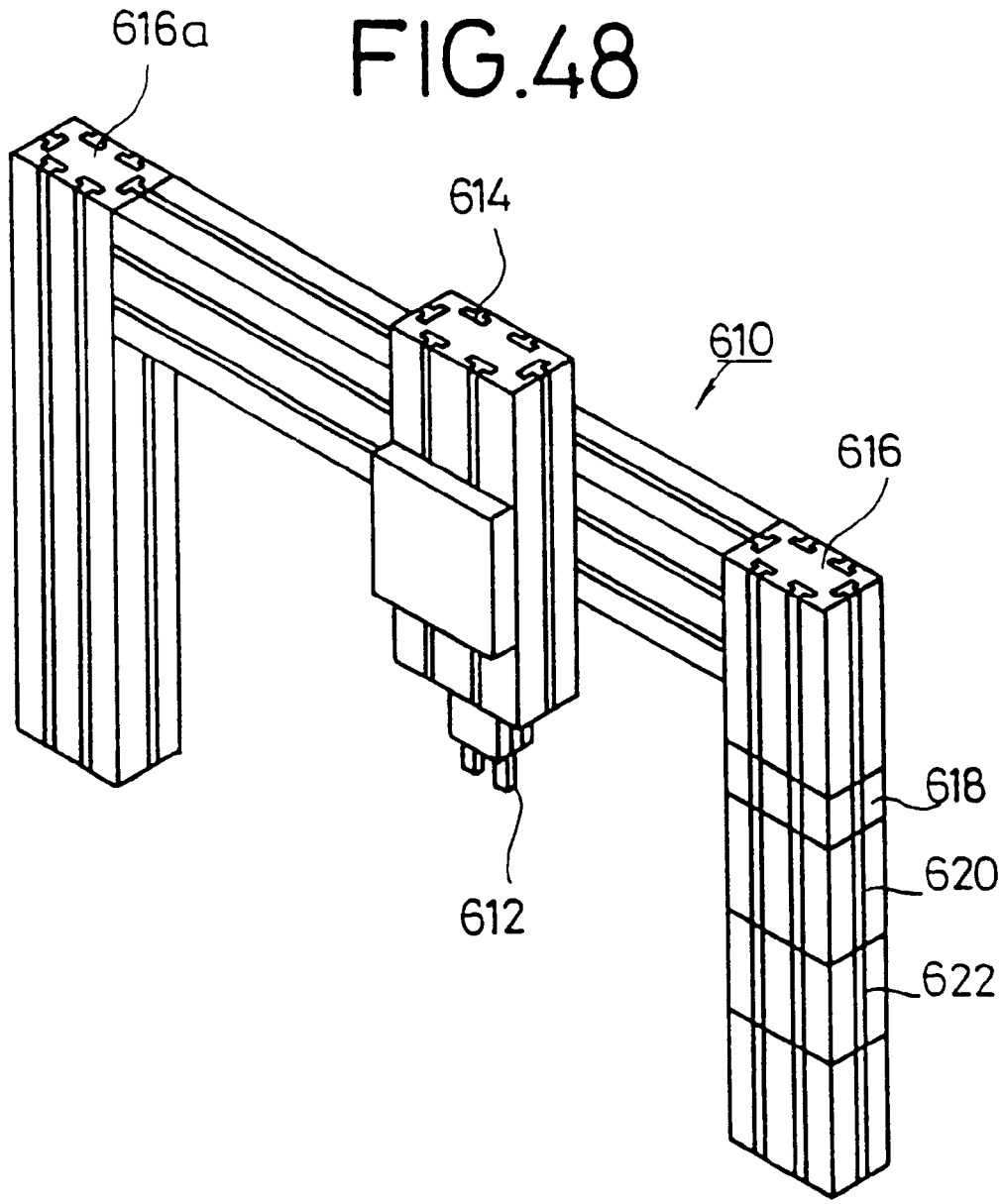
FIG. 48 is a perspective view of an actuator system according to an embodiment of the present invention.

FIG. 48 show an actuator system according to an embodiment of the present invention.

In FIG. 48, an actuator 610, which may be either one of the actuators according to the foregoing embodiments, is attached to and between two legs 616a, 616b. On the actuator 610, there is mounted a cylinder 614 for operating a mechanical hand 612 which may be a suction hand system having an ejector, a supply valve, a break valve and/or a switch. The cylinder 614 may comprise a ball-screw drive actuator, a string-screw drive actuator, a drive actuator with a plastic nut, a thread-rolled screw, and lubrication-free components, a plastic-screw drive actuator, a change-nut feed-screw drive actuator, a timing-belt drive actuator, a steel-belt drive actuator, or a linear-motor drive actuator. The leg 616*b* has a controller 618, a communication system 620, and a power supply 622 for the actuator 610.

Figure 49:
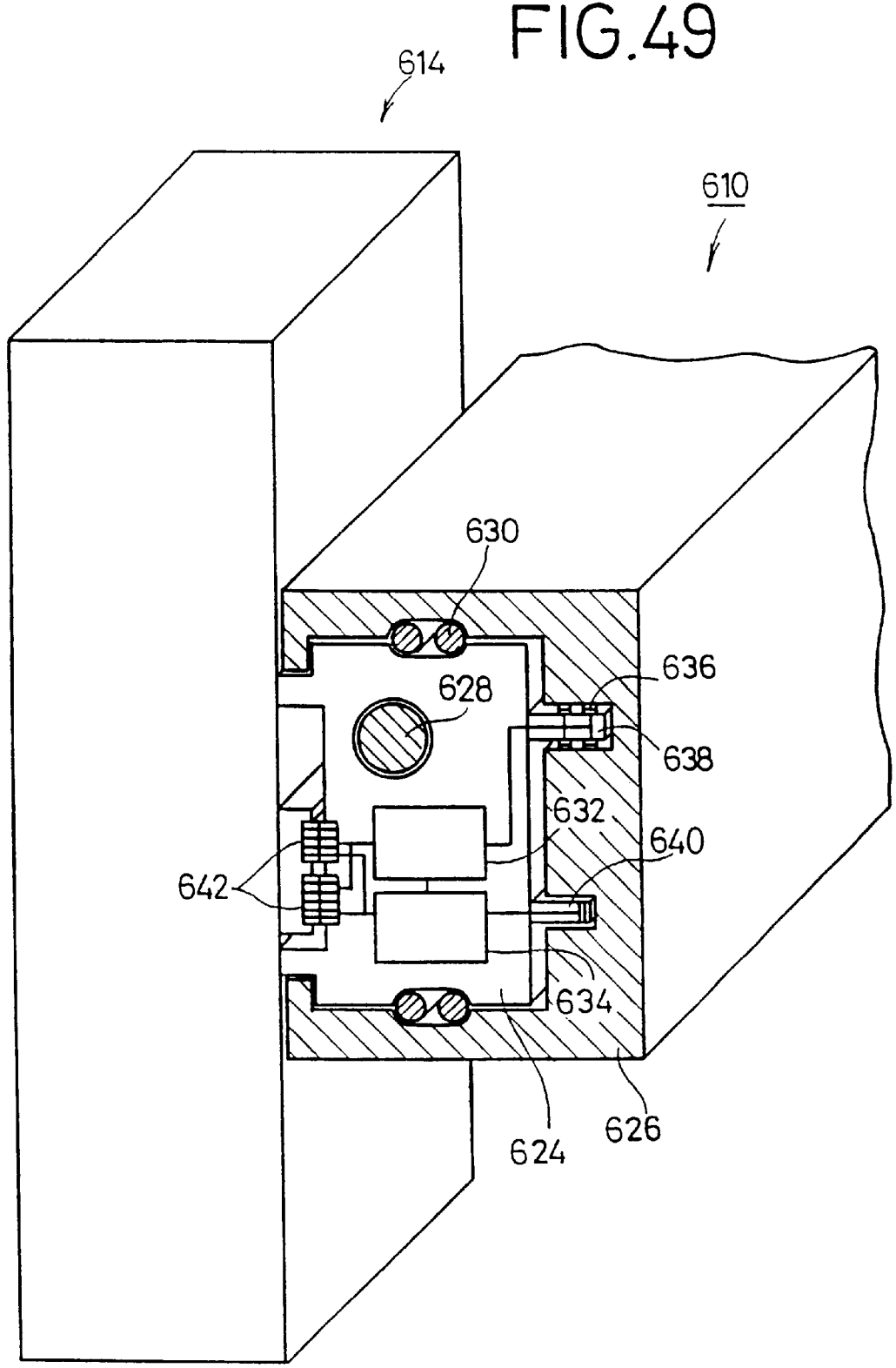
FIG. 49 is a perspective view, partly in cross section, showing a structure of an actuator shown in FIG. 48.

The relationship between the actuator 610 and the cylinder 614 is illustrated in FIG. 49.

As shown in FIG. 49, the actuator 610 houses a movable table 624 to which the cylinder 614 is attached. The movable table 624 is slidably movable in an actuator frame 626 while being guided by a shaft 628 and guides 630. The movable table 624 supports a power supply controller 632 and a controller 634 which may be integral with each other. The power supply controller 632 and the controller 634 may further be implemented by a CPU (RISC, DSP, or multi-CPU) integral with a multilayer, and operated by a DSP for high-speed control. The power supply controller 632 is supplied with electric power from a power supply bus 636 disposed in a frame 626 through a power supply slider 638 on the movable table 624. The controller 634, which has a network communication unit, is supplied with electric power from the power supply controller 632 and signals from a non-contact signal bus (not shown) such as an optical signal bus in the frame 626. The signals from the signal bus are supplied to a signal receiver 640 on the movable table 624. Signals from the power supply controller 632 and the controller 634 are supplied through connectors 642 to the cylinder 614.

Figure 50:
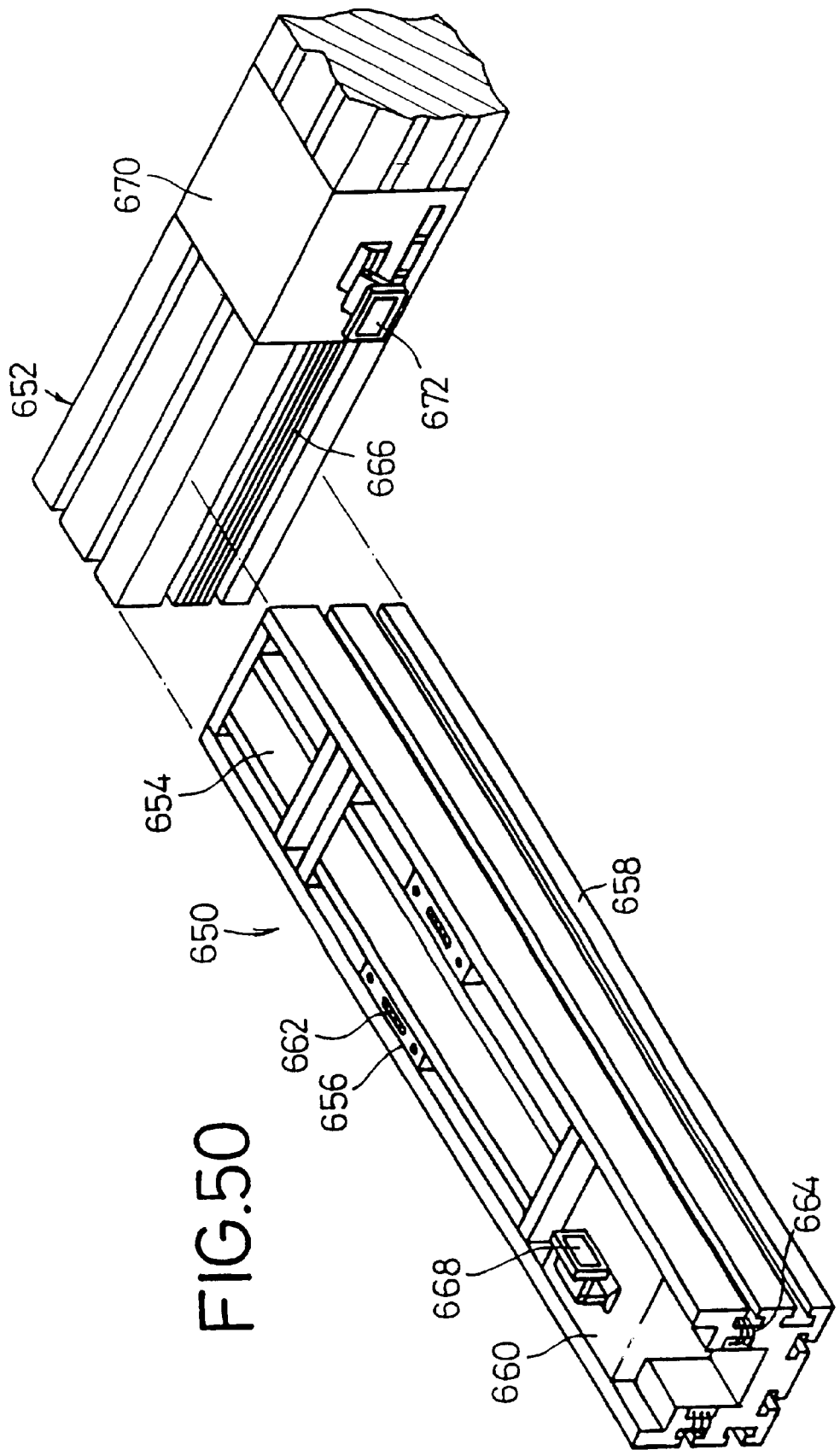
FIG. 50 is a perspective view of an actuator system according to another embodiment of the present invention, the view showing the relationship between an actuator and a leg.

An actuator system according to another embodiment of the present invention is shown in FIG. 50.

Figure 51:
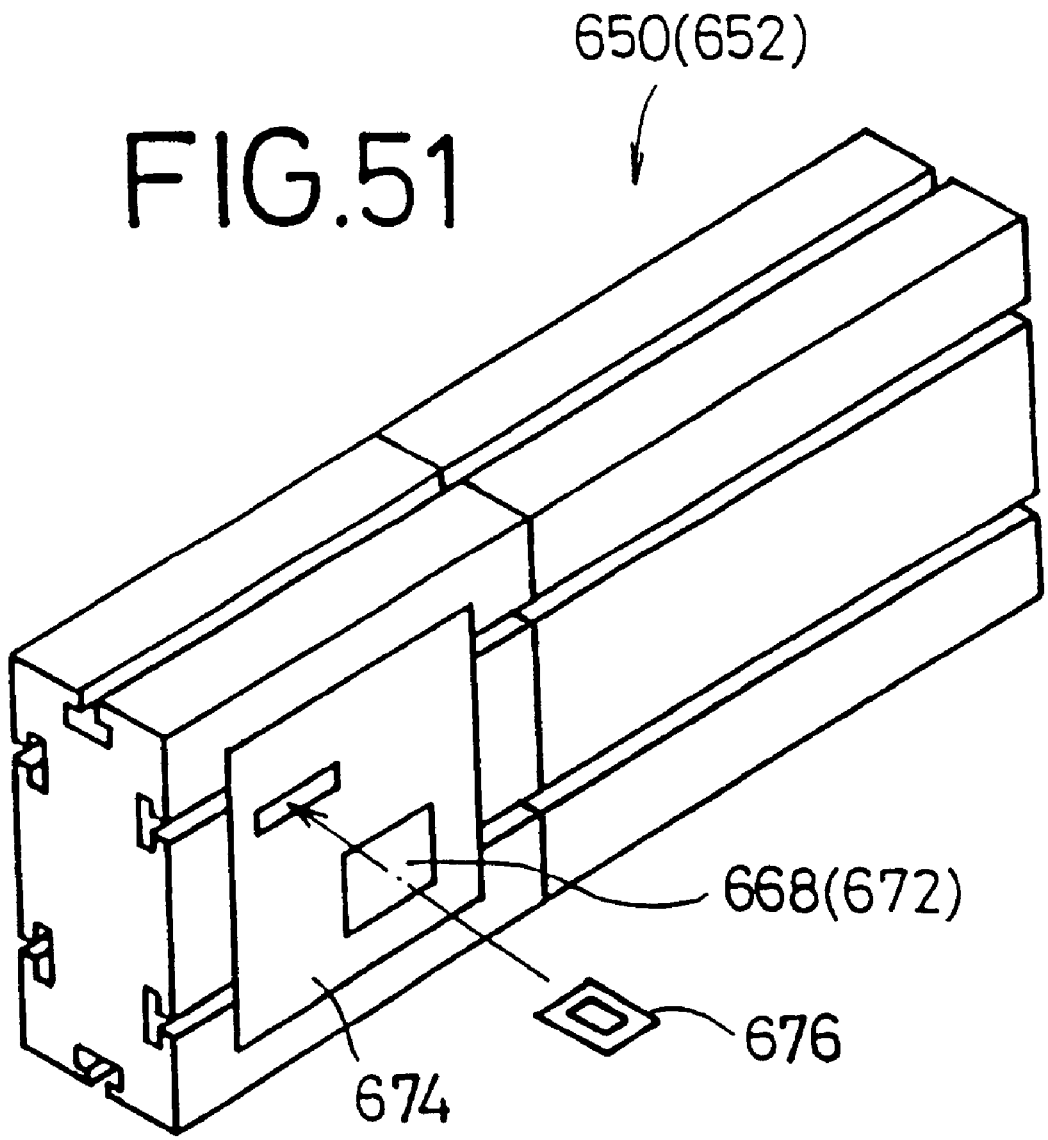
FIG. 51 is a perspective view showing a controller.

In FIG. 50, an actuator 650 comprises an electric motor 654, a movable table 656 a frame 658, and a controller 660. The movable table 656 has contacts 662 for transmitting signals, and a signal bus 664 for transmitting signals is exposed on an end of the frame 568. The signal bus 664 is connected to a bus 666 on a leg 652 when the actuator 650 is joined to the leg 652. The controller 660 has a display unit 668 for displaying data from the actuator, sensors, a self-diagnosis monitor, a fault diagnosis monitor, a master control apparatus, and a master management level computer, and an input unit (not shown) for entering signals to extract the data to be displayed on the display unit 668. The leg 652 has a controller 670 with a display unit 672. The display units 668, 672 may be arranged such that they can be stored in a position in which they lie flush with surfaces of the controllers 660, 670. As shown in FIG. 51, the controllers 660, 670 have a front panel 764 in which there can be inserted a card 676 that stores all data of the components and identification (ID) data. The front panel 674 may have a known bar-code reader, and a device for writing and reading a data carrier.

Figure 52:
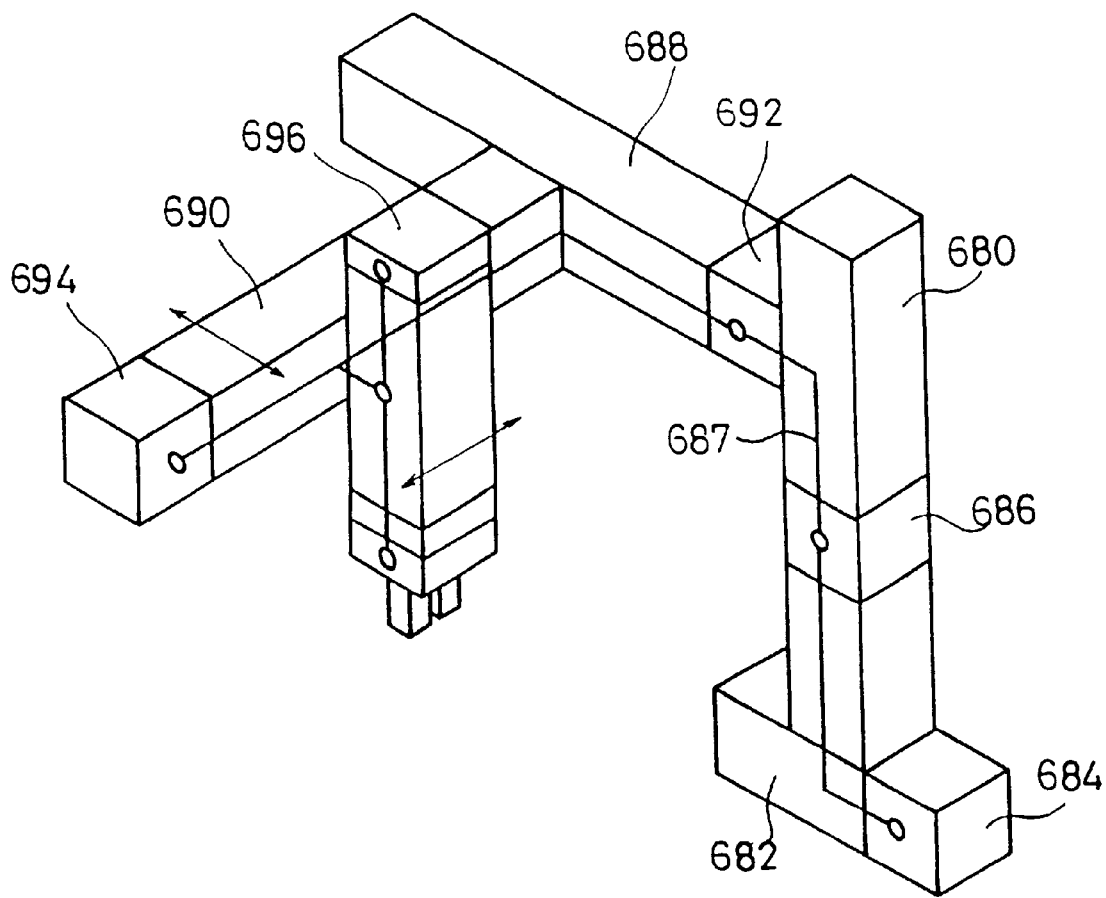
FIG. 52 is a perspective view showing the manner in which actuators with controllers are assembled.

The actuators 610, 650 with the controllers 634, 660, 670 may be assembled as shown in FIG. 52. A base 682 is disposed underneath a leg 680, and a master controller 684 is coupled to the base 682. The leg 680 has a slave controller 686 connected to the master controller 684 by a bus 687. Actuators 688, 690 have respective slave controllers 692, 694 to which signals from the master controller 684 can be supplied through the bus 687. The slave controllers 686, 692, 694 and a slave controller 696 are controlled by the master controller 684.

An actuator system according to still another embodiment which comprises a combination of columnar members (legs, etc.) and actuators will be described below.

Figure 53:
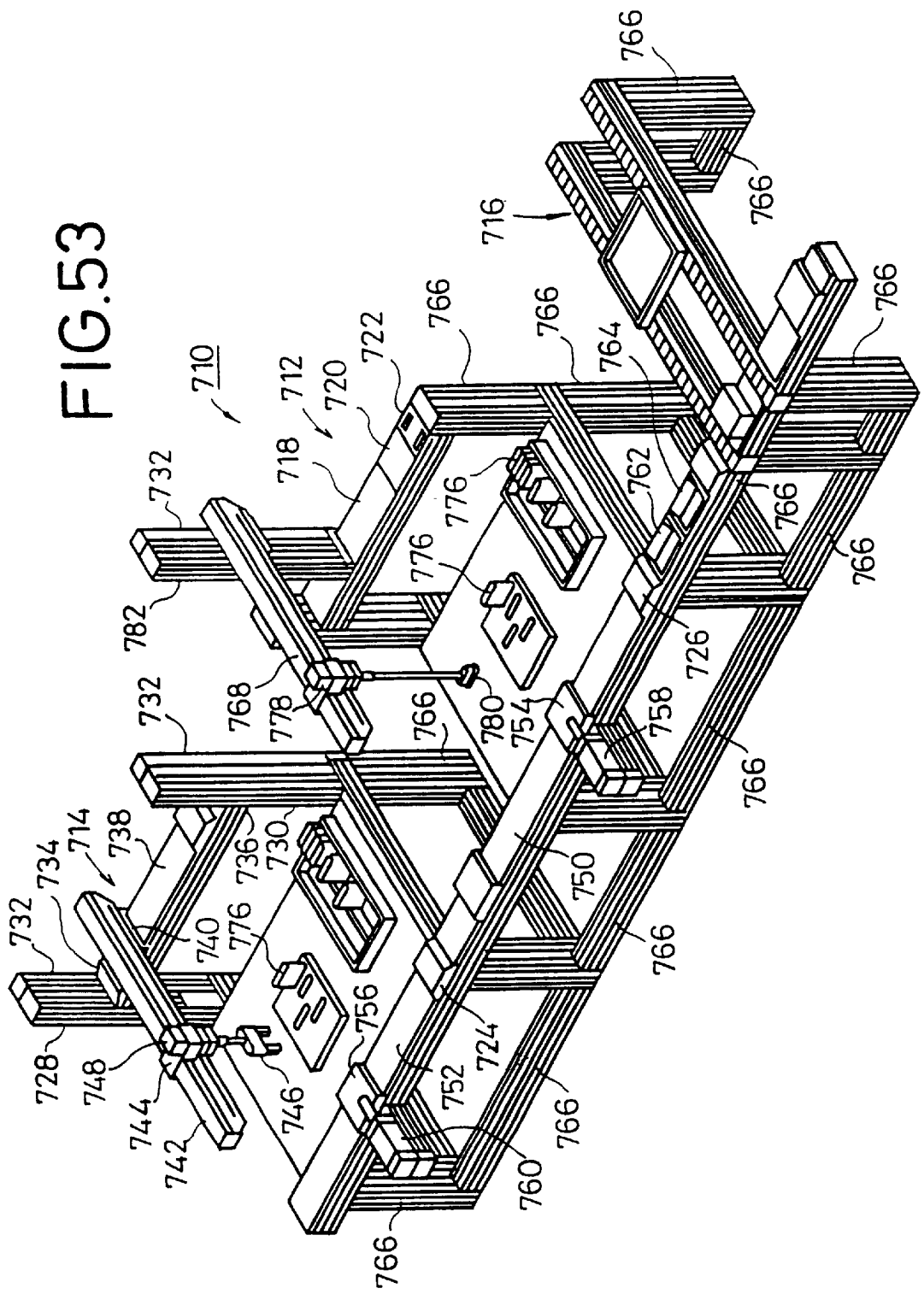
FIG. 53 is a perspective view of an actuator system according to a still another embodiment of the present invention.

In FIG. 53, an actuator system 710 having well known or highly rigid auxiliary joints is basically composed of a first section 712 and a second section 714 associated therewith. Cylinders in FIG. 53 may be replaced with electric actuators or other actuators. By using compatible actuators depending on the application in which they are to be used, the actuator system can easily be reconstructed and established.

The first section 712 includes a motor box 720 and a controller 722 with a display unit, which are positioned at one end of an actuator 718, the motor box 720 and the controller 722 being disposed flush with an upper surface of the actuator 718. Since the motor box 720 and the controller 722 lie flush with the upper surface of the actuator 718, they have compatibility for being mounted on another member, and they can effectively utilize a space as they are compact in shape. Other motor boxes 724, 726, etc. may also be disposed flush with upper surfaces of associated actuators.

The second section 714 includes upstanding balancers 732 associated respectively with actuators 728, 730 and confronting each other, and opposite ends of an actuator 738 are coupled respectively to movable tables 734, 736 of the actuators 728, 730 and the balancers 732. The actuator 738 lie substantially horizontally perpendicularly to the actuators 728, 730 and the balancers 732. The actuator 738 has a movable table 740 coupled to an actuator 742, and the actuator 742 has a movable table 744 coupled to a cylinder 748 to which a mechanical hand 746 is connected. Actuators 750, 752 are joined to each other longitudinally in a region where the first and second sections 712, 714 are coupled to each other. The actuators 750, 752 have respective movable tables 754, 756 to which there are connected respective cylinders 758, 760 each having a positioning cylinder rod.

A belt conveyor 716 is joined to the first section 712 in a region which has programming keyboards 762, 764 which function as input/output devices for a control system. The programming keyboards 762, 764 are detachably mounted on a columnar member 766 for enabling the control system to control, as a whole, the various devices of the actuator system 710, specifically, the actuators 768, 738, 742, 728, 730, 750, 752, the balancer 732, the cylinders 748, 758, 760, the mechanical hand 746, and the belt conveyor 716. The control system is composed of various controllers, processors, and circuits for transmitting various signals such as optical, electrical, and fluid pressure signals. These controllers, processors, and circuits are housed in an actuator 768, etc., and columnar members 766.

Those actuators which employ a fluid pressure such as of air, oil, or another fluid are composed of valves, a controller, and a communication circuit which are combined in an integral fashion for space saving and size reduction. These actuators are highly efficient and cause low loss because of omitted pipes. The electric actuators also offer the same advantages as their driver, controller, and communication circuit are combined in an integral fashion.

The actuator system 710 can operate as an independent production line composed of a plurality of production steps, as described below.

Figure 54:
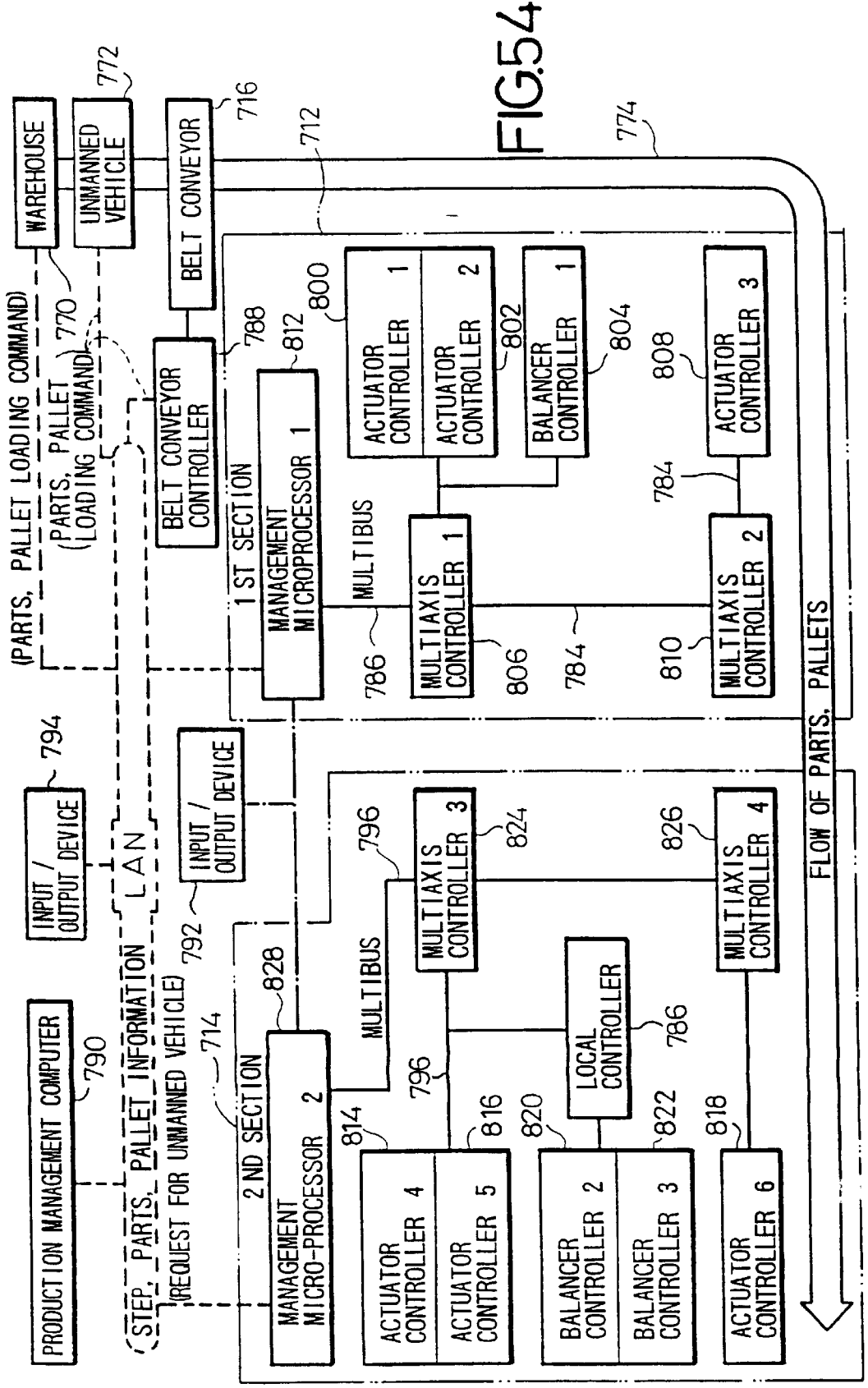
FIG. 54 is a block diagram showing functions of the actuator system illustrated in FIG. 53.

As shown in FIG. 54, a parts pallet 774 with a non-illustrated ID module is conveyed from a warehouse 770 by an unmanned vehicle 772 and a belt conveyor 716. The parts pallet 774 is introduced into the first section 712 of the actuator system 710 in which it is processed in predetermined steps. It is assumed that each workpiece 776 has an ID module. Thereafter, the parts pallet 774 is introduced into the second section 714 by a conveying unit (not shown). In the second section 714, the parts pallet 774 is also processed in predetermined steps. After all the steps have been carried out on the production line, the parts pallet 774 is conveyed to another process.

Each of the first and second sections 712, 714 of the actuator system 710 can operate as an independent production line, as follows:

In FIG. 54, the actuator 718 is controlled by a first actuator controller 800. The actuator 768, a cylinder 778, and a suction pad 780 are controlled by a second actuator controller 802. An actuator 782 and the balancers 732 are controlled by a first balancer controller 804. The first actuator controller 800, the second actuator controller 802, and the first balancer controller 804 are connected through a multibus 784 to a first multiaxis controller 806, which controls them in a unified manner as one operation unit. The actuator 750 and the cylinder 758 are controlled by a third actuator controller 808, which is connected through a multibus 784 to a second multiaxis controller 810. The third actuator controller 808 is thus controlled in a unified manner as one operation unit by the second multiaxis controller 810.

The components of the first section 712 of the actuator system 710 are controlled by a first management microprocessor 812 which is connected to the first and second multiaxis controllers 806, 810 through a local area network (LAN) which utilizes electric signals, optical signals, and radio signals.

In the second section 714 of the actuator system 710, the actuator 738 is controlled by a fourth actuator controller 814. The actuator 742, the cylinder 748, and the mechanical hand 746 are controlled by a fifth actuator controller 816. The actuator 752 and the cylinder 760 are controlled by a sixth actuator controller 818. The actuator 728 and the balancer 732 are controlled by a second balancer controller 820. The actuator 730 and the balancer 732 are controlled by a third balancer controller 822. The second balancer controller 820 and the third balancer controller 822 are connected to and synchronously controlled by a local controller 786 for holding the actuator 738 horizontally and moving the actuator 738 substantially vertically. The fourth and fifth actuator controllers 814, 816 and the local controller 786 are connected through a multibus 796 to a third multiaxis controller 824, and controlled in a unified manner as one operation unit thereby. The sixth actuator controller 818 is controlled in a unified manner as one operation unit by a fourth multiaxis controller 826. The components of the second section 714 of the actuator system 710 are therefore controlled by a second management microprocessor 828 which is connected to the third and fourth multiaxis controllers 824, 826 through a LAN which utilizes electric signals, optical signals, and radio signals. Each of the first through sixth actuator controllers may function as a balancer controller, and each of the first through third balancer controllers may function as an actuator controller.

The belt conveyor 716 is controlled by a belt conveyor controller 788, and the unmanned vehicle 772 and the warehouse 770 are controlled by respective control apparatus or control systems (not shown).

The first management microprocessor 812, the second management microprocessor 828, the belt conveyor controller 788, and the control apparatus (not shown) for the unmanned vehicle 772 and the warehouse 770 are connected to a LAN which utilizes electric signals, optical signals, and radio signals, and hence can exchange information freely with each other. Therefore, they serve as a unified control system for the actuator system 710 as an independent production line.

To the LAN, there are also connected other production, management, information, communication, and control systems, which jointly make up a larger-scale unified production management system. For example, a production management computer 790 which operates as a master management computer in FA or CIM is connected to the LAN, which thus becomes part of a larger-scale unified production management system. A program may be executed or edited on a real-time basis for defining ordering, step managing, processing, and conveying procedures according to a process and an ordering system which are managed by CIM, and also for operating actuators, sensors, pallets, robots, and control devices according to the defined procedures.

Interfaces of the above system comprise input/output devices 792, 794 (see FIG. 54) such as the programming keyboards 762, 764 shown in FIG. 53. These input/output devices 792, 794 may be connected freely to controllers, processors, computers, or the like by general-purpose interfaces such as RS232C, RS422C, a LAN which utilizes electric signals, optical signals, and radio signals, multibuses, an Ethernet, or a token ring. There are available input/output devices or general-purpose interfaces that can be connected to a master CIM computer, controllers, computers, or the like. It is possible to carry out an entire operation such as editing, generation, modification, downloading, uploading, inputting, and outputting of a control program, not only on the master CIM computer, but also on each controller, processor, computer, or the like. It is also possible to access any desired controllers, processors, and computers. While communications may be effected through the multibuses and LAN, all controllers, processors, and computers may be directly connected to each other by a network, or by a software-implemented virtual network. Paths may automatically be changed upon occurrence of a fault. Each controller, computer, and input/output device may be arranged to be able to change its master and slave relationship, thereby providing a protection mechanism to guard against a fault or a network failure. The entire system can thus be controlled, and management information can be monitored and manipulated at the working site, with the result that not only operation efficiency can be improved, but also independent individual control can be effected while maintaining the entire system unification in process management. Therefore, the overall system has an increased efficiency which is very effective for system modifications, maintenance, and production of many product types in small quantities.

Figure 55:
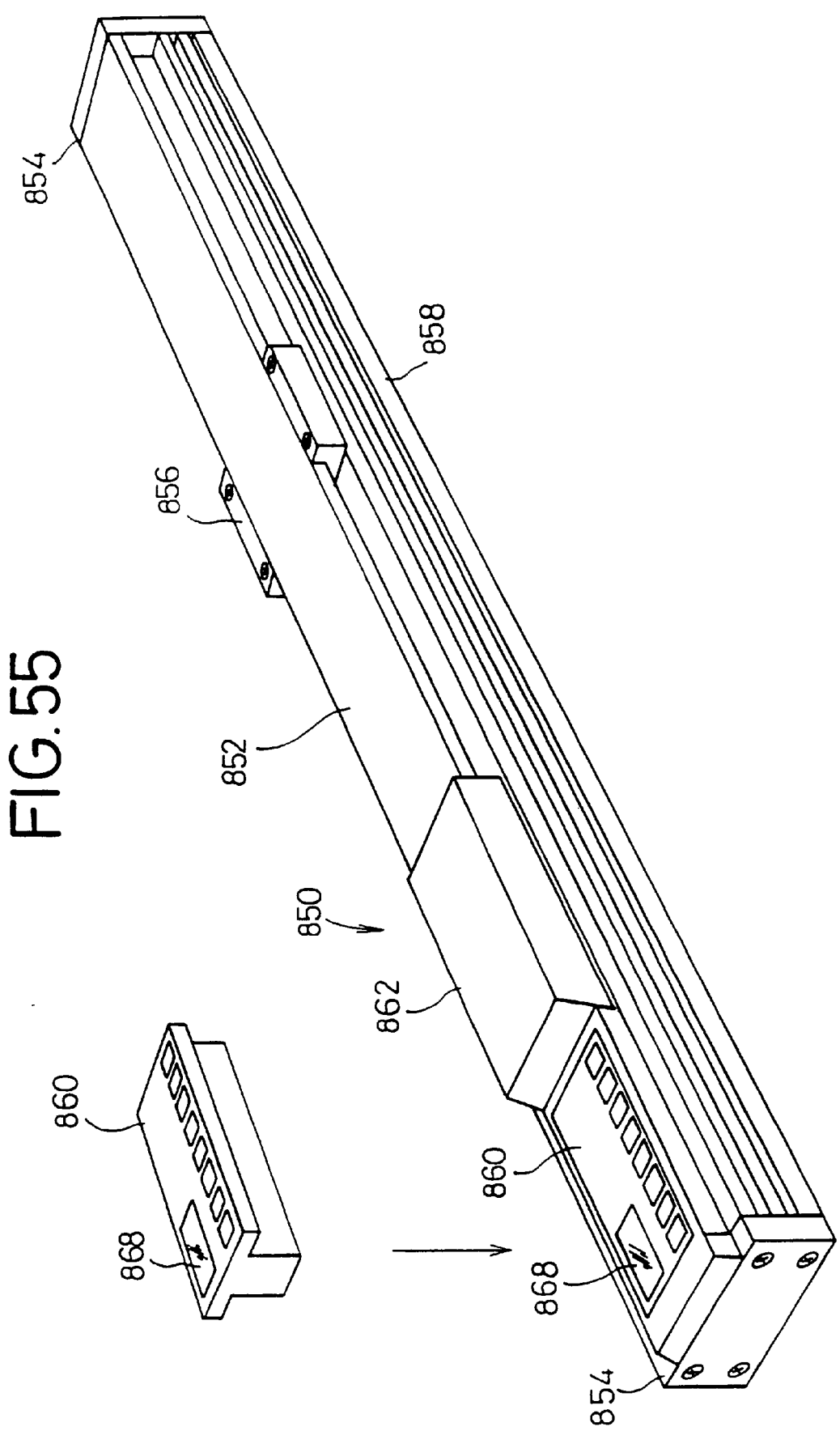
FIG. 55 is a perspective view of a modified actuator.
Figure 56:
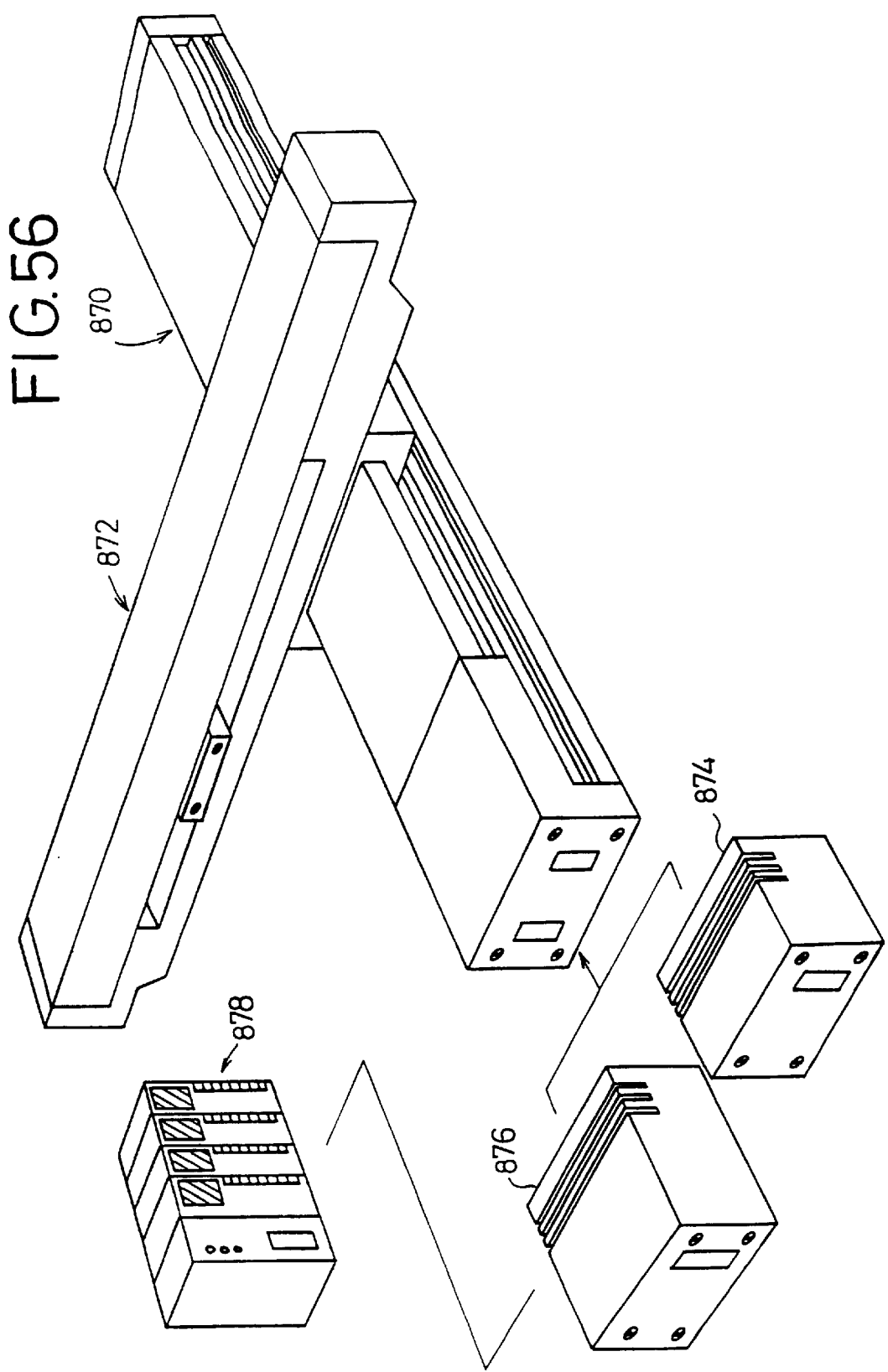
FIG. 56 is a perspective view showing a configuration in which an actuator and controllers are connected to each other.
Figure 57:
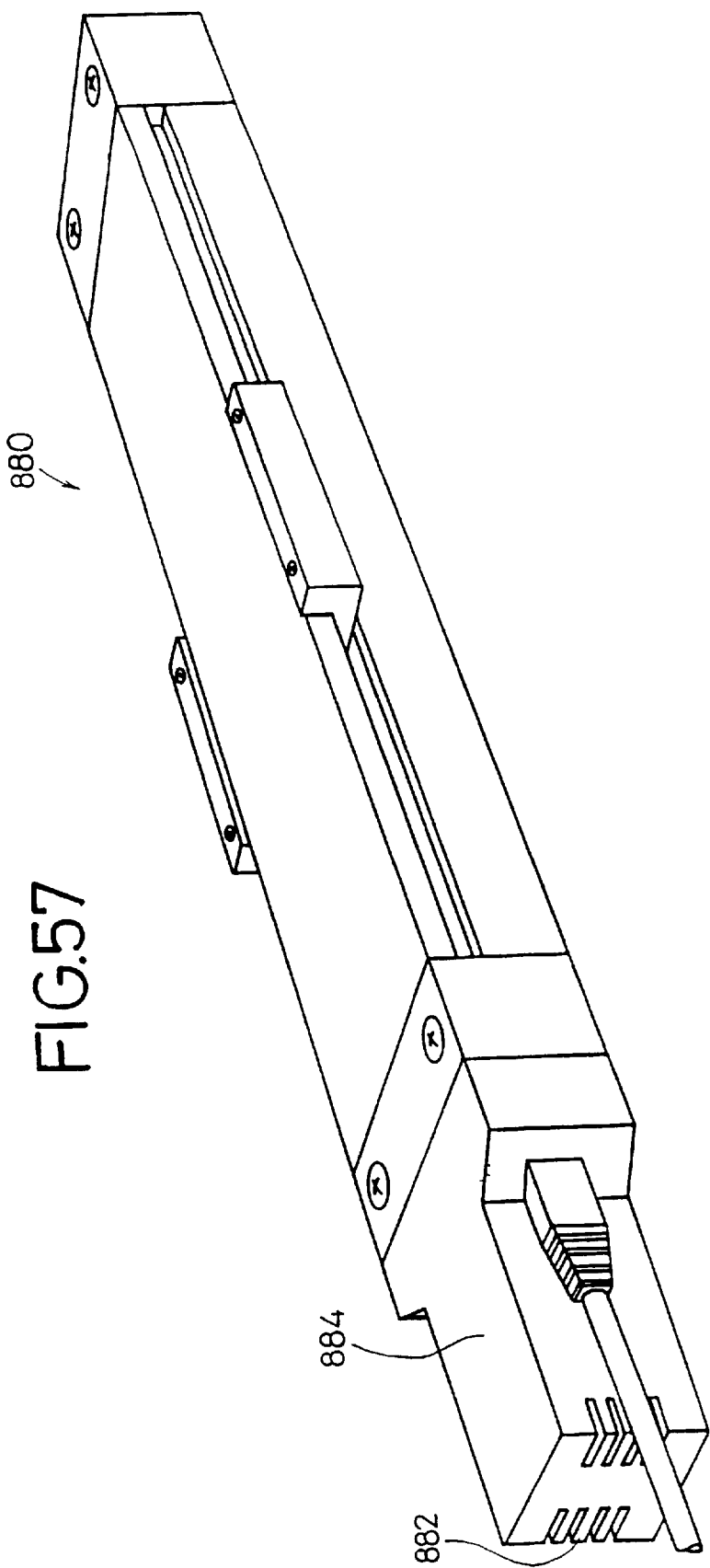
FIG. 57 is a perspective view showing a special shape of a controller.

Modified actuators for use in the above actuator systems are shown in FIGS. 55 through 57.

FIG. 55 shows an actuator 850 which basically comprises an electric motor 862, a movable table 856, a frame 858, and a controller 860. The movable table 856 and the electric motor 862 are covered with a cover 852, and ends of the frame 858 are covered with respective end covers 854. The controller 860 is detachably housed in the frame 858. The controller 860 has a display unit 868 on its surface, and an input unit (not shown) for selecting data to be displayed on the display unit 868. The cover 852 projects in its area over the electric motor 862. However, the cover 862 may lie flush with the surface of the controller 860.

In FIG. 56, controllers 874, 876 are detachably attached to an end of an actuator 870. Either one or both of the controllers 874, 876 may be installed on the actuator 870. If only one controller, e.g., the controller 874, is installed, it controls the actuator 870. If both of the controllers 874, 876 are installed, they control the actuator 870 and an actuator 872, respectively. The controllers 874, 876 are connected to a sequencer or a main controller 878 through a communication line, which applies control signals to control the controllers 874, 876.

An actuator 880 shown in FIG. 57 has a controller 884 of a special shape having a heat radiator 882 which incorporates a Peltier-effect cooling system.

Actuators according to the present invention offer the following advantages:

The operator can select and mount desired covers on the frame depending on the environment in which the actuator is to be installed and on the application in which it is to be used, and the covers can easily be attached and detached. The actuator is relatively simple in structure and can be manufactured inexpensively.

As the load on the drive source can be reduced by the cylinder, workpieces that can be conveyed by the table mechanism may range from light to heavy workpieces.

Since the drive shaft of the drive source and the drive force transmitting shaft are integrally formed with each other, no space is required for joining them, and hence the actuator may be reduced in size and weight.

Use of the drive control block allows components to be integrally combined with each other which have heretofore been interconnected individually. Accordingly, the size of the actuator may be reduced, and the components can be controlled as a whole.

The actuator system is composed of actuators and working module units which may be arranged efficiently and effectively. More specifically, inasmuch as the components of actuators are standardized structural members, joints, adapters, controller wires, and connectors, the actuators can be handled on a computer by CAD, CAM, or CAE, and can be displayed as three-dimensional data, i.e., enlarged, compressed, displayed for detailed observation, and designed. They can also be simulated for structural analysis, fluid thermal analysis, mechanism analysis, plastic flow analysis, etc. in environments including overall CIM, factory sites, material handling, and development, for entire factory and company concurrent engineering. Parts of physical structures and actuators including their controllers can be manufactured and assembled based on NC, and their costs can be estimated using a statistical data base. Since the LAN is completed down to its lower layer, sensor signals from respective actuators can efficiently be managed in levels including the entire management level.

Although certain preferred embodiments of the present invention has been shown and described in detail, it should be understood that various changes and modifications may be made therein without departing from the scope of the appended claims.

What is claimed is:

1. An actuator comprising:

a frame extending linearly for a predetermined length;

a table block for displacement in an axial direction of said frame in response to operation of a rotating drive source;

a ball screw for transmitting drive forces from said rotating drive source to said table block;

a drive control block disposed on one end of said ball screw for controlling said drive forces transmitted from said rotating drive source to said ball screw;

a cylinder disposed axially parallel to said ball screw, said cylinder having a piston coupled to said table block, wherein said cylinder is disposed outside of said frame, said cylinder having a piston rod coupled to said table block; and a non-flexible casing disposed outside of and alongside said frame, wherein said casing covers said piston rod during reciprocating movement thereof, said casing being stationary during said reciprocating movement.

2. An actuator according to claim 1, wherein a single end of said cylinder is mounted in said casing.

* * * * *